(12) United States Patent
Zhang et al.

(10) Patent No.: US 12,718,064 B2
(45) Date of Patent: Aug. 25, 2026

(54) NODE FUSION METHOD FOR COMPUTATIONAL GRAPH AND DEVICE

(71) Applicant: HUAWEI TECHNOLOGIES CO., LTD., Guangdong (CN)

(72) Inventors: Zhaochuang Zhang, Shenzhen (CN); Xiong Gao, Hangzhou (CN); Zitao Zeng, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 582 days.

(21) Appl. No.: 18/214,101

(22) Filed: Jun. 26, 2023

(65) Prior Publication Data

US 2023/0334292 A1 Oct. 19, 2023

Related U.S. Application Data

(63) Continuation of application No. PCT/CN2021/140906, filed on Dec. 23, 2021.

(30) Foreign Application Priority Data

Dec. 28, 2020 (CN) ......................... 202011595030.3

(51) Int. Cl.
*G06N 3/045* (2023.01)
*G06N 3/10* (2006.01)

(52) U.S. Cl.
CPC ............... *G06N 3/045* (2023.01); *G06N 3/10* (2013.01)

(58) Field of Classification Search
None
See application file for complete search history.

(56) References Cited

U.S. PATENT DOCUMENTS 10,929,748 B1 * 2/2021 Morten .................... G06N 3/08
2020/0074267 A1 * 3/2020 Salama .................. G06N 3/084
(Continued)

FOREIGN PATENT DOCUMENTS

CN 109543825 A 3/2019
CN 109669772 A 4/2019
(Continued)

OTHER PUBLICATIONS

Yaoyao Ding et al: "IOS: Inter-Operator Scheduler for CNN Acceleration", arxiv.org, Cornell University Library, 201 Olin Library Cornell University Ithaca, NY 14853, Nov. 2, 2020 (Nov. 2, 2020), XP081805761, total 14 pages.
(Continued)

*Primary Examiner* — Kaveh Abrishamkar
(74) *Attorney, Agent, or Firm* — WOMBLE BOND DICKINSON (US) LLP

(57) ABSTRACT

Embodiments of this application disclose a node fusion method for a computational graph and a device. The method includes: converting a neural network into a computational graph; extracting one or more parallelizable branch groups from the computational graph based on a dependency relationship between nodes in the computational graph, where the dependency relationship indicates at least one of the following relationships: the parallelizable branch group has a common parent node, the parallelizable branch group has a common child node, the parallelizable branch group has no parent node, and the parallelizable branch group has no child node; and finally, fusing a plurality of nodes in any parallelizable branch group that respectively belong to different sub-branches to obtain a new computational graph.

18 Claims, 24 Drawing Sheets

(56) References Cited

U.S. PATENT DOCUMENTS

| | | | | |
|---|---|---|---|---|
| 2020/0249998 | A1 | 8/2020 | Che et al. | |
| 2021/0264322 | A1* | 8/2021 | Markhasin ............ | G06F 18/211 |

FOREIGN PATENT DOCUMENTS

| | | | |
|---|---|---|---|
| CN | 109740751 | A | 5/2019 |
| CN | 111260019 | A | 6/2020 |
| CN | 111522640 | A | 8/2020 |
| CN | 111935005 | A | 11/2020 |
| CN | 112035229 | A | 12/2020 |
| WO | 2020223465 | A1 | 11/2020 |

OTHER PUBLICATIONS

Fang Jingzhi et al: "Optimizing DNN computation graph using graph substitutions",Proceedings of the VLDB Endowment, vol. 13, No. 12, Aug. 1, 2020 (Aug. 1, 2020), pp. 2734-2746, XP093008400, New York, NY, total 13 pages.

Ao Li et al.,"Automatic Horizontal Fusion for GPU Kernels",Jul. 2, 2020,total:13pages.

* cited by examiner

| Time | Model | Parameter quantity | Organization |
|---|---|---|---|
| 2018.4 | ELMO | **94m (unit: million)** | Ai2 |
| 2018.7 | GPT | 110m | OpenAI |
| 2018.10 | BERT-Large | 340m | Google |
| 2019.1 | Transformer ELMO | 465m | Ai2 |
| 2019.1 | GPT-2 | **1.5b (unit: billion)** | OpenAI |
| 2019.7 | MegatronLM | 8.3b | Nvidia |
| 2020.2 | T-NLG | 17.5b | Microsoft |
| 2020.5 | GPT-3 | 175b | OpenAI |

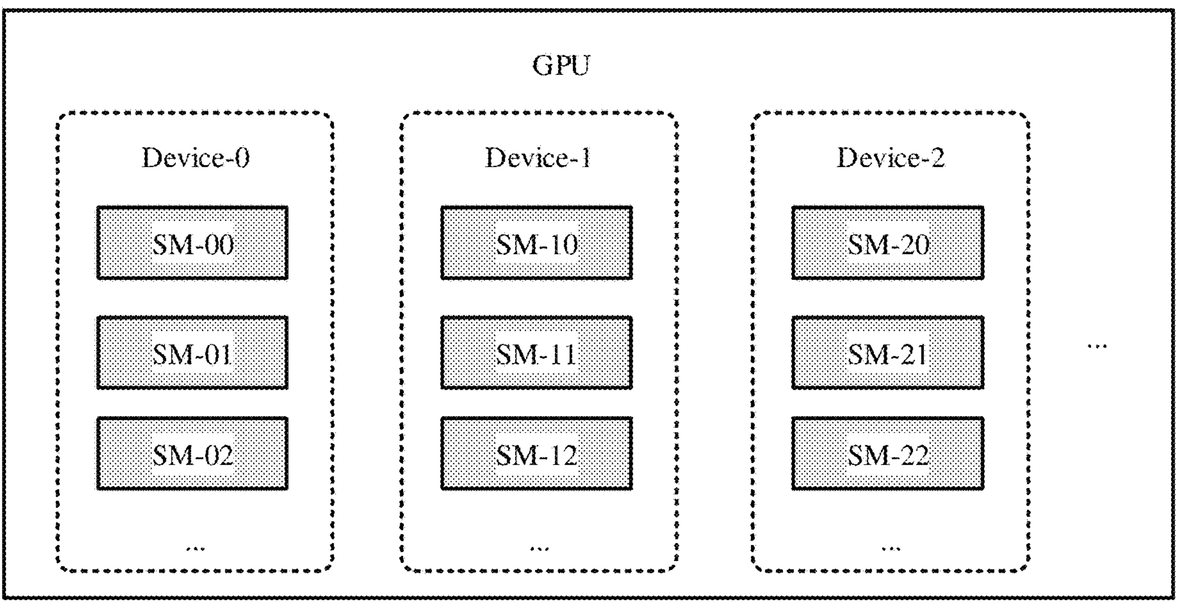
(a)
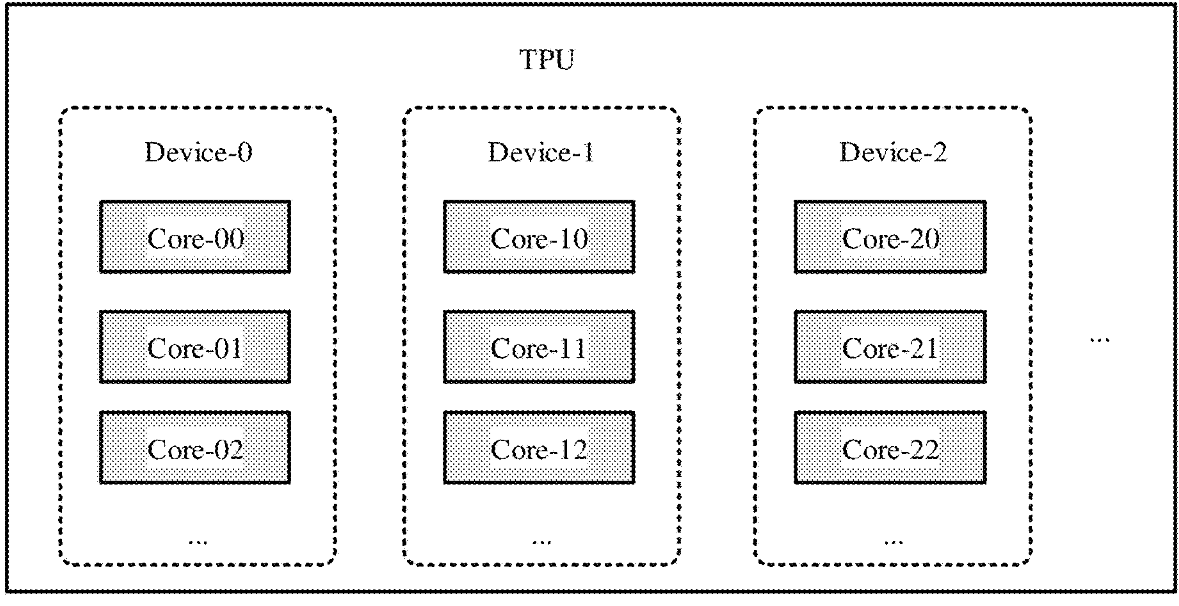
(b)
FIG. 3

First computational graph (partial)

Optimized first computational graph (partial)

```
produce T_sqrt {
  // attr [iter_var(blockIdx.x, , blockIdx.x)] thread_extent = 4
  // attr [iter_var(threadIdx.x, , threadIdx.x)] thread_extent = 256
  if ((threadIdx.x < 256)) {
    T_sqrt[threadIdx.x] = sqrt(input_2[blockIdx.x * 256 + threadIdx.x])
  }
}
```

(a) Sub-IR in which a Sqrt node is independently scheduled

```
produce T_divide_input_0_input_1 {
  // attr [iter_var(blockIdx.x, , blockIdx.x)] thread_extent = 4
  // attr [iter_var(threadIdx.x, , threadIdx.x)] thread_extent = 256
  if ((threadIdx.x < 256)) {
    T_divide_input_0_input_1[threadIdx.x] = (input_0[blockIdx.x * 256 +
threadIdx.x]/input_1[blockIdx.x * 256 + threadIdx.x])
  }
}
```

(b) Sub-IR in which a Divide node is independently scheduled

```
// attr [0] compute_scope = "Fused_Sqrt_RealDiv_parallel_compute_"
// attr [iter_var(blockIdx.x, range(min=0, ext=8), blockIdx.x)] thread_extent = 8
// attr [iter_var(threadIdx.x, range(min=0, ext=256), threadIdx.x)] thread_extent = 256
if ((blockIdx.x < 4)) {
  produce T_sqrt {
    if ((threadIdx.x < 256)) {
      T_sqrt[threadIdx.x] = sqrt(input_2[blockIdx.x * 256 + threadIdx.x])
    }
  }
} else {
  produce T_divide_input_0_input_1 {
    if ((threadIdx.x < 256)) {
      T_divide_input_0_input_1[threadIdx.x] = (input_0[(blockIdx.x - 4) * 256 +
 threadIdx.x]/input_1[(blockIdx.x - 4) * 256 + threadIdx.x])
    }
  }
}
```

(c) Total IR obtained through fusion of the Sqrt node and the Divide node

FIG. 26

NODE FUSION METHOD FOR COMPUTATIONAL GRAPH AND DEVICE

CROSS-REFERENCE TO RELATED APPLICATIONS

This application is a continuation of International Application No. PCT/CN2021/140906, filed on Dec. 23, 2021, which claims priority to Chinese Patent Application No. 202011595030.3, filed on Dec. 28, 2020. The disclosures of the aforementioned applications are hereby incorporated by reference in their entireties.

TECHNICAL FIELD

This application relates to the machine learning field, and in particular, to a node fusion method for a computational graph and a device.

BACKGROUND

A computational graph is a general computation process representation method for describing a directed acyclic graph of a function, and is generally used in various data processing platforms. One computational graph includes a plurality of nodes and directed edges. In the machine learning field, a computational graph represents computational logic related to a neural network, and each node in the computational graph represents a corresponding operation (for example, an add node represents an addition operation) performed by the neural network. The corresponding operation may also be referred to as a computational task, and one node represents one computational task. A directed edge connects a previous node (which may be referred to as a preceding node or a parent node) to a next node (which may be referred to as a following node or a child node), and indicates that output of the parent node is input for the child node.

In a deep learning framework, a specific implementation of a computational graph is usually as follows: First, a user-defined neural network is converted into a computational graph (the computational graph has been optimized). Then, computational tasks corresponding to sorted nodes are loaded, one by one according to a topological order of nodes in the computational graph, to a module device that is in acceleration hardware (for example, a graphics processing unit (GPU), a tensor processing unit (TPU), or an Ascend (for example, Ascend 910 or Ascend 310) processor) and that specifically performs the computational tasks. As shown in FIG. 1, a diagram on the left of FIG. 1 shows a computational graph, and a diagram on the right of FIG. 1 shows a topological sorting result corresponding to the computational graph. During execution of the entire neural network, due to impact of an execution sequence, each computational task on the device can start only after execution of a computational task in a previous topological order ends. This means that sorting implicitly adds an execution dependency relationship between data-independent computational tasks. As shown in FIG. 1, there is originally no explicit dependency between computational tasks corresponding to a node C and a node D. However, after topological sorting is determined, execution on the node C needs to be performed before execution on the node D. Finally, total network execution time on the device is a sum of time consumed by each independent computational task plus additional time consumed by interaction, communication, and the like.

However, as a network scale of a neural network is increasingly large (as shown in FIG. 2), a network structure of the neural network is increasingly complex. For example, a Bert-Large network model includes 1024 hidden layers, and a GPT-3 network model includes 2048 hidden layers. As a result, an increasingly strict requirement is imposed on performance of the deep learning framework. This type of network structure includes many branch structures, and the branch structures present direct or indirect computational independence. Therefore, parallel execution of the branch structures is possible. Therefore, to achieve higher execution performance, in a neural network with a plurality of branch structures, computational logic of a plurality of nodes that support parallel execution and that consume a small quantity of computing power resources is combined for execution. Currently, existing node fusion modes for a computational graph mainly include a horizontal fusion mode and an operator-level parallelism mode. The horizontal fusion mode is an optimization operation of an accelerated linear algebra (XLA) compiler for a GPU. This fusion mode is conservative in searching for nodes that support fusion. During implementation, a return node in a computational graph serves as a start point for searching backward for nodes that support fusion, a search process stops when being interrupted, and to-be-fused nodes need to have same data layouts and output data types. The operator-level parallelism mode is an optimization operation of a deep learning framework MXNet, and requires that input data of a plurality of to-be-fused nodes come from a same parent node. The existing node fusion modes for a computational graph have many constraints, and nodes that support fusion cannot be fully found. Therefore, an efficient node fusion mode for a computational graph urgently needs to be proposed.

SUMMARY

Embodiments of this application provide a node fusion method for a computational graph and a device. Compared with the conventional technology, possibilities of some other parallelizable branches are considered, so that parallelizable branch combinations different from those defined by a rule in the conventional technology are found, and nodes in the branch combinations may be fused during node fusion of a computational graph. This extends a range of nodes that support fusion and that can be obtained.

Based on this, embodiments of this application provide the following technical solutions.

According to a first aspect, an embodiment of this application first provides a node fusion method for a computational graph, which may be used in the artificial intelligence field, and may be specifically applied to a deep learning framework. The method includes: First, the deep learning framework may obtain a network structure of a neural network. The network structure may be a network structure of a neural network that is defined through an API provided by the deep learning framework, or may be a predefined network structure of a neural network that is directly obtained from a network model zoo. A specific manner of obtaining the neural network by the deep learning framework is not limited in this application. After obtaining the network structure of the neural network, the deep learning framework further converts the neural network into a computational graph, where the obtained computational graph may be referred to as a first computational graph. After obtaining the first computational graph, the deep learning framework extracts one or more parallelizable branch groups from the first computational graph based on a connection relationship between nodes in the first computational graph. Each parallelizable branch group includes a plurality of sub-branches (that is, at least two sub-branches). The sub-branch is a sequential series structure without bifurcation. Each sub-branch in each parallelizable branch group includes one or more nodes. The parallelizable branch group indicates that the plurality of sub-branches in the parallelizable branch group support parallel execution. Herein, it should be noted that sub-branches belonging to a same parallelizable branch group need to meet two conditions: First, there is no dependency relationship between sub-branches. Second, a computational graph obtained by fusing any two or more nodes belonging to different sub-branches into one node does not include a ring structure, that is, a computational graph obtained through fusion does not include a ring structure. In this embodiment of this application, at least one parallelizable branch group (which may be referred to as a first parallelizable branch group) included in the parallelizable branch group meets at least one of the following conditions: Input for all sub-branches in the first parallelizable branch group comes from a same node, and output of at least two sub-branches in the first parallelizable branch group is directed to different nodes; output of all sub-branches in the first parallelizable branch group is directed to a same node, and input for at least two sub-branches in the first parallelizable branch group comes from different nodes; none of $1^{st}$ nodes of sub-branches in the first parallelizable branch group has a parent node; or none of last nodes of sub-branches in the first parallelizable branch group has a child node. After performing the foregoing operations, the deep learning framework may obtain one or more parallelizable branch groups. For each parallelizable branch group, the deep learning framework may fuse a plurality of nodes in each parallelizable branch group that respectively belong to different sub-branches, to obtain a second computational graph. It should be noted that the one or more parallelizable branch groups described in this embodiment of this application are not limited to all parallelizable branch groups obtained based on the extraction operation, and also include branch groups that can be obtained through searching in a conventional manner. For ease of description, only a difference from a conventional search mode is described in this application. Regardless of a manner of extracting a parallelizable branch group, a plurality of nodes in each parallelizable branch group can be fused based on the fusion mode described in this application, to obtain the second computational graph.

In the foregoing embodiment of this application, a node fusion method for a computational graph is provided. Compared with the conventional technology, possibilities of some other parallelizable branches are considered, so that parallelizable branch combinations different from those defined by a rule in the conventional technology are found, and nodes in the branch combinations may be fused during node fusion of a computational graph. This extends a range of nodes that support fusion and that can be obtained.

In an embodiment, when there are a plurality of parallelizable branch groups, the parallelizable branch groups further include a second parallelizable branch group, and the second parallelizable branch group meets the following conditions: Input for all sub-branches in the second parallelizable branch group comes from a same node, output of at least two sub-branches in the second parallelizable branch group is directed to a same node, and each sub-branch in the second parallelizable branch group includes at least two nodes.

In the foregoing embodiment of this application, a manner of obtaining the parallelizable branch group based on the connection relationship between the nodes in the first computational graph may be the foregoing manner of obtaining the second parallelizable branch group, and is widely applicable.

In an embodiment, some nodes that do not support fusion or nodes that are not suitable for parallel execution may still be retained in some sub-branches in the one or more parallelizable branch groups first obtained by the deep learning framework. These nodes may be collectively referred to as nodes that do not support fusion. These nodes are retained during extraction of the parallelizable branch group to ensure integrity of branches, so that searching of branches is not interrupted by an individual node. If searching is interrupted, a node that possibly supports parallel execution is missed. After obtaining the one or more parallelizable branch groups, the deep learning framework may further eliminate a node that does not support fusion from each sub-branch in each parallelizable branch group (namely, a target parallelizable branch group), to obtain each parallelizable branch group (which may be referred to as a third parallelizable branch group) in which the node that does not support fusion has been eliminated. Any sub-branch in the target parallelizable branch group may be referred to as a target sub-branch. Then a plurality of nodes (nodes that support fusion but have not been fused, that is, to-be-fused nodes), respectively belonging to different sub-branches, in each parallelizable branch group (namely, the third parallelizable branch group) in which the node that does not support fusion has been eliminated are fused, to obtain a fusion node. The second computational graph includes the fusion node and an unfused node (the unfused node is a node that has not been fused) in the first computational graph. A sub-branch to which each of the plurality of nodes in the third parallelizable branch group belongs is different from a sub-branch to which any other one of the plurality of nodes belongs. It should be noted that, in this embodiment of this application, the node that does not support fusion may be specifically a node with an exclusive operation, for example, a used compilation suite does not provide a kernel compilation solution applicable after some nodes are fused; or may be a node with a specific operation, such as a matrix multiplication operation or a convolution operation of the neural network. Computing intensity of the operation is high. In most cases, computing power resources on a device are fully used as far as possible when the operation is performed on the device.

In the foregoing embodiment of this application, a specific manner of obtaining the second computational graph is described. To be specific, the node that does not support fusion is first eliminated from the first computational graph, and then remaining nodes that support fusion are fused to obtain the second computational graph. Because the node that does not support fusion is eliminated from the first computational graph in advance, fusion efficiency can be improved.

In an embodiment, to fuse, as far as possible, all nodes that support fusion, the foregoing process of fusing a plurality of nodes in the third parallelizable branch group that respectively belong to different sub-branches is performed iteratively. To be specific, the foregoing operation of fusing a plurality of nodes in the third parallelizable branch group that respectively belong to different sub-branches is repeatedly performed, until a quantity of unfused nodes in the third parallelizable branch group is less than 2.

In the foregoing embodiment of this application, it is ensured that nodes that support fusion can be fused into a fusion node as far as possible, so that a fusion coverage area is increased.

In an embodiment, after obtaining the third parallelizable branch group by eliminating the node that does not support fusion, the deep learning framework fuses a plurality of nodes in the third parallelizable branch group that belong to different sub-branches, to obtain a fusion node. In this process, the fusion node may be obtained based on a combination search (which may also be referred to as a parallel fusion search) mode. A principle of the combination search is as follows: In any third parallelizable branch group, each sub-branch includes one or more nodes, nodes belonging to different sub-branches may be combined into a fusion node, and nodes in a same sub-branch cannot be fused due to a connection relationship. In each third parallelizable branch group, a fusion node may be obtained based on a search algorithm. A specific search process may be as follows: First, an unfused node is selected (for example, randomly selected) from each of a plurality of sub-branches in the third parallelizable branch group, to obtain n unfused nodes, where the unfused node is a node that has not been fused, and $n \geq 2$. Then m node combinations are generated based on the selected n unfused nodes, where each of the m node combinations includes at least two unfused nodes, $m \geq 1$, and $2m \leq n$. In addition, computing power required by each of the m node combinations is assessed by using a constructed computing power assessment model, to obtain m assessment results, where each of the m assessment results represents one of the following cases: computing power resources to be consumed by each of the m node combinations, and computing power resources to be saved by each of the m node combinations. When a first assessment result meets a preset condition, a first node combination corresponding to the first assessment result is fused to obtain a first fusion node, and each unfused node in the first node combination is marked as a fused node, where the first assessment result is one of the m assessment results, and the first node combination is one of the m node combinations.

In the foregoing embodiment of this application, how to fuse nodes based on the combination search mode to obtain a fusion node is described, and the constructed computing power assessment model may be further used to guide a search for a fusion node, to ensure that a fused node combination can produce an expected gain.

In an embodiment, after an assessment result of a current round is obtained, whether the assessment result meets the preset condition may be determined, and then subsequent processing is performed based on a determining result; or after a plurality of assessment results (that is, at least two assessment results) are obtained through a plurality of rounds of searches for candidate node combinations, whether an assessment result of the plurality of assessment results meets the preset condition may be determined, and then subsequent processing is performed based on a determining result. Therefore, in this embodiment of this application, that the first assessment result meets the preset condition includes at least one of the following cases: When each of the m assessment results represents computing power resources to be consumed by each of the m node combinations, the first assessment result meets a computing power requirement of a module (device) that is in acceleration hardware and that specifically performs a computational task; when each of the m assessment results represents computing power resources to be saved by each of the m node combinations, the first assessment result is optimal among the m assessment results; or when each of the m assessment results represents computing power resources to be saved by each of the m node combinations, the first assessment result is optimal among x assessment results, where the x assessment results are at least two of the m assessment results.

As described in the foregoing embodiment of this application, there may be a plurality of specific determining manners for determining whether the first assessment result meets the preset condition. A user may select a determining manner according to a requirement of the user. This is flexible.

In an embodiment, different branch structure features in the first computational graph may be described by using three structure features, which may be respectively referred to as a multi-branch structure, a non-converging structure, and a scattered structure. The multi-branch structure is a branch structure that includes a same parent node (which may also be referred to as a common parent node, and for ease of description, is collectively referred to as the common parent node in embodiments of this application) or a same child node (which may also be referred to as a common child node, and for ease of description, is collectively referred to as the common child node in embodiments of this application). The non-converging structure is a branch structure in which a $1^{st}$ node of the branch structure has no parent node or a last node of the branch structure has no child node. Remaining nodes other than the multi-branch structure and the non-converging structure in the first computational graph may be collectively referred to as a scattered structure. Therefore, a manner of extracting the one or more parallelizable branch groups from the first computational graph based on the connection relationship between nodes in the first computational graph may be: searching the first computational graph for a plurality of branches (which may be referred to as first branches) that have a same parent node (which may be referred to as a first common parent node or a common first parent node, and for ease of description, is collectively referred to as the first common parent node in embodiments of this application), and obtaining a parallelizable branch group based on the plurality of first branches; and/or searching the first computational graph for a plurality of branches (which may be referred to as second branches) that have a same child node (which may be referred to as a first common child node or a common first child node, and for ease of description, is collectively referred to as the first common child node in embodiments of this application), and obtaining a parallelizable branch group based on the plurality of second branches. This search mode may also be referred to as a unidirectional search for a multi-branch structure.

In the foregoing embodiment of this application, a search mode for extracting the one or more parallelizable branch groups from the first computational graph based on the connection relationship between nodes in the first computational graph is described. In this search mode, searching is performed based on whether there is a common parent node or a common child node. Common parent nodes or common child nodes widely exists in a computational graph obtained through conversion from a neural network. Therefore, in this search mode, a large quantity of parallelizable branch groups can be obtained through searching.

In an embodiment, a specific implementation of obtaining, by the deep learning framework, a parallelizable branch group based on a plurality of first branches after the deep learning framework obtains the plurality of first branches may be: searching each of the plurality of first branches downward by using the first common parent node as a start point and based on a connection relationship between nodes, until another common parent node (which may be referred to as a second common parent node) or a common child node in the first computational graph is found during downward searching. Nodes traversed in each first branch during downward searching form a sub-branch. For example, if there are four first branches, four sub-branches may be obtained through downward searching. Each sub-branch may be referred to as a first sub-branch, and a plurality of obtained first sub-branches form a parallelizable branch group. For example, the four sub-branches form a parallelizable branch group. Herein, it should be noted that each of the plurality of first sub-branches does not include the first common parent node or a common child node, that is, each first sub-branch does not include the first common parent node serving as the start point. In addition, during downward searching of each first branch, if another common parent node (namely, the second common parent node) is found, the second common parent node is added to a corresponding first sub-branch; and if a common child node is found, the common child node is excluded from the corresponding first sub-branch.

In the foregoing embodiment of this application, how the deep learning framework obtains a parallelizable branch group based on a plurality of first branches is described in detail, that is, downward searching is performed by using a common parent node as a start point. In this method for extracting a parallelizable branch group by using a common parent node as a start point, it can be ensured that nodes belonging to different sub-branches in one parallelizable branch group do not have inconsistent dependency behavior. For example, a sub-branch obtained through downward searching that starts from a common parent node does not include a common child node. This can ensure that node fusion across branches does not form a ring structure. Currently, in an existing node fusion mode for a computational graph, whether a ring is formed after node fusion needs to be determined. However, determining whether a ring is formed is a complex operation. In the search mode in this embodiment of this application, it is ensured that no ring structure appears. Therefore, whether a ring is formed does not need to be additionally determined for a combination obtained each time. This simplifies an operation process.

In an embodiment, a specific implementation of obtaining, by the deep learning framework, a parallelizable branch group based on a plurality of second branches after the deep learning framework obtains the plurality of second branches may be: searching each of the plurality of second branches upward by using the first common child node as a start point and based on a connection relationship between nodes, until another common child node or common parent node in the first computational graph is found during upward searching. Nodes traversed in each second branch during upward searching form a sub-branch. For example, if there are three second branches, three sub-branches may be obtained through upward searching. Each sub-branch may be referred to as a second sub-branch, and a plurality of obtained second sub-branches form a parallelizable branch group. For example, the three sub-branches form a parallelizable branch group. Herein, it should be noted that each of the plurality of second sub-branches does not include the first common child node or a common parent node, that is, each second sub-branch does not include the first common child node serving as the start point. In addition, during upward searching of each second branch, if another common child node is found, the another common child node is added to a corresponding second sub-branch; and if a common parent node is found, the common parent node is excluded from the corresponding second sub-branch.

In the foregoing embodiment of this application, how the deep learning framework obtains a parallelizable branch group based on a plurality of second branches is described in detail, that is, upward searching is performed by using a common child node as a start point. In this method for extracting a parallelizable branch group by using a common child node as a start point, it can be ensured that nodes belonging to different sub-branches in one parallelizable branch group do not have inconsistent dependency behavior. For example, a sub-branch obtained through upward searching that starts from a common child node does not include a common parent node. This can ensure that node fusion across branches does not form a ring structure. Therefore, in the search mode in this embodiment of this application, it is also ensured that no ring structure appears, and whether a ring is formed does not need to be additionally determined for a combination obtained each time. This simplifies an operation process.

In an embodiment, a manner of extracting the one or more parallelizable branch groups from the first computational graph based on the connection relationship between nodes in the first computational graph may alternatively be: searching the first computational graph for a plurality of third branches, and obtaining a parallelizable branch group based on the plurality of third branches, where a 1$^{st}$ node in each third branch has no parent node; and/or searching the first computational graph for a plurality of fourth branches that do not include a child node, and obtaining a parallelizable branch group based on the plurality of fourth branches, where a last node in each fourth branch has no child node.

In the foregoing embodiment of this application, another search mode for extracting the one or more parallelizable branch groups from the first computational graph based on the connection relationship between nodes in the first computational graph is described. In this search mode, searching is performed based on a node that has no parent node or child node. Nodes that have no parent node or child node also widely exist in a computational graph obtained through conversion from a neural network. Therefore, in addition to the foregoing search mode based on a common parent node or a common child node, in this search mode, a large quantity of parallelizable branch groups can also be obtained through searching. This search mode may also be referred to as a unidirectional search for a non-converging structure.

In an embodiment, a specific implementation of obtaining, by the deep learning framework, a parallelizable branch group based on a plurality of third branches after the deep learning framework obtains the plurality of third branches may be as follows: First, the deep learning framework searches the first computational graph for one or more nodes that have no parent node, and searches each of the plurality of third branches downward by using the node having no parent node as a start point and based on a connection relationship between nodes, until a common parent node or a common child node in the first computational graph is found during downward searching. Nodes traversed in each third branch during downward searching form a sub-branch. For example, if there are two third branches, two sub-branches may be obtained through downward searching. Each sub-branch may be referred to as a third sub-branch, and a plurality of obtained third sub-branches form a parallelizable branch group. For example, the two sub-branches form a parallelizable branch group. Herein, it should be noted that each of the plurality of third sub-branches does not include the common child node found during downward searching, that is, each third sub-branch may include the node serving as the start point. In addition, during downward searching of each third branch, if a common parent node is found, the common parent node may be added to a corresponding third sub-branch; and if a common child node is found, the common child node is excluded from the corresponding third sub-branch.

In the foregoing embodiment of this application, how the deep learning framework obtains a parallelizable branch group based on a plurality of third branches is described in detail, that is, downward searching is performed by using a node having no parent node as a start point. In this method for extracting a parallelizable branch group by using a node having no parent node as a start point, it can also be ensured that nodes belonging to different sub-branches in one parallelizable branch group do not have inconsistent dependency behavior. For example, a sub-branch obtained through downward searching that starts from a node having no parent node does not include a common child node. This can ensure that node fusion across branches does not form a ring structure. Therefore, in the search mode in this embodiment of this application, it can also be ensured that no ring structure appears, and whether a ring is formed does not need to be additionally determined for a combination obtained each time. This simplifies an operation process.

In an embodiment, a specific implementation of obtaining, by the deep learning framework, a parallelizable branch group based on a plurality of fourth branches after the deep learning framework obtains the plurality of fourth branches may be as follows: First, the deep learning framework searches the first computational graph for one or more nodes that have no child node, and searches each of the plurality of fourth branches upward by using the node having no child node as a start point and based on a direct connection relationship between nodes, until a common parent node or a common child node in the first computational graph is found during upward searching. Nodes traversed in each fourth branch during upward searching form a sub-branch. For example, if there are four fourth branches, four sub-branches may be obtained through upward searching. Each sub-branch may be referred to as a fourth sub-branch, and a plurality of obtained fourth sub-branches form a parallelizable branch group. For example, the four sub-branches form a parallelizable branch group. Herein, it should be noted that each of the plurality of fourth sub-branches does not include the common parent node found during upward searching, that is, each fourth sub-branch may include the node serving as the start point. In addition, during upward searching of each fourth branch, if a common child node is found, the common child node may be added to a corresponding fourth sub-branch; and if a common parent node is found, the common parent node is excluded from the corresponding fourth sub-branch.

In the foregoing embodiment of this application, how the deep learning framework obtains a parallelizable branch group based on a plurality of fourth branches is described in detail, that is, upward searching is performed by using a node having no child node as a start point. In this method for extracting a parallelizable branch group by using a node having no child node as a start point, it can also be ensured that nodes belonging to different sub-branches in one parallelizable branch group do not have inconsistent dependency behavior. For example, a sub-branch obtained through upward searching that starts from a node having no child node does not include a common parent node. This can ensure that node fusion across branches does not form a ring structure. Therefore, in the search mode in this embodiment of this application, it can also be ensured that no ring structure appears, and whether a ring is formed does not need to be additionally determined for a combination obtained each time. This simplifies an operation process.

In an embodiment, because both the unidirectional search for a multi-branch structure and the unidirectional search for a non-converging structure are performed based on a direct connection relationship between nodes, a corresponding parallelizable branch group may be directly found through upward searching or downward searching. However, in the foregoing two types of searches, to avoid a complex operation of determining whether a ring is formed, a stop condition is strict. As a result, after the first computational graph is processed based on the foregoing search modes, some nodes that possibly support parallel execution are still scattered in the first computational graph, and these nodes may be referred to as scattered nodes. These scattered nodes may be independent nodes that are missed when preceding and following nodes are added to a parallelizable branch group, or may be some nodes with special node structures, for example, a local rhombic structure, to be specific, a structure that starts from one node and then may experience multi-level branching but finally converges to another node. These scattered nodes are missed due to their special structures, locations, or other factors, or are discarded because a related branch does not include an effective node. This type of node structure may be referred to as a scattered structure. Compared with searching directly performed based on a connection relationship between nodes, searching for nodes that support parallel execution in the scattered structure has higher costs. In addition, to ensure effectiveness of parallelism, whether a ring is formed further needs to be determined. Therefore, in this case, a manner of extracting the one or more parallelizable branch groups from the first computational graph based on the connection relationship between nodes in the first computational graph may alternatively be: determining, from the first computational graph, a target node that does not belong to any parallelizable branch group; when the target node is not anode that does not support fusion, simplifying a local structure around the target node to obtain a fifth branch; and then, when there are a plurality of fifth branches, obtaining a parallelizable branch group based on the plurality of fifth branches. This search mode may also be referred to as an acyclic search for a scattered structure.

In the foregoing embodiment of this application, another search mode for extracting the one or more parallelizable branch groups from the first computational graph based on the connection relationship between nodes in the first computational graph is described. In this search mode, searching is performed based on a scattered structure. This search mode is a supplementary search mode for the foregoing two modes. In this search mode, nodes in the first computational graph that support fusion can be found to a maximum extent, so that a search range is wider.

In an embodiment, after obtaining the second computational graph, the deep learning framework may further compile the second computational graph to obtain a compiled second computational graph. The compiled second computational graph may be directly loaded to target acceleration hardware for execution. A process of compiling the second computational graph includes two parts. One part is ordinary node compilation. To be specific, an unfused node (including a node that does not support fusion and a node that has not been fused) is compiled. The other part is fusion node compilation. To be specific, a fusion node is compiled to obtain a kernel corresponding to the fusion node.

As described in the foregoing embodiment of this application, the process of compiling the second computational graph further includes a process of compiling the fusion node, and is implementable.

In an embodiment, to retain parallelism between nodes preceding the fusion node, in this application, when the fusion node is compiled to generate the kernel, the kernel is generated through staged combination, and code segments retain clear independence through code branching. In the staged combination, IR generation is divided into two stages: (1) Each node is independently scheduled to obtain sub-IRs whose quantity is equal to a quantity of nodes in a first stage. (2) Then the sub-IRs are fused and modified to obtain a total IR in a second stage. Specifically, assuming that a fusion node is obtained by fusing p nodes, a manner of compiling the fusion node to obtain a corresponding kernel may be specifically as follows: First, the p nodes are independently scheduled to obtain p sub-IRs. Then the p sub-IRs are fused to obtain a total IR. Finally, the total IR is compiled to obtain a kernel corresponding to the fusion node.

In the foregoing embodiment of this application, scheduling analysis is independently performed on each node. This improves flexibility of fusion, and ensures that code of the fusion node is correctly generated. In addition, parallelism is still retained between generated kernels, and corresponding target acceleration hardware is allowed to perform further parallel optimization.

In an embodiment, the deep learning framework may be an AI framework in a plurality of specific representation forms, for example, may be a mainstream deep learning framework such as MindSpore, TensorFlow, TensorNetwork, PyTorch, MXNet, Caffe, or Theano, or may be another special deep learning framework. Provided that the deep learning framework can perform processing processes of optimization and compilation on a computational graph, the deep learning framework can be considered as the deep learning framework in this embodiment of this application. A representation form of the deep learning framework is not specifically limited in this application.

In the foregoing embodiment of this application, several common specific representation forms of the deep learning framework are described, and are widely applicable.

A second aspect of embodiments of this application provides a deep learning framework. The deep learning framework has a function of implementing the method in any one of the first aspect or the possible implementations of the first aspect. The function may be implemented by hardware, or may be implemented by hardware executing corresponding software. The hardware or the software includes one or more modules corresponding to the function.

A third aspect of embodiments of this application provides a computer device. The computer device may include a memory, a processor, and a bus system. The memory is configured to store a program. The processor is configured to invoke the program stored in the memory, to perform the method in any one of the first aspect of embodiments of this application or the possible implementations of the first aspect.

A fourth aspect of this application provides a computer-readable storage medium. The computer-readable storage medium stores instructions. When the instructions run on a computer, the computer is enabled to perform the method in any one of the first aspect or the possible implementations of the first aspect.

A fifth aspect of embodiments of this application provides a computer program or a computer program product. When the computer program or the computer program product runs on a computer, the computer is enabled to perform the method in any one of the first aspect or the possible implementations of the first aspect.

A sixth aspect of embodiments of this provides a chip. The chip includes at least one processor and at least one interface circuit. The interface circuit is coupled to the processor. The at least one interface circuit is configured to perform a receiving function and a sending function, and send an instruction to the at least one processor. The at least one processor is configured to run a computer program or an instruction, and has a function of implementing the method in any one of the first aspect or the possible implementations of the first aspect. The function may be implemented by hardware, software, or a combination of hardware and software. The hardware or the software includes one or more modules corresponding to the function. In addition, the interface circuit is configured to communicate with a module other than the chip. For example, the interface circuit may send a second computational graph obtained by the processor in the chip to target acceleration hardware (for example, a CPU, an NPU, a GPU, a TPU, an ASIC, or an FPGA).

BRIEF DESCRIPTION OF DRAWINGS

FIG. 3 is a schematic diagram of a structure of devices and computing units that are included in different acceleration hardware according to an embodiment of this application;

FIG. 26 shows another specific code example of staged combination according to an embodiment of this application;

DESCRIPTION OF EMBODIMENTS

Figures 1, 2:
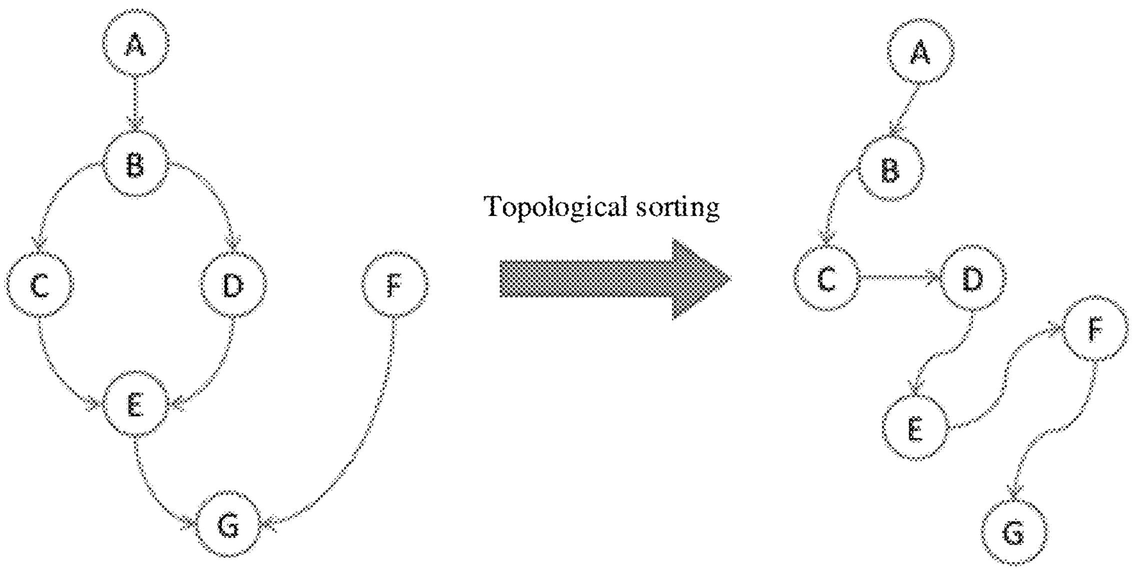
FIG. 1 is a schematic diagram of topological sorting for a computational graph.
FIG. 2 is a schematic diagram of network scales of different types of neural networks.

Embodiments of this application provide a node fusion method for a computational graph and a device. Compared with the conventional technology, possibilities of some other parallelizable branches are considered, so that parallelizable branch combinations different from those defined by a rule in the conventional technology are found, and nodes in the branch combinations may be fused during node fusion of a computational graph. This extends a range of nodes that support fusion and that can be obtained.

In the specification, claims, and accompanying drawings of this application, the terms "first", "second", and the like are intended to distinguish between similar objects but do not necessarily indicate a specific order or sequence. It should be understood that the terms used in this way are interchangeable in proper circumstances and are merely intended for distinguishing when objects having a same attribute are described in embodiments of this application. In addition, the terms "include", "have", and any variants thereof are intended to cover a non-exclusive inclusion, so that a process, method, system, product, or device that includes a list of units is not necessarily limited to those units, but may include other units that are not expressly listed or are inherent to the process, method, product, or device.

Embodiments of this application relate to a lot of knowledge about a neural network, a computational graph, and the like. To better understand solutions in embodiments of this application, the following first describes related terms and concepts that may be included in embodiments of this application. It should be understood that explanations of related concepts may be limited due to specific cases of embodiments of this application, but this does not mean that this application is limited to the specific cases. Specific cases in different embodiments may also vary. This is not specifically limited herein.

(1) Neural Network

A neural network may include neural cells, and may be specifically understood as a neural network including an input layer, a hidden layer, and an output layer. Usually, a 1st layer is the input layer, a last layer is the output layer, and intermediate layers are all hidden layers. A neural network including many hidden layers is referred to as a deep neural network (DNN). Work at each layer of the neural network may be described by using a mathematical expression $\vec{y}=a(W\cdot\vec{x}+b)$. From a physical perspective, work at each layer of the neural network may be understood as performing transformation from input space to output space (that is, from row space of a matrix to column space of the matrix) through five operations on the input space (a set of input vectors). The five operations include: 1. dimension expansion/compression; 2. scaling up/down; 3. rotation; 4. translation; and 5. "nonlinear mapping". The operations 1, 2, and 3 are performed by "$W\cdot\vec{x}$", the operation 4 is performed by "+b", and the operation 5 is implemented by "a( )". The word "space" is used herein for expression because a categorized object is not a single object but a type of object, and the space is a set of all individuals of this type of object, where W is a weight matrix of each layer of the neural network, and each value in the matrix represents a weight value of a neuron of the layer. The matrix W determines the foregoing spatial transformation from the input space to the output space, that is, W of each layer of the neural network controls a manner of spatial transformation. An objective of training a neural network is to finally obtain weight matrices of all layers of a trained neural network. Therefore, a neural network training process is essentially to learn a manner of controlling spatial transformation, more specifically, to learn a weight matrix.

(2) Computational Graph

A computational graph is a general computation process representation method for describing a directed acyclic graph of a function, and is generally used in various data processing platforms. One computational graph includes a plurality of nodes and directed edges.

In the machine learning field, in a neural network, one or more neural network layers (for example, a hidden layer and an output layer) are used to generate output for received input, output of each hidden layer is used as input for a next layer (for example, a next hidden layer or the output layer of the neural network), and each layer of the neural network generates output for received input based on a current value of a current related parameter (for example, a weight) of the layer. Therefore, in the machine learning field, a computational graph represents computational logic related to a neural network, and each node in the computational graph represents a corresponding operation (for example, an add node represents an addition operation) performed by the neural network. The corresponding operation may also be referred to as a computational task, and one node represents one computational task. An arrow direction of a directed edge indicates a data flow direction. A directed edge with an arrow connects a previous node (which may be referred to as a preceding node or a parent node) to a next node (which may be referred to as a following node or a child node), and indicates that output of the parent node is input for the child node.

As shown in a diagram on the left of FIG. 1, a node to which an arrow in a line segment with the arrow points is a child node of a node to which a tail of the line segment is connected, and the node to which the tail of the line segment is connected is a parent node of the node to which the arrow of the line segment points. For example, a node B in the diagram on the left of FIG. 1 is a child node of a node A, and the node B is also a parent node of a node C and a node D. In addition, if output of a node is input for different nodes, the node is referred to as a same parent node (which may also be referred to as a common parent node, and for ease of description, is collectively referred to as the common parent node in embodiments of this application) of the different nodes. For example, the node B in the diagram on the left of FIG. 1 is a parent node of both the node C and the node D, and in this case, the node B is referred to as a common parent node of the node C and the node D. Similarly, if input for a node is output of different nodes, the node is referred to as a same child node (which may also be referred to as a common child node, and for ease of description, is collectively referred to as the common child node in embodiments of this application) of the different nodes. For example, a node E in the diagram on the left of FIG. 1 is a child node of both the node C and the node D, and in this case, the node E is referred to as a common child node of the node C and the node D.

It should be noted that, in embodiments of this application, a process of searching a computational graph includes a downward search and an upward search. A downward search process is a process of performing searching based on an arrow direction (to be specific, a direction indicated by an arrow) of a directed edge in the computational graph by using a selected node as a start point. An upward search process is a process of performing searching based on an opposite direction of an arrow direction (to be specific, a direction indicated by a tail of an arrow) of a directed edge in the computational graph by using a selected node as a start point.

(3) Node Fusion for a Computational Graph

Node fusion for a computational graph means integrating computational logic of two or more nodes in the computational graph to obtain a new node, where the new node is referred to as a fusion node. Anode that has been fused may be referred to as a to-be-fused node or an unfused node before fusion, to be specific, a node that supports fusion but is in an unfused state. Input for the new node is a set of input for to-be-fused nodes, and output of the new node includes output of the to-be-fused nodes. Through node fusion, computational tasks corresponding to the nodes may be integrated into one computational task, and the computational task is loaded to a specific computational task module (the module may be referred to as a device) in corresponding acceleration hardware for execution. In embodiments of this application, there are also some nodes that are not suitable for fusion or nodes that cannot be fused, and these nodes may be collectively referred to as nodes that do not support fusion.

(4) Acceleration Hardware and Device

Acceleration hardware may also be referred to as a hardware accelerator, a hardware acceleration chip, or the like. As a network scale of a neural network is increasingly large, a network structure of the neural network is increasingly complex. To carry massive computational tasks, dedicated computing acceleration hardware, such as a GPU, a TPU, and an Ascend (for example, Ascend 910 or Ascend 310) processor, emerges correspondingly. The acceleration hardware enhances a capability of intensive computing, and has increasingly large parallel computing space in an initial design stage or during evolution.

Specifically, a compiled computational graph of a neural network is executed by a device that is in the acceleration hardware and that specifically performs a computational task. Generally, each piece of acceleration hardware includes one or more devices. A larger quantity of devices indicates a stronger parallel computing capability of the acceleration hardware. Each device is further divided into one or more small computing units. Different types of acceleration hardware such as the GPU and the TPU include different quantities of devices, and computing units included in devices in different acceleration hardware are slightly different. For example, a computing unit included in a device in the GPU is a basic execution unit (streaming multiprocessor, SM), as shown in a schematic sub-diagram (a) in FIG. 3; and a computing unit included in the TPU (or the Ascend processor) is a computing core, as shown in a schematic sub-diagram (b) in FIG. 3. It should be noted that quantities of devices included in the GPU and the TPU and a quantity of SMs or cores included in each device in FIG. 3 are merely examples, and detailed examples are not described herein. As shown in Table 1, GPUs, DPUs, and Ascend processors of different models include a large quantity of SMs or cores, and a quantity of computing units that support parallel execution is increasing.

TABLE 1

Quantities of computing units in different acceleration hardware that support parallel execution

| Hardware | Model | Quantity of computing units that support parallel execution |
|---|---|---|
| GPU | P100 | 56 (SMs) |
| | V100 | 84 (SMs) |
| | A100 | 128 (SMs) |
| TPU | v2 | 8/32/128/256/512 (cores) |
| | v3 | 8/32/128/256/512/1024/2048 (cores) |
| Ascend processor | Cloud 1980 | 32 (cores) |
| . . . | . . . | . . . |

(5) Intermediate Representation (IR) and Operator Kernel (Kernel)

An IR is an intermediary for translation between source code and object code during program compilation. According to principles and knowledge of compilation, a compiler first translates source code into an "intermediate language" and then translates the "intermediate language" into object code, instead of directly translating the source code into the object code. Therefore, a compilation process of the compiler is usually divided into a front end and a back end. At the front, lexical analysis, syntax analysis, semantic analysis, and the like are performed on input source code, and then an intermediate representation (IR) is generated. At the back end, the IR is optimized, and object code is generated, where the object code may be directly run on a target device (for example, various acceleration hardware).

In the deep learning field, after a neural network is converted into a computational graph, a computational task represented by a node in the computational graph may be considered as source code. After each node in the computational graph is scheduled, an IR corresponding to the node may be obtained. Then each IR is compiled to obtain object code corresponding to each node. The object code is referred to as a kernel. The generated kernel may be identified by corresponding acceleration hardware, and is executed by a device that is in the corresponding acceleration hardware and that specifically performs a computational task.

Figure 4:
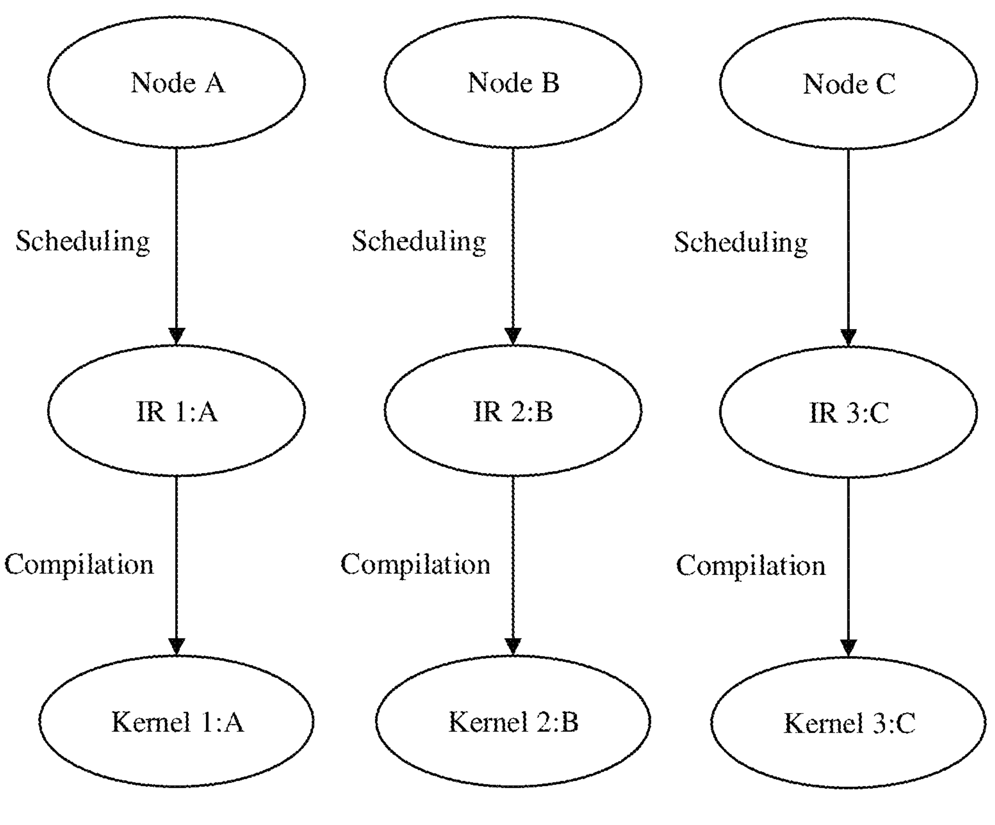
FIG. 4 is a schematic diagram of a compilation process (ordinary node compilation) of a plurality of nodes in a computational graph of a neural network according to an embodiment of this application.

For ease of understanding, an example is used below for description. FIG. 4 is a schematic diagram of a compilation process of a plurality of nodes in a computation diagram of a neural network according to an embodiment of this application. In FIG. 4, three nodes are shown as an example. A compiler (which may also be referred to as an encoder) first separately schedules a node A, a node B, and a node C to obtain intermediate representations IR 1, IR 2, and IR 3 respectively corresponding to the three nodes; and then further compiles the IR 1, the IR 2, and the IR 3 to obtain a kernel 1, a kernel 2, and a kernel 3 respectively corresponding to the node A, the node B, and the node C. The obtained three kernels may be directly sequentially loaded to a device in corresponding acceleration hardware, and computing units (such as SMs or cores) in the device sequentially execute corresponding kernels.

(6) Accelerated Linear Algebra (XLA) Compiler

The XLA compiler is a linear algebra compiler for a specific field, and can speed up operating of a TensorFlow model, possibly without changing source code. The TensorFlow model is a common deep learning framework.

(7) Automatic Operator Kernel Generator (AKG)

The AKG is a common compiler in a deep learning framework and is an automatic generator for a kernel in a neural network.

In addition, before embodiments of this application are described, current common modes of node fusion in a computational graph of a neural network are briefly described, to facilitate subsequent understanding of embodiments of this application.

Figure 5:
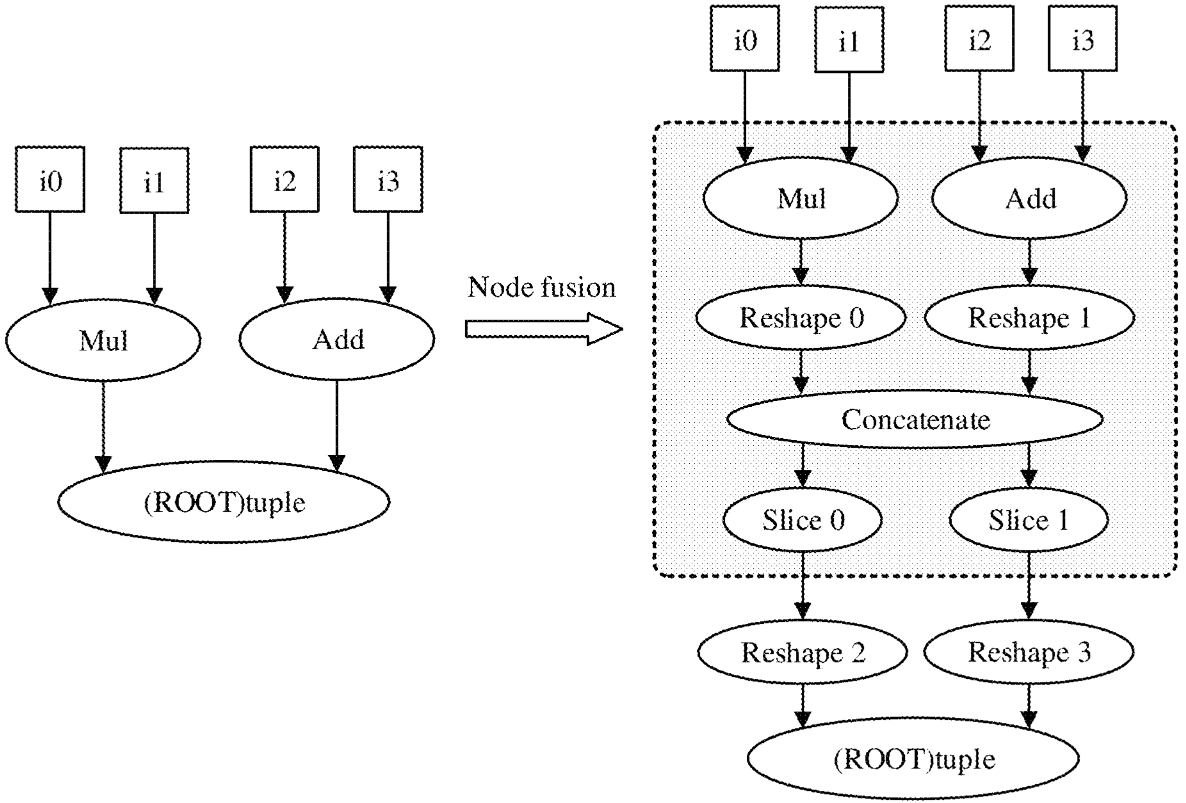
FIG. 5 is a schematic diagram of a horizontal fusion mode.

Currently, existing node fusion modes for a computational graph include a horizontal fusion (horizontal fusion) mode and an operator-level parallelism (operator level parallelism) mode. The horizontal fusion mode is an optimization operation of the XLA for a GPU. After the optimization operation is enabled, many small kernels (for example, operations, such as multiplication and addition, performed for updating a training parameter of a neural network) in the computational graph are fused. FIG. 5 is a schematic diagram of the horizontal fusion mode. During implementation, to ensure that no ring structure is introduced, in this mode, upward searching for input nodes starts from a return node (that is, a (ROOT)tuple node in a diagram on the left of FIG. 5) in the computational graph, and nodes that meet a fusion condition are fused. As shown in a diagram on the right of FIG. 5, a Mul node and an Add node are found through upward searching that starts from the (ROOT)tuple node, and then an operation similar to Reshape, Concatenate, or Slice is added to fuse the two nodes into a new node.

Figure 6:
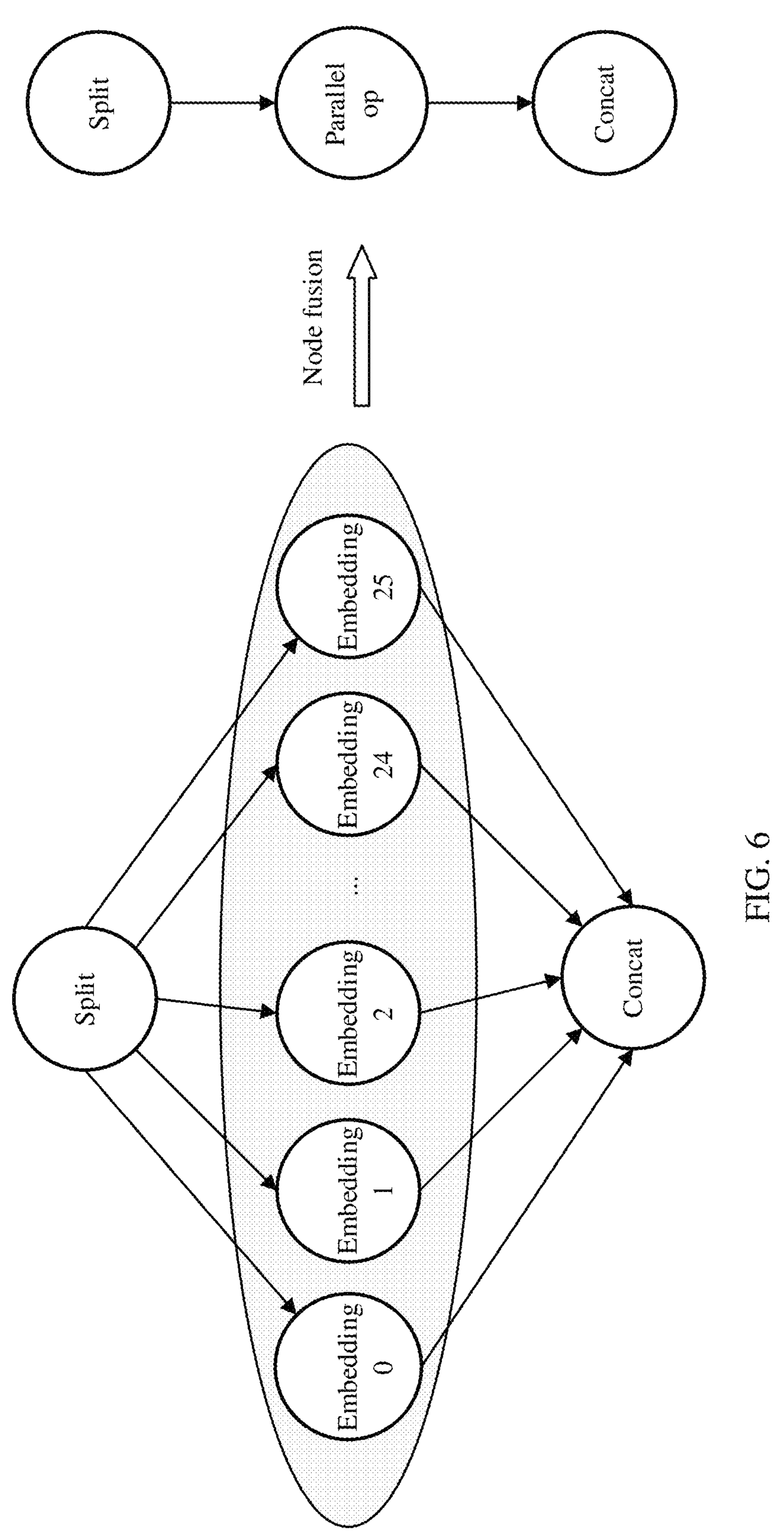
FIG. 6 is a schematic diagram of an operator-level parallelism mode.

The operator-level parallelism mode is an optimization operation of the deep learning framework MXNet. During implementation, all child nodes that have a common parent node are identified and fused into a new node. The child nodes have the common parent node and each correspond to an independent computational task. Therefore, the new node generated through fusion presents a parallelism characteristic of the child nodes. FIG. 6 is a schematic diagram of the operator-level parallelism mode. Specifically, based on a Split node in a diagram on the left of FIG. 6, child nodes Embedding 0 to Embedding 25 of the Split node are found, and are fused into a Parallel OP node in diagram on the right of FIG. 6. In a similar manner, nodes that meet this feature are processed in the entire computational graph. In this way, optimization of the computational graph is completed.

It can be learned from the foregoing descriptions that the horizontal fusion mode has the following limitations during implementation: (1) A manner of searching for nodes that support fusion is quite conservative. During implementation, the return node in the computational graph serves as a start point for searching backward for nodes that support fusion (that is, the searching is performed only on the (ROOT)tuple node), and a search process stops when being interrupted, and the search process stops once an interruption occurs. (2) To-be-fused nodes need to have same data layouts and output data types. The operator-level parallelism mode has the following limitations during implementation: It is required that input data of a plurality of to-be-fused nodes come from a common parent node. In other words, it is required that the to-be-fused nodes (for example, Embedding nodes in FIG. 6) be directly connected to the common parent node (for example, the Split node in FIG. 6).

The existing node fusion modes for a computational graph have many constraints, and nodes that support fusion cannot be fully found. Therefore, how to increase a coverage area and reduce limitations for searching for nodes that support fusion in a computational graph becomes an issue that urgently needs to be addressed. Based on this, embodiments of this application provide a node fusion method for a computational graph. In the method, a parallelizable branch group is searched for only based on a connection relationship between nodes in a computational graph, and a search process is not interrupted by an individual node that does not support fusion. This increases a hit rate during searching for nodes that support fusion in a neural network.

The following describes embodiments of this application with reference to accompanying drawings. A person of ordinary skill in the art can know that technical solutions provided in embodiments of this application are also applicable to similar technical problems with development of technologies and emergence of new scenarios.

Figure 7:
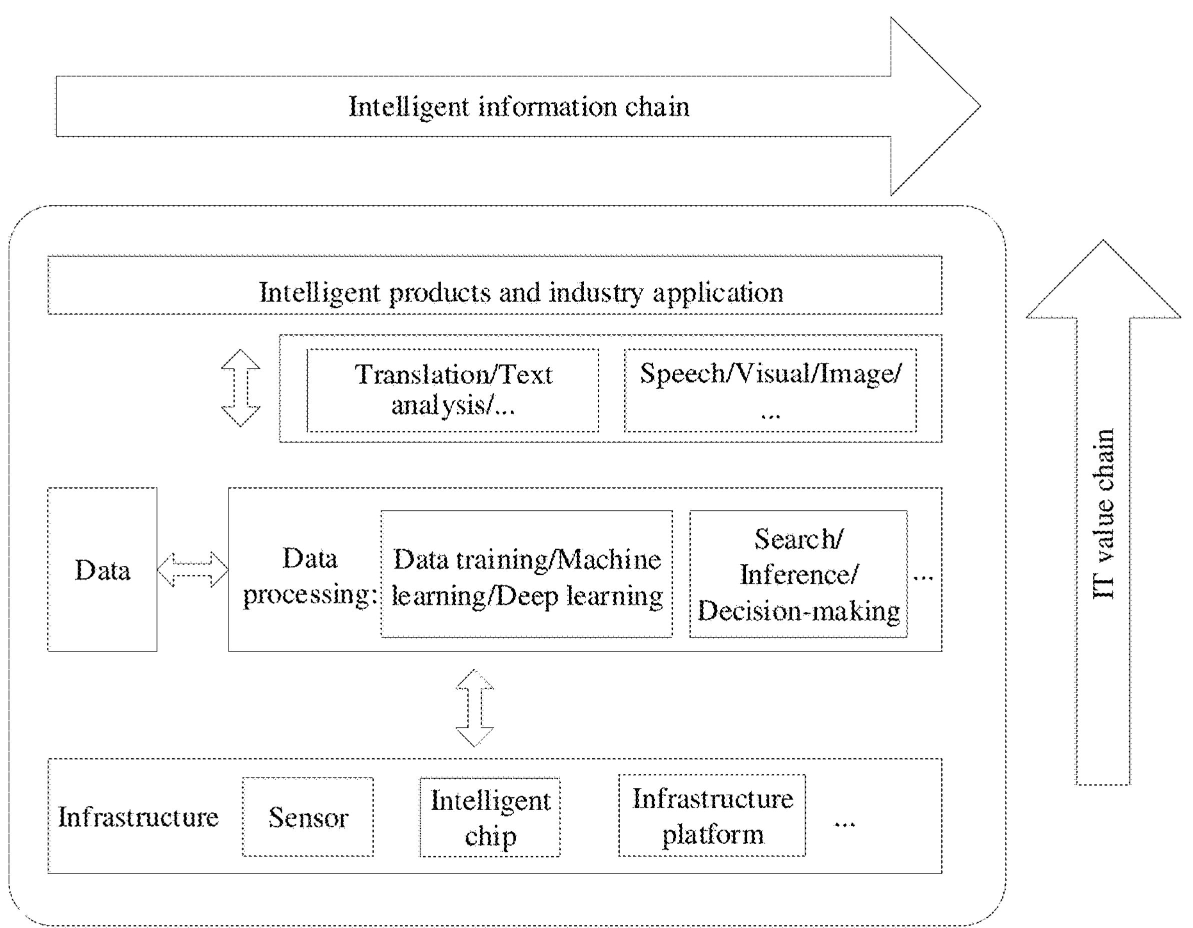
FIG. 7 is a schematic diagram of a structure of a main artificial intelligence framework according to an embodiment of this application.

First, an overall operating process of an artificial intelligence system is described. FIG. 7 is a schematic diagram of a structure of a main artificial intelligence framework. The following describes the main artificial intelligence framework from two dimensions: "intelligent information chain" (a horizontal axis) and "IT value chain" (a vertical axis). The "intelligent information chain" indicates a process from data obtaining to data processing. For example, the "intelligent information chain" may be a general process of intelligent information perception, intelligent information representation and formation, intelligent reasoning, intelligent decision-making, and intelligent execution and output. In this process, data undergoes a refining process of "data—information—knowledge—intelligence". The "IT value chain" is an industrial ecological process from underlying infrastructure of artificial intelligence to information (providing and processing technical implementations) to a system, and indicates value brought by artificial intelligence to the information technology industry.

(1) Infrastructure

Infrastructure provides computing capability support for the artificial intelligence system, to communicate with the outside world and implement support by using an infrastructure platform. Communication with the outside is performed through a sensor. A computing capability is provided by an intelligent chip (which may also be referred to as an AI chip), for example, a hardware acceleration chip such as a CPU, an NPU, a GPU, a TPU, an ASIC, or an FPGA. In embodiments of this application, the intelligent chip also includes an Ascend series (for example, Ascend 910 or Ascend 310) processor. The infrastructure platform includes platform assurance and support related to a distributed computing framework, a network, and the like, and may include cloud storage and computing, an interconnection network, and the like. For example, the sensor communicates with the outside to obtain data, and the data is provided for an intelligent chip in a distributed computing system provided by the infrastructure platform to perform computation.

(2) Data

Data at an upper layer of the infrastructure indicates a data source in the artificial intelligence field. The data relates to graphics, images, speech, and text, and further relates to internet of things data of conventional devices, and includes service data of a conventional system and perception data such as force, displacement, a liquid level, temperature, and humidity.

(3) Data Processing

Data processing usually includes data training, machine learning, deep learning, searching, reasoning, decision-making, and other methods.

The machine learning and the deep learning may be used for performing symbolic and formal intelligent information modeling, extraction, preprocessing, training, and the like on data.

The reasoning is a process of performing machine thinking and solving problems by simulating an intelligent reasoning mode of humans in a computer or intelligent system by using formal information and according to a reasoning control policy. Typical functions are searching and matching.

The decision-making is a process of performing decision-making after performing reasoning on intelligent information, and usually provides classification, sorting, prediction, and other functions.

(4) General Capabilities

After data undergoes the foregoing data processing, some general capabilities may be further formed based on a data processing result. For example, the general capabilities may be an algorithm or a general system, for example, translation, text analysis, computer vision processing, speech recognition, and image recognition.

(5) Intelligent Products and Industry Application

Intelligent products and industry application are products and application of the artificial intelligence system in various fields, are obtained by encapsulating an overall artificial intelligence solution, and implement productization and practical application of information decision-making. Application fields of the artificial intelligence system include intelligent terminals, intelligent manufacturing, intelligent transportation, smart home, intelligent healthcare, intelligent security protection, autonomous driving, safe city, and the like.

This application may be applied to various fields in the artificial intelligence field, for example, the computer vision field (for example, the image processing field) and the semantic analysis field. Specifically, with reference to FIG. 7, the node fusion method for a computational graph in embodiments of this application is a specific data processing method in "(3) Data processing". The node fusion method for a computational graph is applied to a deep learning framework. The deep learning framework fuses nodes in a computational graph that support fusion, to obtain a fusion node. A compiler in the deep learning framework processes the obtained fusion node and an ordinary node (namely, an unfused node) into a kernel that can be identified by an intelligent chip (for example, acceleration hardware such as a GPU or a TPU). Finally, a device in corresponding acceleration hardware specifically executes each kernel.

Figure 8:
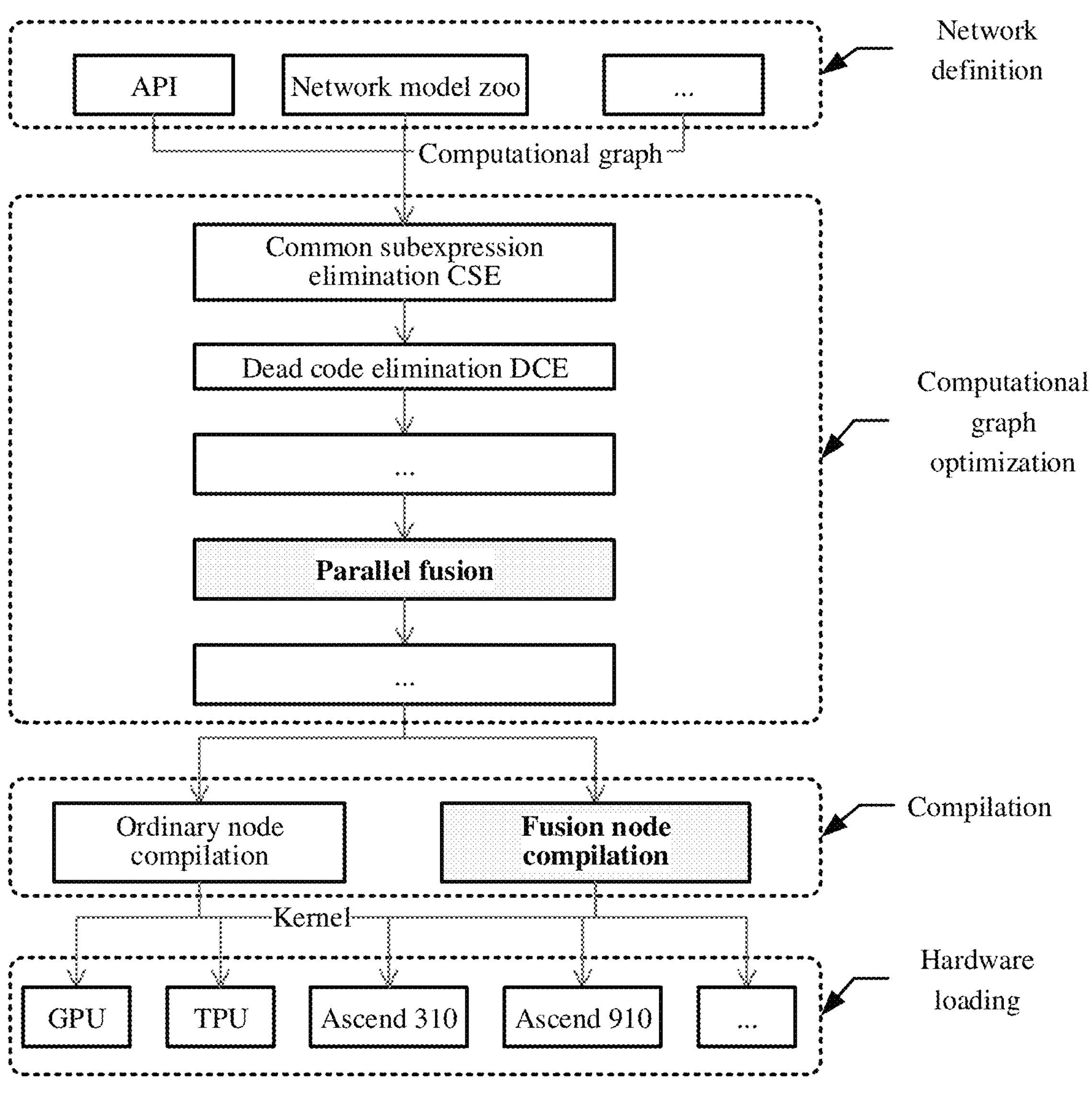
FIG. 8 is a processing flowchart of processing a computational graph by a deep learning framework according to an embodiment of this application.

The node fusion method for a computational graph in embodiments of this application is applied to the deep learning framework. Therefore, the deep learning framework in this application is described before embodiments of this application are described. FIG. 8 is a processing flowchart of processing a computational graph by a deep learning framework according to an embodiment of this application. A process of processing the computational graph by the deep learning framework may be mainly divided into four operations: network definition, computational graph optimization, compilation, and hardware loading, which are separately described below.

(1) Network Definition

A user defines a network structure of a neural network through an application programming interface (API) provided by the deep learning framework, or directly obtains a predefined network structure of a neural network from a network model zoo.

(2) Computational Graph Optimization

After the network structure of the neural network is converted into an original computational graph, the computational graph is optimized through optimization operations such as common subexpression elimination (CSE) and dead code elimination (DCE). The computational graph is modified and optimized sequentially through the optimization operations, to obtain an optimized computational graph.

In embodiments of this application, an additional optimization operation of parallel fusion is added, to fuse nodes in the computational graph that possibly support parallel execution (namely, nodes that support fusion), to obtain a fusion node.

(3) Compilation

After the foregoing computational graph optimization is performed, a compiler in the deep learning framework compiles, based on each node (including the fusion node) in the computational graph, a kernel required by an acceleration hardware series.

Herein, it should be noted that different compilers are used based on different types of deep learning frameworks. For example, common compilers in mainstream deep learning frameworks include an AKG, an LLVM (low level virtual machine), and the like. The LLVM is a framework system of an architecture compiler, is compiled in C++, is used to optimize compilation time, link time, run-time, and idle time of a program written in any programming language, is open to developers, and is compatible with existing scripts.

In embodiments of this application, ordinary node compilation and fusion node compilation are distinguished during compilation. Ordinary node compilation is to compile an unfused node in a computational graph, and is similar to a conventional compilation process. Fusion node compilation is to compile each obtained fusion node, and a compilation process is different from a conventional ordinary node compilation process.

(4) Hardware Loading

After the foregoing nodes (including the ordinary node and the fusion node) are compiled, a kernel corresponding to each node may be obtained. Each kernel may be loaded to corresponding acceleration hardware (for example, a GPU, a TPU, Ascend 910, or Ascend 310), and a device in the corresponding acceleration hardware specifically performs a computational task of each node. The acceleration hardware has functions, such as memory allocation, data copy, and device management, related to the corresponding acceleration hardware.

It should be noted that, in some embodiments of this application, the deep learning framework may be an AI framework in a plurality of specific representation forms, for example, may be a mainstream deep learning framework such as MindSpore, TensorFlow, TensorNetwork, PyTorch, MXNet, Caffe, or Theano, or may be another special deep learning framework. Provided that the deep learning framework can perform processing processes of optimization and compilation on a computational graph, the deep learning framework can be considered as the deep learning framework in embodiments of this application. A representation form of the deep learning framework is not specifically limited in this application.

Figure 9:
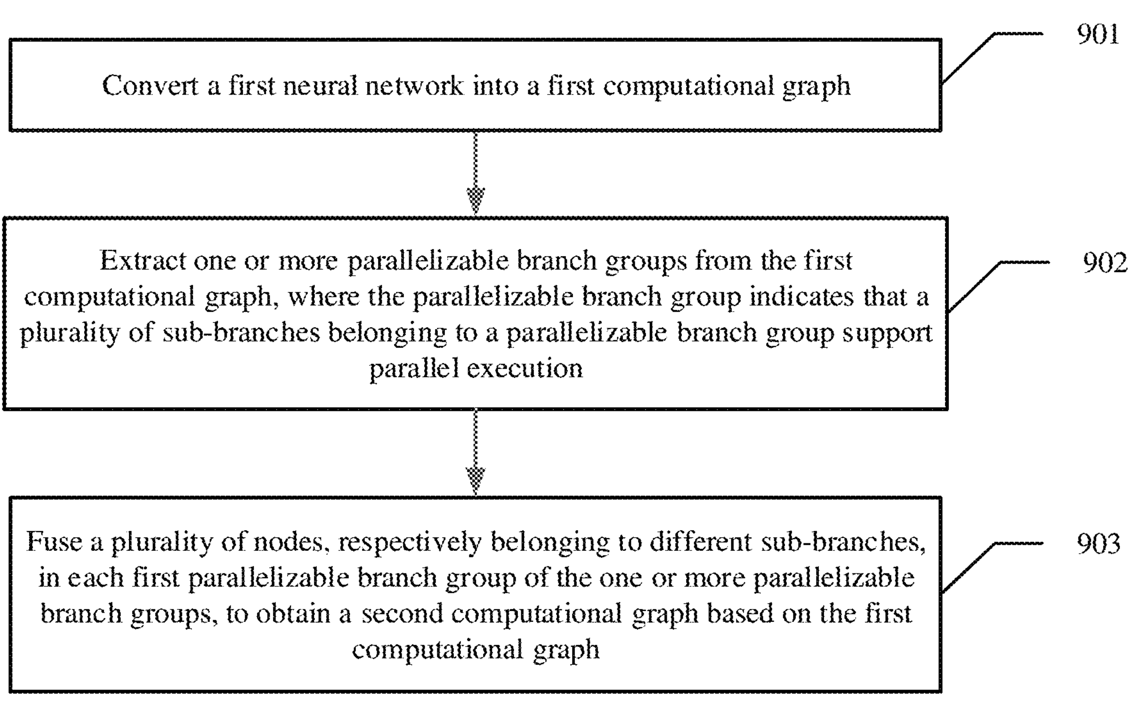
FIG. 9 is a schematic flowchart of a node fusion method for a computational graph according to an embodiment of this application.

The following describes the node fusion method for a computational graph in embodiments of this application. FIG. 9 is a schematic flowchart of a node fusion method for a computational graph according to this application. The method may be applied to the foregoing deep learning framework. The method may include the following operations.

Operation 901: Convert a first neural network into a first computational graph.

First, the deep learning framework may obtain a network structure of a neural network. The network structure may be a network structure of a neural network that is defined through an API provided by the deep learning framework, or may be a predefined network structure of a neural network that is directly obtained from a network model zoo (model zoo). A specific manner of obtaining the neural network by the deep learning framework is not limited in this application.

After obtaining the network structure of the neural network, the deep learning framework further converts the neural network into a computational graph, where the obtained computational graph may be referred to as a first computational graph.

Operation 902: Extract one or more parallelizable branch groups from the first computational graph, where the parallelizable branch group indicates that a plurality of sub-branches belonging to a parallelizable branch group support parallel execution.

After obtaining the first computational graph, the deep learning framework extracts one or more parallelizable branch groups from the first computational graph based on a connection relationship between nodes in the first computational graph. Each parallelizable branch group includes a plurality of sub-branches (that is, at least two sub-branches). The sub-branch is a sequential series structure without bifurcation. Each sub-branch in each parallelizable branch group includes one or more nodes. The parallelizable branch group indicates that the plurality of sub-branches in the parallelizable branch group support parallel execution. Herein, it should be noted that sub-branches belonging to a same parallelizable branch group need to meet two conditions: First, there is no connection relationship between sub-branches. Second, a computational graph obtained by fusing any two or more nodes belonging to different sub-branches into one node does not include a ring structure, that is, a computational graph obtained through fusion does not include a ring structure. In addition, the connection relationship between nodes in the first computational graph indicates an execution sequence that needs to be ensured between some nodes during specific data execution. An execution process of operation 902 may be referred to as network branch extraction. It should be further noted that, in this embodiment of this application, at least one parallelizable branch group (which may be referred to as a first parallelizable branch group) included in the parallelizable branch group meets at least one of the following conditions: Input for all sub-branches in the first parallelizable branch group comes from a same node, and output of at least two sub-branches in the first parallelizable branch group is directed to different nodes; output of all sub-branches in the first parallelizable branch group is directed to a same node, and input for at least two sub-branches in the first parallelizable branch group comes from different nodes; none of $1^{st}$ nodes of sub-branches in the first parallelizable branch group has a parent node; or none of last nodes of sub-branches in the first parallelizable branch group has a child node.

It should be noted that, in some embodiments of this application, when there are a plurality of parallelizable branch groups, the parallelizable branch groups further include a second parallelizable branch group, and the second parallelizable branch group meets the following conditions: Input for all sub-branches in the second parallelizable branch group comes from a same node, output of at least two sub-branches in the second parallelizable branch group is directed to a same node, and each sub-branch in the second parallelizable branch group includes at least two nodes.

Figure 10:
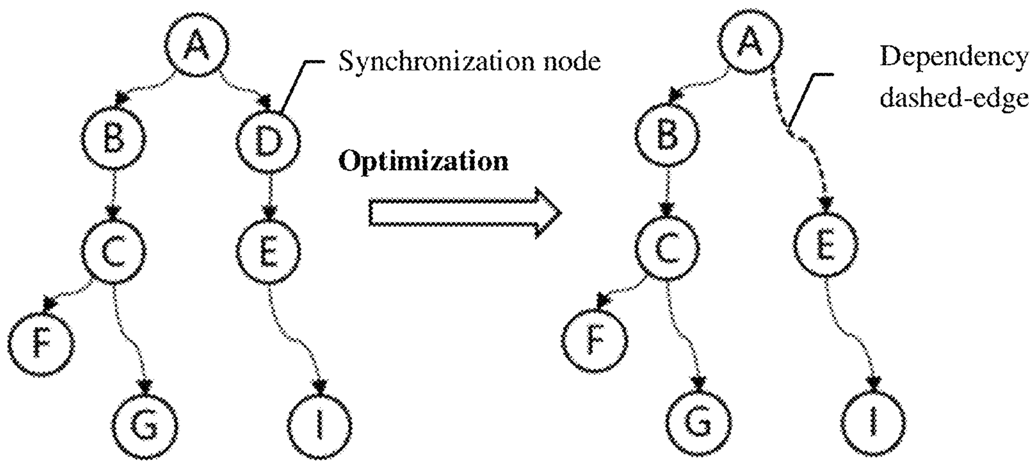
FIG. 10 is a schematic flowchart of optimizing a first computational graph according to an embodiment of this application.

It should be noted that, in some embodiments of this application, the obtained first computational graph may be further optimized. One objective of the optimization is to enable an optimized first computational graph to directly show a dependency relationship between data flows. For example, an optimization means may be: removing a computing-irrelevant node from the first computational graph, or adding a dependency analysis-related dashed edge. For example, a synchronization node in the first computational graph represents a chronological order of execution, is a synchronization message, and is irrelevant to specific computing. Therefore, the node may be eliminated, and a dependency dashed-edge is added to a related node. As shown in FIG. 10, a diagram on the left of FIG. 10 is a partial schematic diagram of the original first computational graph, and the first computational graph includes a synchronization node D. Therefore, after the optimization, the synchronization node D is eliminated, and a dashed edge is added between a node A and a node E. The dashed edge is indicated by a dashed line with an arrow in a diagram on the right of FIG. 10, and indicates a direct connection relationship between the node A and the node E. After the optimization process is performed, the optimized first computational graph includes a direct connection relationship between nodes, namely, a data flow dependency relationship. The direct connection relationship includes an input data supply node (namely, a parent node) and an output data consumption node (namely, a child node) of each node in the first computational graph. For example, A→B→C indicates that an input data supply node of the node B is the node A, and an output data consumption node of the node B is the node C. Specifically, as shown in the diagram on the right of FIG. 10, the node A has a direct connection relationship with both the node B and the node E, and the node B has a direct connection relationship with the node C. Detailed examples are not described herein.

After obtaining the first computational graph (or the optimized first computational graph), the deep learning framework further performs hierarchical search on the first computational graph (or the optimized first computational graph) to obtain one or more parallelizable branch groups, where different levels correspond to different search modes. For ease of description, the following embodiments are described based on the first computational graph.

Figure 11:
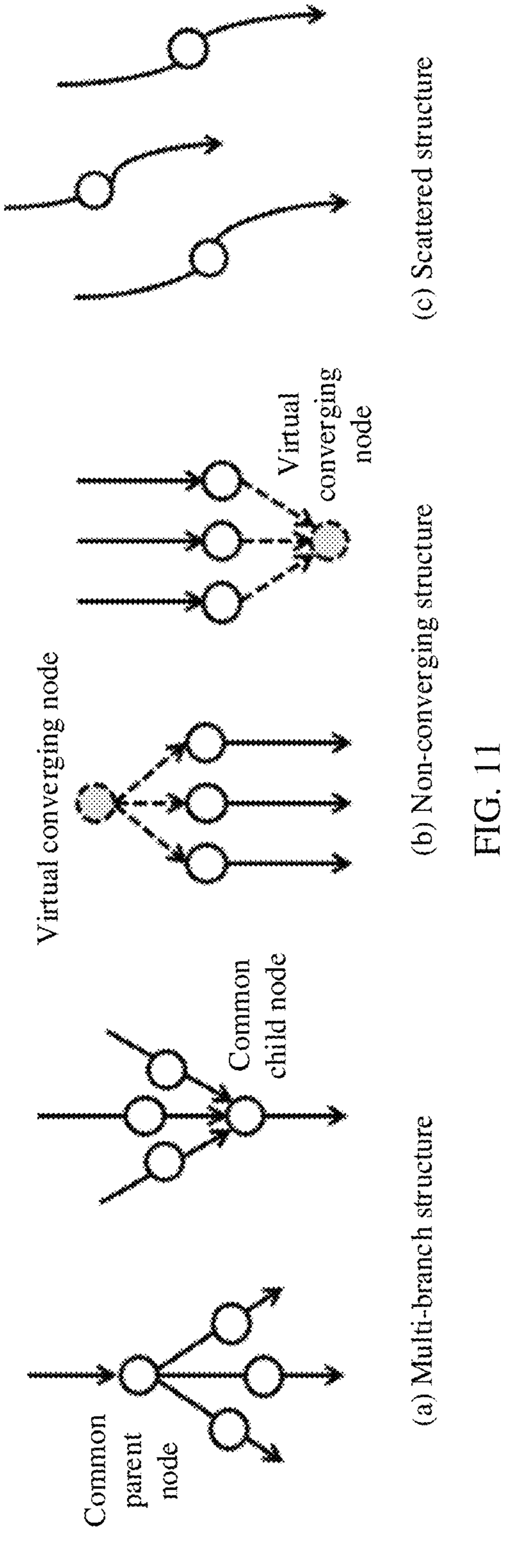
FIG. 11 is a schematic diagram of different branch structure features in a first computational graph according to an embodiment of this application.

It should be noted that, in this application, because hierarchical search is performed on the first computational graph and different levels correspond to different search modes, the hierarchical search is performed on different branch structure features in the entire first computational graph. In some embodiments of this application, different branch structure features in the first computational graph may be described by using three structure features, which may be respectively referred to as a multi-branch structure, a non-converging structure, and a scattered structure. For details, refer to FIG. 11. FIG. 11 shows different branch structure features in the first computational graph according to an embodiment of this application. The branch structure features are separately described below.

(1) Multi-Branch Structure

The multi-branch structure is a branch structure including a common parent node or a common child node, where the common parent node and the common child node may be collectively referred to as a converging node. This branch structure has clearest parallelism. As shown in a schematic sub-diagram (a) in FIG. 11, there is no clear connection relationship between branches (excluding the converging node) of the multi-branch structure, and therefore the branches support parallel execution.

(2) Non-Converging Structure

The non-converging structure is a branch structure in which a 1$^{st}$ node of the branch structure has no parent node or a last node of the branch structure has no child node. A virtual converging node may be added to branches to transform the non-converging structure into a multi-branch structure for processing. As shown in a schematic sub-diagram (b) in FIG. 11, nodes with white background and solid lines with arrows indicate actual nodes and connection relationships, nodes with gray background indicate additional virtual converging nodes, and dashed lines with arrows indicate virtual connection relationships that are added synchronously.

(3) Scattered Structure

Remaining nodes other than the multi-branch structure and the non-converging structure in the first computational graph may be collectively referred to as a scattered structure. The scattered structure may further include some branches in which nodes do not have a direct parent-child relationship to show parallelism. However, these branch structures support parallel execution in terms of a topological order. As shown in a schematic diagram (c) in FIG. 11, nodes do not have a direct connection relationship, but some branch structures may support parallel execution.

The following describes a specific search process of performing hierarchical search on the first computational graph. Based on a branch structure feature presented in the first computational graph, the hierarchical search process may include at least one of the following search modes: a unidirectional search for a multi-branch structure, a unidirectional search for a non-converging structure, and an acyclic search for a scattered structure. Each search mode is separately described below.

(1) Unidirectional Search for a Multi-Branch Structure

A process of the unidirectional search for a multi-branch structure may also be referred to as a first-level search. Specifically, the deep learning framework performs first-level search on the first computational graph, and the first-level search includes but is not limited to a search process in at least one of the following specific forms.

a. The first computational graph is searched for a plurality of branches (which may be referred to as first branches) that have a common parent node (which may be referred to as a first common parent node), and a parallelizable branch group is obtained based on the plurality of first branches.

In this search mode, the deep learning framework searches the first computational graph for a plurality of first branches that have a first common parent node, and obtains a parallelizable branch group based on the plurality of first branches, where the first common parent node is any common parent node in the first computational graph.

It should be noted that, in some embodiments of this application, a specific implementation of obtaining, by the deep learning framework, a parallelizable branch group based on a plurality of first branches after the deep learning framework obtains the plurality of first branches may be: searching each of the plurality of first branches downward by using the first common parent node as a start point and based on a connection relationship between nodes, until another common parent node (which may be referred to as a second common parent node) or a common child node in the first computational graph is found during downward searching. Nodes traversed in each first branch during downward searching form a sub-branch. For example, if there are four first branches, four sub-branches may be obtained through downward searching. Each sub-branch may be referred to as a first sub-branch, and a plurality of obtained first sub-branches form a parallelizable branch group. For example, the four sub-branches form a parallelizable branch group. Herein, it should be noted that each of the plurality of first sub-branches does not include the first common parent node or a common child node, that is, each first sub-branch does not include the first common parent node serving as the start point. In addition, during downward searching of each first branch, if another common parent node (namely, the second common parent node) is found, the second common parent node is added to a corresponding first sub-branch; and if a common child node is found, the common child node is excluded from the corresponding first sub-branch.

Figure 12:
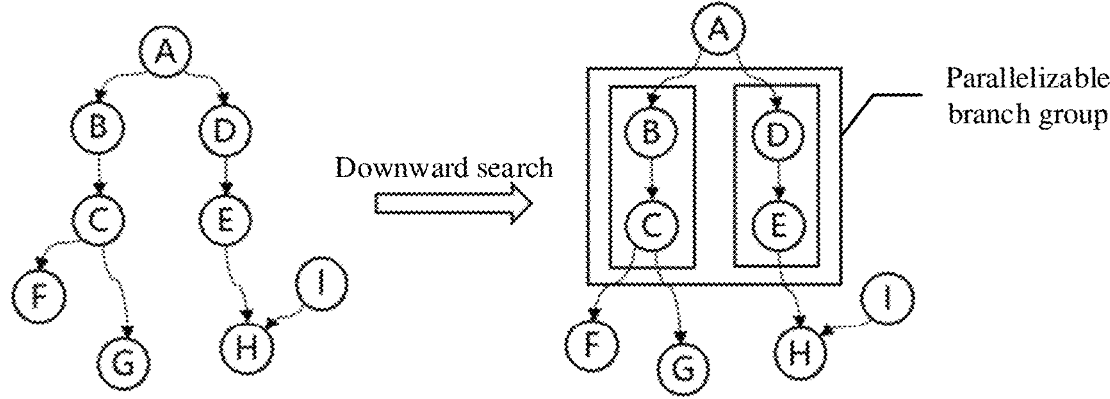
FIG. 12 is a schematic diagram of obtaining a parallelizable branch group based on a plurality of first branches according to an embodiment of this application.

For ease of understanding the foregoing process, an example is used below for description. FIG. 12 is a schematic diagram of obtaining a parallelizable branch group based on a plurality of first branches according to an embodiment of this application. A node A is a first common parent node, and two branches (namely, first branches) may be found through searching performed by using the node A as a start point. One branch includes a node B, a node C, a node F, and a node G, and the other branch includes a node D, a node E, a node H, and a node I. The two branches are separately searched downward. Downward searching of a branch on the left stops when another common parent node C is found during downward searching. Downward searching of a branch on the right stops when a common child node H is found during downward searching. In this case, the nodes A, B, and C are traversed in the branch on the left, and the nodes A, D, E, and H are traversed in the branch on the right. However, the node C is a common parent node and may be added to a sub-branch on the left, the node H is a common child node and is excluded from a sub-branch on the right, and the node A is a first common parent node serving as a start point and is excluded from the two sub-branches. Therefore, the sub-branch on the left is (B→C), and the sub-branch on the right is (D→E). The two sub-branches form a parallelizable branch group.

b. The first computational graph is searched for a plurality of branches (which may be referred to as second branches) that have a common child node (which may be referred to as a first common child node), and a parallelizable branch group is obtained based on the plurality of second branches.

In this search mode, the deep learning framework searches the first computational graph for a plurality of second branches that have a first common child node, and obtains a parallelizable branch group based on the plurality of second branches, where the first common child node is any common child node in the first computational graph.

It should be noted that, in some embodiments of this application, a specific implementation of obtaining, by the deep learning framework, a parallelizable branch group based on a plurality of second branches after the deep learning framework obtains the plurality of second branches may be: searching each of the plurality of second branches upward by using the first common child node as a start point and based on a connection relationship between nodes, until another common child node or common parent node in the first computational graph is found during upward searching. Nodes traversed in each second branch during upward searching form a sub-branch. For example, if there are three second branches, three sub-branches may be obtained through upward searching. Each sub-branch may be referred to as a second sub-branch, and a plurality of obtained second sub-branches form a parallelizable branch group. For example, the three sub-branches form a parallelizable branch group. Herein, it should be noted that each of the plurality of second sub-branches does not include the first common child node or a common parent node, that is, each second sub-branch does not include the first common child node serving as the start point. In addition, during upward searching of each second branch, if another common child node is found, the another common child node is added to a corresponding second sub-branch; and if a common parent node is found, the common parent node is excluded from the corresponding second sub-branch.

Figure 13:
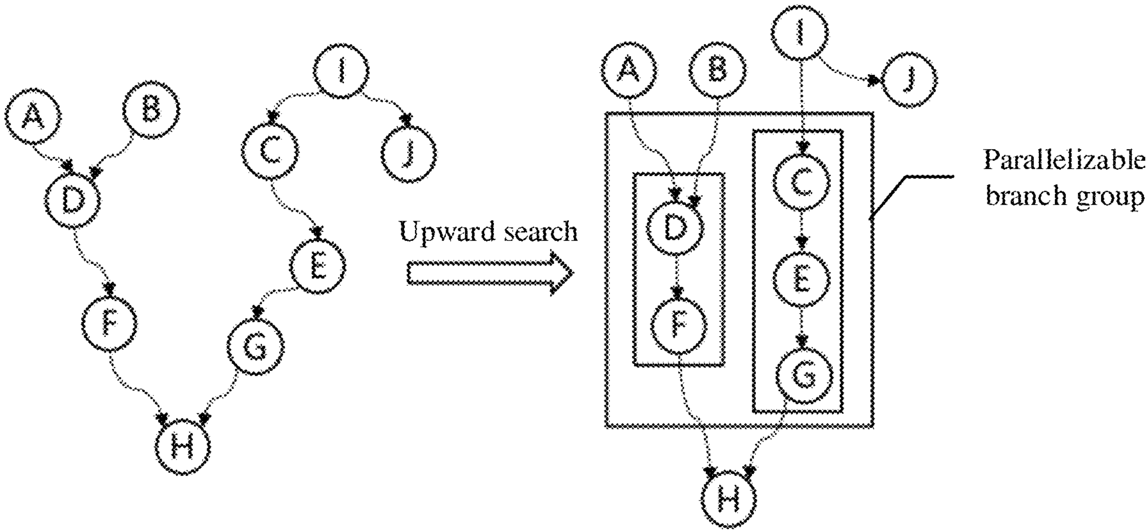
FIG. 13 is a schematic diagram of obtaining a parallelizable branch group based on a plurality of second branches according to an embodiment of this application.

For ease of understanding the foregoing process, an example is used below for description. FIG. 13 is a schematic diagram of obtaining a parallelizable branch group based on a plurality of second branches according to an embodiment of this application. A node H is a first common child node, and two branches (namely, second branches) may be found through searching performed by using the node H as a start point. One branch includes a node F, a node D, a node A, and a node B, and the other branch includes a node G, a node E, a node C, a node I, and a node J. The two branches are separately searched upward. Upward searching of a branch on the left stops when another common child node D is found during upward searching. Upward searching of a branch on the right stops when a common parent node I is found during upward searching. In this case, the nodes H, F, and D are traversed in the branch on the left, and the nodes H, G, E, C, and I are traversed in the branch on the right. However, the node D is a common child node and may be added to a sub-branch on the left, the node I is a common parent node and is excluded from a sub-branch on the right, and the node H is a first common child node serving as a start point and is excluded from the two sub-branches. Therefore, the sub-branch on the left is (D→F), and the sub-branch on the right is (C→E→G). The two sub-branches form a parallelizable branch group.

In the foregoing method for extracting a parallelizable branch group by using a common parent node or a common child node as a start point, it can be ensured that nodes belonging to different sub-branches in one parallelizable branch group do not have inconsistent dependency behavior. For example, a sub-branch obtained through upward searching that starts from a common child node does not include a common parent node, or a sub-branch obtained through downward searching that starts from a common parent node does not include a common child node. This can ensure that node fusion across branches does not form a ring structure.

Currently, in an existing node fusion mode for a computational graph, whether a ring is formed after node fusion needs to be determined. However, determining whether a ring is formed is a complex operation. In the foregoing extraction mode based on the unidirectional search for a multi-branch structure in this embodiment of this application, it is ensured that no ring structure appears. Therefore, whether a ring is formed does not need to be additionally determined for a combination obtained each time. This simplifies an operation process.

It should be noted that, in this embodiment of this application, in the unidirectional search for a multi-branch structure (namely, the first-level search), only the search process in the manner a may be performed, or only the search process in the manner b may be performed, or both the search processes in the manner a and the manner b may be performed. This is not specifically limited herein. However, it should be noted that, if both the search processes in the manner a and the manner b are performed, a node (for example, the node A) in the first computational graph belongs to a sub-branch that is first traversed, and the node is identified. The identification indicates that the node has been added to a sub-branch, to prevent the node from being repeatedly added to a group during subsequent searching.

(2) Unidirectional Search for a Non-Converging Structure

A process of the unidirectional search for a non-converging structure may also be referred to as a second-level search. Specifically, the deep learning framework performs second-level search on the first computational graph, and the second-level search includes but is not limited to a search process in at least one of the following specific forms.

a. The first computational graph is searched for a plurality of branches (which may be referred to as third branches) that have no parent node, and a parallelizable branch group is obtained based on the plurality of third branches.

In this search mode, the deep learning framework searches the first computational graph for a plurality of third branches that have no parent node, and obtains a parallelizable branch group based on the plurality of third branches.

It should be noted that, in some embodiments of this application, a specific implementation of obtaining, by the deep learning framework, a parallelizable branch group based on a plurality of third branches after the deep learning framework obtains the plurality of third branches may be as follows: First, the deep learning framework searches the first computational graph for one or more nodes that have no parent node, and searches each of the plurality of third branches downward by using the node having no parent node as a start point and based on a connection relationship between nodes, until a common parent node or a common child node in the first computational graph is found during downward searching. Nodes traversed in each third branch during downward searching form a sub-branch. For example, if there are two third branches, two sub-branches may be obtained through downward searching. Each sub-branch may be referred to as a third sub-branch, and a plurality of obtained third sub-branches form a parallelizable branch group. For example, the two sub-branches form a parallelizable branch group. Herein, it should be noted that each of the plurality of third sub-branches does not include the common child node found during downward searching, that is, each third sub-branch may include the node serving as the start point. In addition, during downward searching of each third branch, if a common parent node is found, the common parent node may be added to a corresponding third sub-branch; and if a common child node is found, the common child node is excluded from the corresponding third sub-branch.

Figure 14:
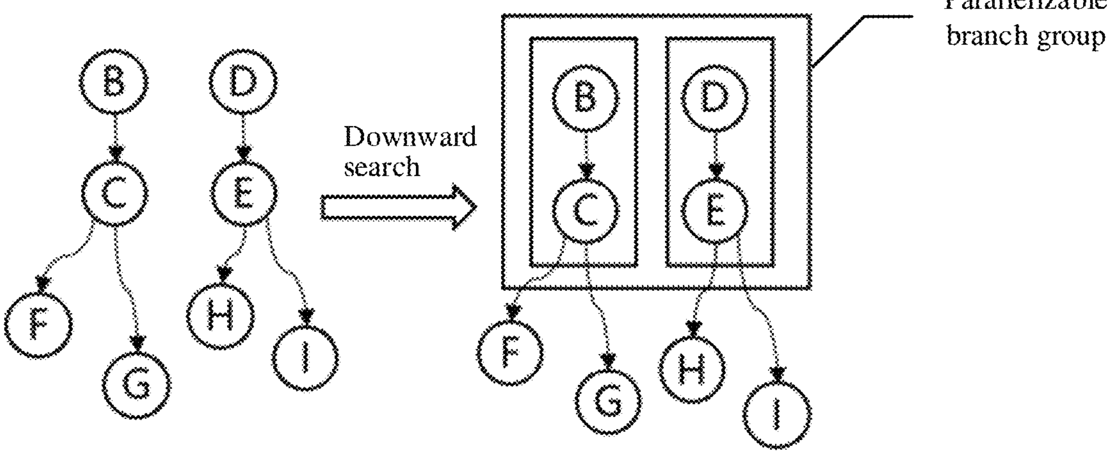
FIG. 14 is a schematic diagram of obtaining a parallelizable branch group based on a plurality of third branches according to an embodiment of this application.

In terms of features, the search process in the manner a of the second-level search is similar to the search process in the manner a of the first-level search, and a difference lies in that, in the search process in the manner a of the second-level search, searching does not start from one node; instead, downward searching is performed based on a plurality of non-converging nodes (that is, nodes that have no parent node) that form a group, and the non-converging nodes are also included in respective sub-branches. FIG. 14 is a schematic diagram of obtaining a parallelizable branch group based on a plurality of third branches according to an embodiment of this application. The deep learning framework performs downward searching by starting from a node B and a node D that have no parent node, to obtain a sub-branch (B→C) and a sub-branch (D→E) respectively. The sub-branch (B→C) and the sub-branch (D→E) form a parallelizable branch group.

b. The first computational graph is searched for a plurality of branches (which may be referred to as fourth branches) that have no child node, and a parallelizable branch group is obtained based on the plurality of fourth branches.

In this search mode, the deep learning framework searches the first computational graph for a plurality of fourth branches that have no child node, and obtains a parallelizable branch group based on the plurality of fourth branches.

It should be noted that, in some embodiments of this application, a specific implementation of obtaining, by the deep learning framework, a parallelizable branch group based on a plurality of fourth branches after the deep learning framework obtains the plurality of fourth branches may be as follows: First, the deep learning framework searches the first computational graph for one or more nodes that have no child node, and searches each of the plurality of fourth branches upward by using the node having no child node as a start point and based on a direct connection relationship between nodes, until a common parent node or a common child node in the first computational graph is found during upward searching. Nodes traversed in each fourth branch during upward searching form a sub-branch. For example, if there are four fourth branches, four sub-branches may be obtained through upward searching. Each sub-branch may be referred to as a fourth sub-branch, and a plurality of obtained fourth sub-branches form a parallelizable branch group. For example, the four sub-branches form a parallelizable branch group. Herein, it should be noted that each of the plurality of fourth sub-branches does not include the common parent node found during upward searching, that is, each fourth sub-branch may include the node serving as the start point. In addition, during downward searching of each fourth branch, if a common child node is found, the common child node may be added to a corresponding fourth sub-branch; and if a common parent node is found, the common parent node is excluded from the corresponding fourth sub-branch.

Figure 15:
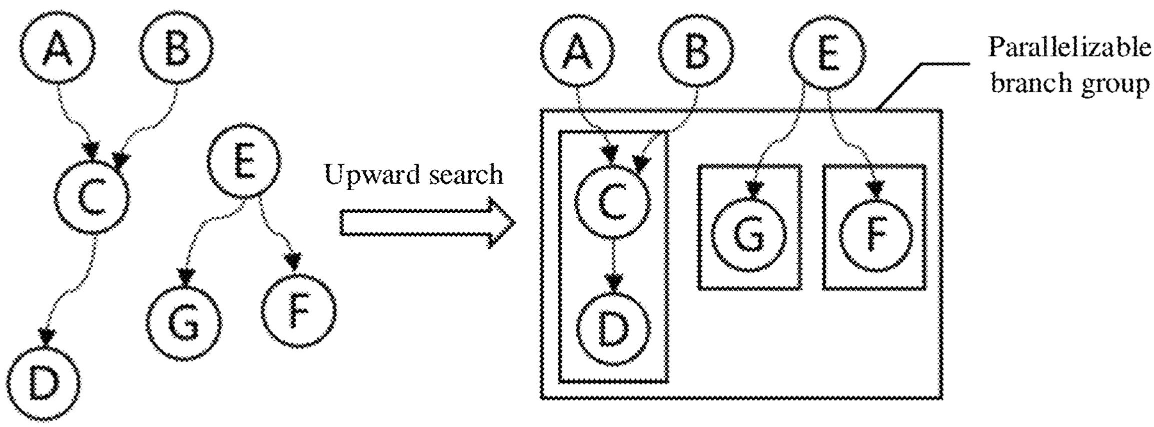
FIG. 15 is a schematic diagram of obtaining a parallelizable branch group based on a plurality of fourth branches according to an embodiment of this application.

Similarly, in terms of features, the search process in the manner b of the second-level search is similar to the search process in the manner b of the first-level search, and a difference lies in that, in the search process in the manner b of the second-level search, searching does not start from one node; instead, upward searching is performed based on a plurality of non-converging nodes (that is, nodes that have no child node) that form a group, and the non-converging nodes are also included in respective sub-branches. FIG. 15 is a schematic diagram of obtaining a parallelizable branch group based on a plurality of fourth branches according to an embodiment of this application. The deep learning framework performs upward searching by starting from nodes D, G, and F that have no child node, to obtain a sub-branch (C→D), a sub-branch (G), and a sub-branch (F) respectively.

The sub-branch (C→D), the sub-branch (G), and the sub-branch (F) form a parallelizable branch group.

Similarly, in the foregoing method for extracting a parallelizable branch group by using a node that has no parent node or no child node as a start point, it can also be ensured that nodes belonging to different sub-branches in one parallelizable branch group do not have inconsistent dependency behavior. For example, a sub-branch obtained through upward searching that starts from a node having no child node does not include a common parent node, or a sub-branch obtained through downward searching that starts from a node having no parent node does not include a common child node. This can ensure that node fusion across branches does not form a ring structure. Therefore, in the foregoing extraction mode based on the unidirectional search for a non-converging structure in this embodiment of this application, it can also be ensured that no ring structure appears, and whether a ring is formed does not need to be additionally determined for a combination obtained each time. This simplifies an operation process.

It should be noted that, in this embodiment of this application, in the unidirectional search for a non-converging structure (namely, the second-level search), only the search process in the manner a may be performed, or only the search process in the manner b may be performed, or both the search processes in the manner a and the manner b may be performed. This is not specifically limited herein. However, it should be noted that, if both the search processes in the manner a and the manner b are performed, a node in the first computational graph belongs to a sub-branch that is first traversed, and the node is identified. The identification indicates that the node has been added to a sub-branch, to prevent the node from being repeatedly added to a group during subsequent searching.

(3) Acyclic Search for a Scattered Structure

Figure 16:
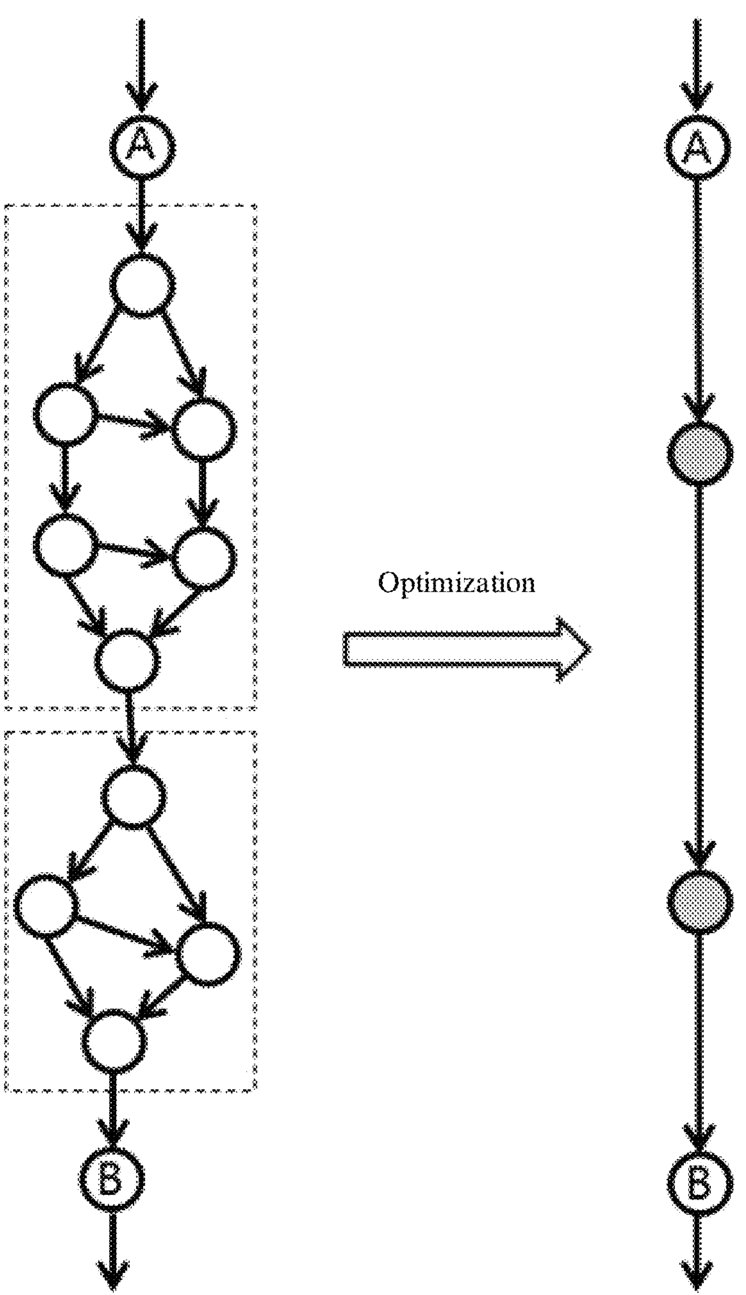
FIG. 16 is a schematic diagram of simplifying a local structure around a target node according to an embodiment of this application.
Figure 17:
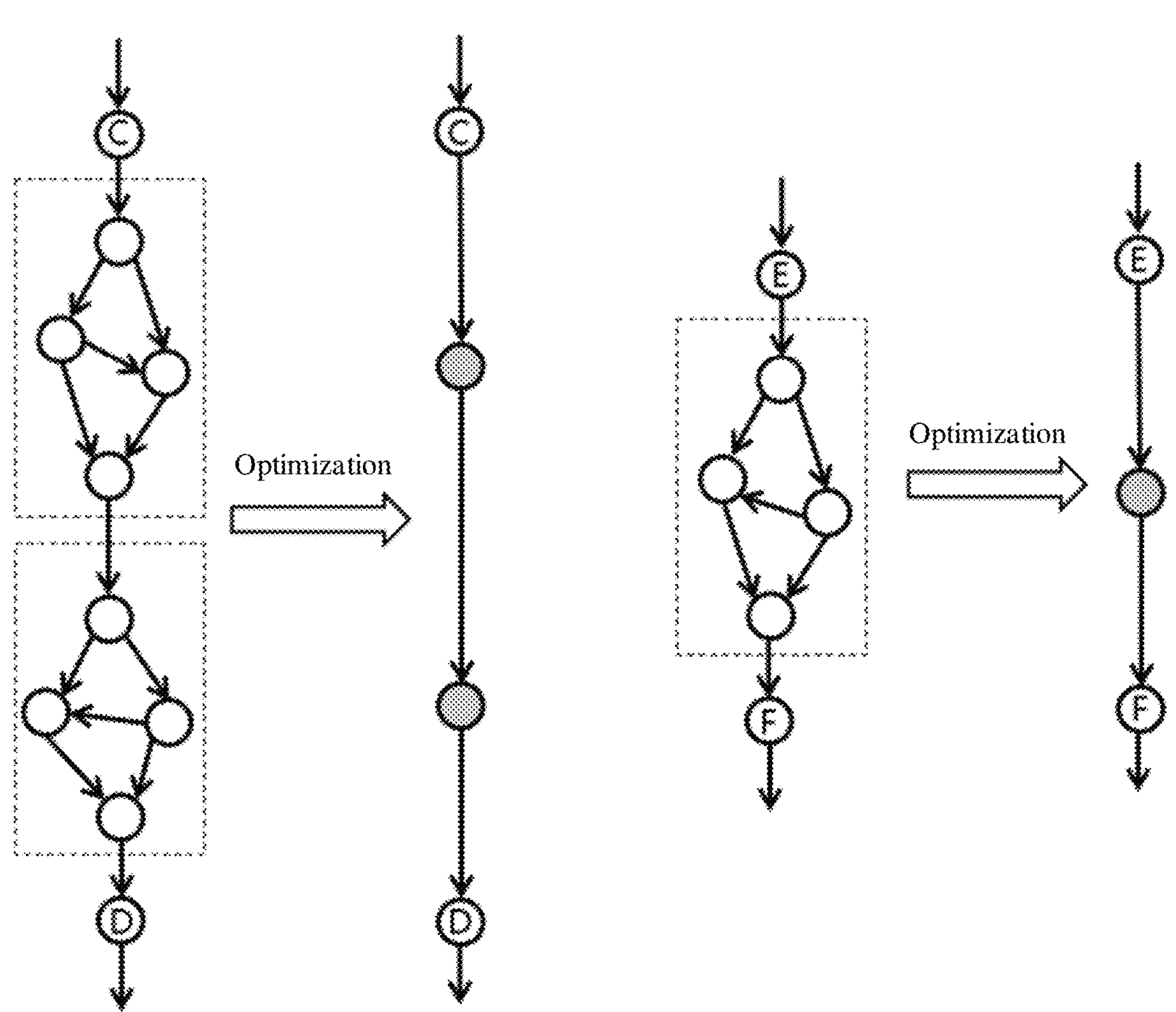
FIG. 17 is a schematic diagram of finding other two fifth branches in a first computational graph according to an embodiment of this application.

A process of the acyclic search for a scattered structure may also be referred to as a third-level search. Compared with searching directly performed based on a connection relationship between nodes, searching for nodes that support parallel execution in the scattered structure has higher costs. In addition, to ensure effectiveness of parallelism, whether a ring is formed further needs to be determined. Specifically, the deep learning framework determines, from the first computational graph, a target node that does not belong to any parallelizable branch group. The target node may also be referred to as a sensitive node, that is, a node suitable for fusion. Therefore, the target node needs to meet the following conditions: (1) Computing power resources to be consumed when a computational task corresponding to the target node is executed by a device cannot exceed a preset threshold. (2) The target node is not a node that does not support fusion. After selecting the target node, the deep learning framework simplifies a local structure in an upstream network and a downstream network of the target node by using the target node as a center, to obtain a branch. The branch may be referred to as a fifth branch. For example, a rhombic structure that starts from one node and then may experience multi-level branching but finally converges to another node may be simplified into a virtual node in the first computational graph. FIG. 16 is a schematic diagram of simplifying a local structure around a target node according to an embodiment of this application. Parts enclosed by dashed lines between a node A and a node B in a diagram on the left of FIG. 16 are rhombic structures. The two rhombic structures each are simplified into a node with gray background (namely, a virtual node) in a diagram on the right. The node A and the node B are target nodes. Similarly, other target nodes may be found in this manner, local structures around the target node are simplified to obtain a plurality of fifth branches, and a parallelizable branch group is obtained based on the plurality of obtained fifth branches. FIG. 17 shows other two fifth branches found in the first computational graph. Target nodes of one fifth branch are nodes C and D, and target nodes of the other fifth branch are nodes E and F. Finally, a parallelizable branch group may be obtained based on the three fifth branches.

Herein, it should be noted that a function of each virtual node in the plurality of fifth branches is to help determine whether target nodes belonging to different fifth branches can be fused. A real node corresponding to the virtual node may be a node that does not support fusion, or may be a node that has been added to a parallelizable branch group. Therefore, for ease of operation, whether the virtual node is a node that supports fusion no longer needs to be determined subsequently, and the virtual node is still compiled as an ordinary node during subsequent compilation. For example, as shown in FIG. 16 and FIG. 17, the obtained three fifth branches include a total of five virtual nodes. The five virtual nodes are used to determine whether at least two nodes, belonging to different fifth branches, of the node A to the node F can be fused. The five virtual nodes are not nodes that support fusion, and still undergo ordinary compilation during subsequent compilation based on nodes included in rhombic structures respectively corresponding to the five virtual nodes. Finally, whether a ring is formed between the plurality of obtained fifth branches needs to be determined. If no ring is formed between the plurality of fifth branches, a parallelizable branch group is obtained based on the plurality of fifth branches. An objective of determining whether a ring is formed is to ensure effectiveness of parallelism.

Figure 18:
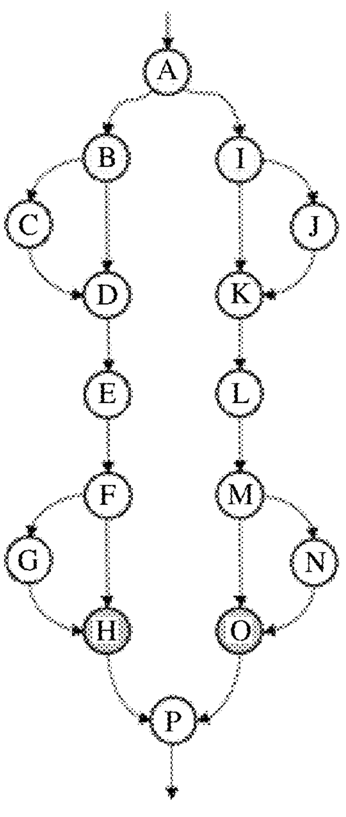
FIG. 18 is a schematic diagram of a typical scattered structure including nodes that support parallel execution according to an embodiment of this application.

It should be further noted that an objective of the third-level search in this embodiment of this application is as follows: Both the first-level search and the second-level search are performed based on a direct connection relationship between nodes, and therefore a corresponding parallelizable branch group may be directly found through upward searching or downward searching. However, in the first-level search or the second-level search, to avoid a complex operation of determining whether a ring is formed, a stop condition is strict. As a result, after the first computational graph is processed based on the foregoing search modes, some nodes that possibly support parallel execution are still scattered in the first computational graph, and these nodes may be referred to as scattered nodes. These scattered nodes may be independent nodes that are missed when preceding and following nodes are added to a parallelizable branch group, or may be some nodes with special node structures, for example, a local rhombic structure, to be specific, a structure that starts from one node and then may experience multi-level branching but finally converges to another node. These scattered nodes are missed due to their special structures, locations, or other factors, or are discarded because a related branch does not include an effective node. For ease of understanding, an example is used below for description. FIG. 18 is a schematic diagram of a typical scattered structure including nodes that support parallel execution. It can be learned from FIG. 18 that a sub-branch (B) and a sub-branch (I) are a parallelizable branch group found through searching, and a sub-branch (H) and a sub-branch (O) are another parallelizable branch group found through searching. It can be learned from the structure in the figure that a sub-branch (C→D→E→F→G) and a sub-branch (J→K→L→M→N) are a possible parallelizable branch group that is not found. A reason why the possible parallelizable branch group is not found lies in: C and J are found during downward searching based on a common parent node, but a related branch is an empty branch (the related branch is an empty branch because there is no node between (B→D) and (I→K), and therefore the nodes C and J are discarded. Similarly, nodes G and N are discarded. Nodes D, K, F, and M are target nodes (namely, sensitive nodes) but are not hit in another search process (to be specific, are not found in the search process of the first-level search or the second-level search), and therefore are also discarded. Nodes E and L are blocked by a rhombic structure.

Figure 19:
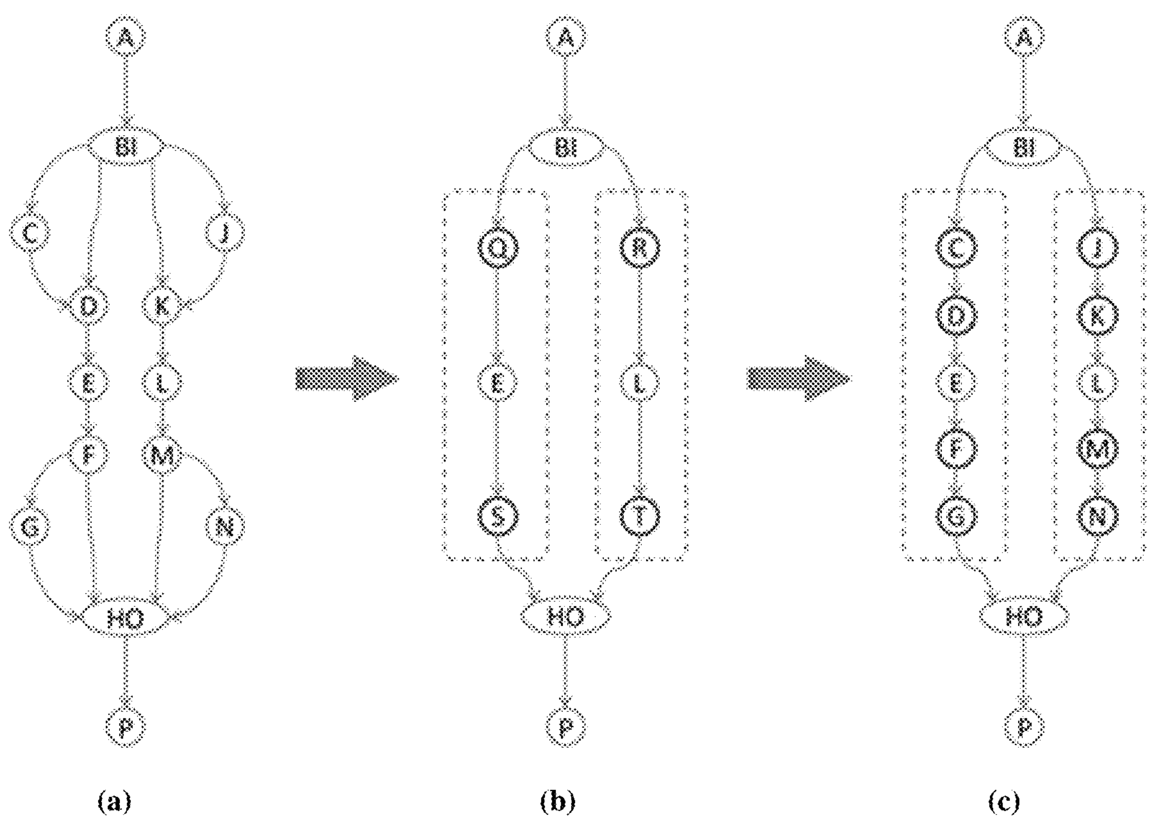
FIG. 19 is a schematic diagram of a specific example of an acyclic search for a scattered structure according to an embodiment of this application.

A process of the acyclic search for a scattered structure is described below by using a specific example. FIG. 19 is a schematic diagram of a specific example of an acyclic search for a scattered structure according to an embodiment of this application. FIG. 19 is obtained based on the scattered structure in FIG. 18. A node BI and a node HO in a part (a) in FIG. 19 are a fusion node of the nodes B and I in FIG. 18 and a fusion node of the nodes H and O in FIG. 18 respectively. To be specific, the nodes B and I in FIG. 18 are fused to obtain the fusion node BI, and the nodes H and O are fused to obtain the fusion node HO. The process of the acyclic search for a scattered structure may be specifically divided into four operations, which are separately described below. Operation 1: First, the deep learning framework finds, in the first computational graph, a combination of all scattered target nodes, for example, the nodes G, N, C, J, D, K, F, M, E, and L in FIG. 18; performs upward searching and downward searching by using these nodes as centers; and simplifies a local structure that can form a rhombic structure in a topological order 100 (assuming that a topological order interval is set to 100, if a topological order of a fork node is 150, searching stops when a node in a topological order 50 is found, and if forks can converge to a same common parent node, a rhombic structure can be formed in the topological order 100). As shown in a part (b) in FIG. 19, the nodes C and D are simplified into a virtual node Q (the fusion node BI is not connected only to the nodes C and D, and therefore cannot be simplified into a same virtual node together with the nodes C and D). Similarly, the nodes J and K are simplified into a virtual node R, the nodes G and F are simplified into a virtual node S, and the nodes M and N are simplified into a virtual node T. Therefore, new branches (Q→E→S) and (R→L→T) may be obtained. Operation 2: Then the deep learning framework selects a node (for example, a first node) from each new branch, and determines whether a ring is formed, where a branch that does not form a ring becomes a sub-branch of a parallelizable branch group. As shown in the part (b) in FIG. 19, neither a sub-branch (Q→E→S) nor a sub-branch (R→L→T) forms a ring. Therefore, the two sub-branches form a parallelizable branch group. Operation 3: In a new branch, for a virtual node, for example, the node Q shown in the part (b) in FIG. 19, parallelism is not supported between the real nodes C and D represented by the virtual node Q, but parallelism is supported between the real nodes C and D and the real nodes J and K represented by the virtual node R. To be specific, parallel execution is supported between the nodes C and J, and parallel execution is also supported between the nodes D and K. Therefore, virtual nodes in the sub-branches of the parallelizable branch group are restored to real nodes, and sorting is performed according to a local topological order of the real nodes to form a new virtual branch structure. As shown in a part (c) in FIG. 19, the virtual node Q is expanded to (C→D), the virtual node R is expanded to (J→K), the virtual node S is expanded to (F→G), and the virtual node T is expanded to (M→N). These virtual nodes represent the same computational logic as the original real nodes. However, a connection relationship between the virtual nodes is virtual, and the virtual nodes are used only for parallelism analysis for possible parallelizable branch groups. Through the foregoing analysis, a possible parallelizable branch group may be found. To be specific, a parallelizable branch group including a sub-branch (C→D→E→F→G) and a sub-branch (J→K→L→M→N) is found. Operation 4: Repeat operation 3 until processing of all possible parallelizable branch groups in operation 2 is completed.

It should be noted that, in some embodiments of this application, any one or more of the foregoing levels of searches may be performed according to a requirement. For example, when a user needs to perform quick search without requiring high completeness of a search result, only the first-level search, the second-level search, or the third-level search may be performed. This is not specifically limited herein. For another example, when a user needs to find nodes that support parallel execution as many as possible, a plurality of levels of searches may be performed. For example, at least two of the foregoing three levels of searches may be performed. However, it should be noted that, when the deep learning framework performs at least two levels of searches, an execution sequence of the hierarchical search is not limited. For example, when the deep learning framework performs the foregoing three levels of searches, a sequence of the three levels of searches is not limited. The first-level search may be performed first, then the second-level search is performed, and finally the third-level search is performed; or the second-level search may be performed first, then the first-level search is performed, and finally the third-level search is performed; or the hierarchical search is performed in any order. Examples are not described herein.

It should be further noted that, in some embodiments of this application, to find nodes that support parallel execution as many as possible, the hierarchical search process may be performed iteratively, and an iteration termination condition may be that no new parallelizable branch group can be found, or specific iteration duration is reached. A search termination condition is not specifically limited herein.

Operation 903: Fuse a plurality of nodes, respectively belonging to different sub-branches, in each of the one or more parallelizable branch groups, to obtain a second computational graph based on the first computational graph.

After performing operation 902, the deep learning framework may obtain the one or more parallelizable branch groups. For each parallelizable branch group, the deep learning framework may fuse a plurality of nodes in each parallelizable branch group (which may be referred to as a target parallelizable branch group) that respectively belong to different sub-branches, to obtain the second computational graph. Herein, it should be noted that, the plurality of nodes in the target parallelizable branch group that respectively belong to different sub-branches mean that any two of the plurality of nodes cannot belong to a same sub-branch. To be specific, in any target parallelizable branch group, each sub-branch includes one or more nodes. Nodes belonging to different sub-branches may be combined into a fusion node, and nodes in a same sub-branch are not fused due to a connection relationship. In the target parallelizable branch group, a fusion node may be obtained based on a search algorithm.

Figure 20:
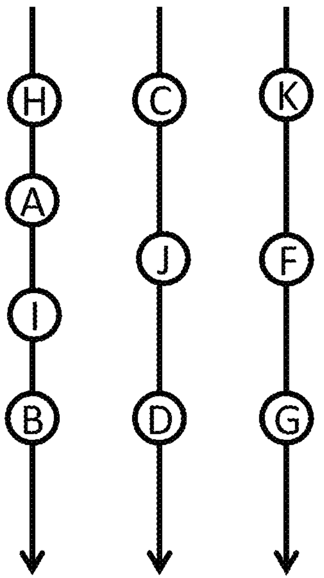
FIG. 20 is a schematic diagram of a parallelizable branch group obtained by a deep learning framework according to an embodiment of this application.

For ease of understanding, an example is used below for description. It is assumed that a parallelizable branch group obtained by the deep learning framework is shown in FIG. 20. The parallelizable branch group includes a total of three sub-branches. A 1st sub-branch includes four nodes, and the other two sub-branches each include three nodes. It can be learned from FIG. 20 that nodes A, C, and F respectively belong to three different sub-branches, and the three nodes may be fused to obtain a fusion node. For another example, nodes B and D also respectively belong to two different sub-branches, and the two nodes may also be fused to obtain a fusion node. Detailed examples are not described herein. It can be learned from the example in FIG. 20 that, when a plurality of nodes in a target parallelizable branch group that respectively belong to different sub-branches are fused, one or more fusion nodes may be obtained through fusion. This mainly depends on a fusion mode.

It should be noted that, in some embodiments of this application, some nodes that do not support fusion or nodes that are not suitable for parallel execution may still be retained in some sub-branches in the one or more parallelizable branch groups obtained in operation 902. These nodes may be collectively referred to as nodes that do not support fusion. These nodes are retained during extraction of the parallelizable branch group to ensure integrity of branches, so that searching of branches is not interrupted by an individual node. If searching is interrupted, a node that possibly supports parallel execution is missed. Therefore, after obtaining the one or more parallelizable branch groups, the deep learning framework may further eliminate a node that does not support fusion from each sub-branch in each parallelizable branch group (namely, a target parallelizable branch group), to obtain each parallelizable branch group (which may be referred to as a third parallelizable branch group) in which the node that does not support fusion has been eliminated. Any sub-branch in the first parallelizable branch group may be referred to as a target sub-branch. Then a plurality of nodes, respectively belonging to different sub-branches, in each parallelizable branch group (namely, the third parallelizable branch group) in which the node that does not support fusion has been eliminated are fused, to obtain a fusion node. The fusion node and an unfused node in the first computational graph form the second computational graph.

It should be further noted that, in some embodiments of this application, the node that does not support fusion may be specifically a node with an exclusive operation, for example, a used compilation suite does not provide a kernel compilation solution applicable after some nodes are fused; or may be a node with a specific operation, such as a matrix multiplication operation or a convolution operation of the neural network. Computing intensity of the operation is high. In most cases, computing power resources on a device are fully used as far as possible when the operation is performed on the device. Therefore, this type of node is not suitable for parallel execution either. An exception is that, when a data volume is quite small, this type of node is considered as being suitable for parallel execution.

Figure 21:
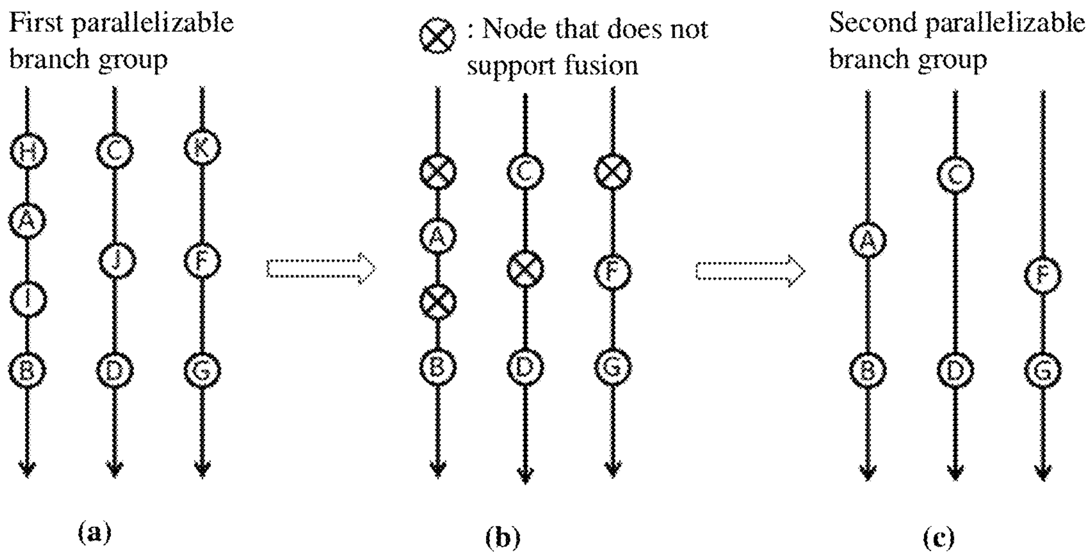
FIG. 21 is a schematic diagram of eliminating nodes that do not support fusion from a first parallelizable branch group to obtain a second parallelizable branch group according to an embodiment of this application.

For ease of understanding the foregoing process of obtaining the third parallelizable branch group, an example is used below for description. It is assumed that a target parallelizable branch group obtained by the deep learning framework is shown in a schematic sub-diagram (a) in FIG. 21. Before nodes are fused, sub-branches of the target parallelizable branch group need to be "cleaned" to eliminate nodes that do not support fusion. It is assumed that nodes H, I, J, and K are determined as nodes that do not support fusion, as shown in a schematic sub-diagram (b) in FIG. 21. In this case, the nodes H, I, J, and K need to be eliminated, and the eliminated nodes are subsequently compiled as ordinary nodes. Only nodes retained in the sub-branches are allowed to be fused. For example, as shown in a schematic sub-diagram (c) in FIG. 21, retained nodes A, B, C, D, F, and G are nodes that support fusion, and the nodes that support fusion subsequently participate in a specific fusion process.

It should be further noted that, in some embodiments of this application, after obtaining the third parallelizable branch group by eliminating the node that does not support fusion, the deep learning framework fuses a plurality of nodes in the third parallelizable branch group that belong to different sub-branches, to obtain a fusion node. In this process, the fusion node may be obtained based on a combination search (which may also be referred to as a parallel fusion search) mode. A principle of the combination search is as follows: In any third parallelizable branch group, each sub-branch includes one or more nodes, nodes belonging to different sub-branches may be combined into a fusion node, and nodes in a same sub-branch cannot be fused due to a connection relationship. In each third parallelizable branch group, a fusion node may be obtained based on a search algorithm. Specifically, a process of the combination search may be performed by two parts. One part may be referred to as a candidate combination generation model, and the other part may be referred to as a computing power assessment model. The candidate combination generation model generates a series of candidate node combinations based on each node in the third parallelizable branch group. The computing power assessment model assesses computing power to be consumed after the candidate node combinations are fused into one node. The assessment may also be referred to as gain assessment. A specific search process may be as follows: First, an unfused node is selected (for example, randomly selected) from each sub-branch in the third parallelizable branch group, to obtain n unfused nodes, where the unfused node is a node that has not been fused, and $n \geq 2$. Then m node combinations are generated based on the selected n unfused nodes, where each of the m node combinations includes at least two unfused nodes, and $m \geq 1$. In addition, computing power to be consumed by the m node combinations is assessed by using a constructed computing power assessment model, to obtain m assessment results. When a first assessment result meets a preset condition, a first node combination corresponding to the first assessment result is fused to obtain a first fusion node, and each unfused node in the first node combination is marked as a fused node. The first assessment result is one of the m assessment results, and the first node combination is one of the m node combinations.

Figure 22:
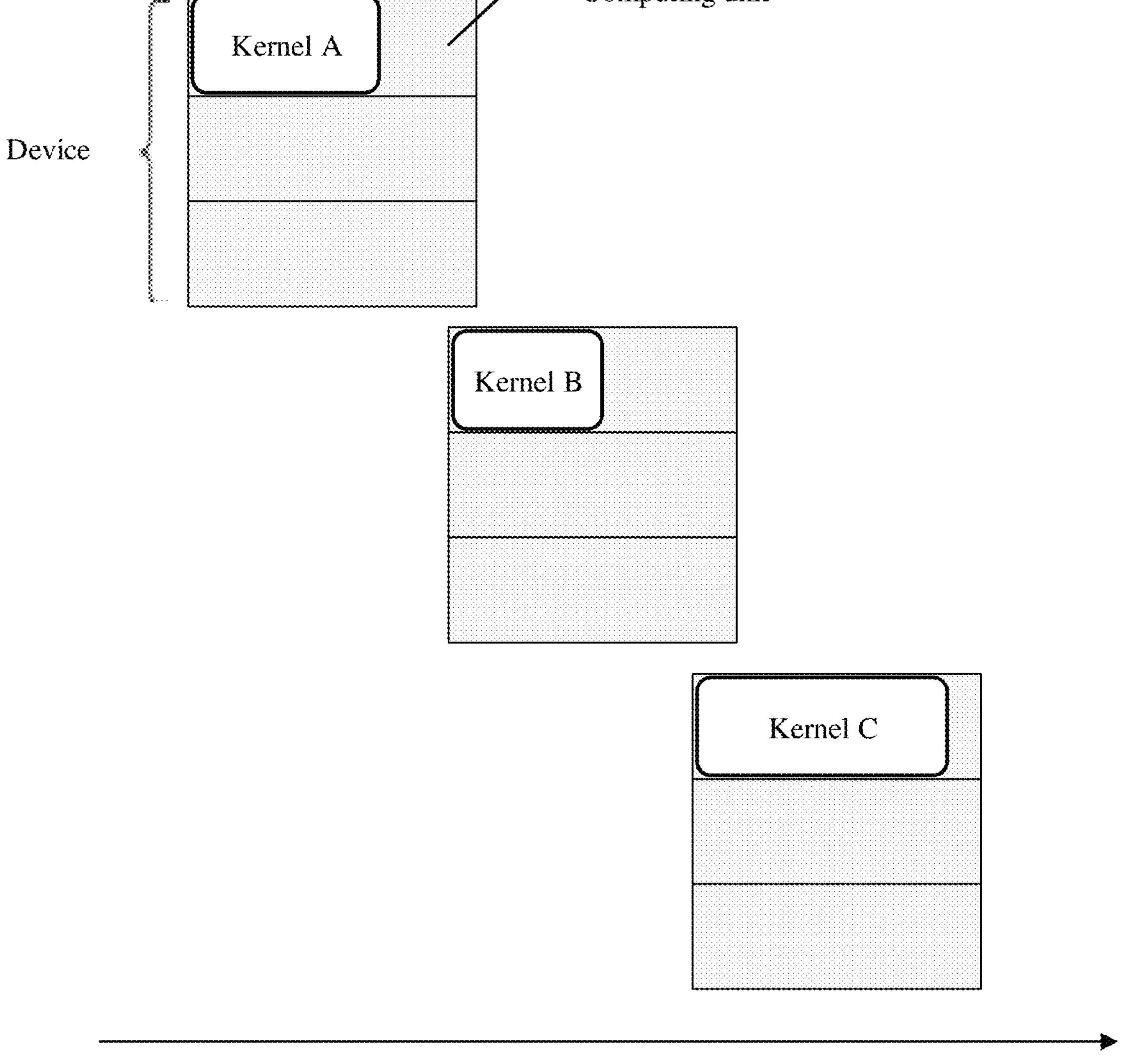
FIG. 22 is a schematic diagram of computing power usage, on a device, of three different nodes that are respectively compiled into kernels according to an embodiment of this application.

It should be noted that a reason of constructing the computing power assessment model in this embodiment of this application lies in: Computational tasks corresponding to nodes use different amounts of computing power resources on the device, and therefore utilization of the computing power resources on the device fluctuates in an entire execution process. Therefore, when the device performs a computational task with low resource usage, some computing resources of the device are in an idle state. FIG. 22 shows computing power usage, on a device, of three different nodes that are respectively compiled into kernels according to an embodiment of this application. It is assumed that a device in acceleration hardware includes three computing units, as indicated by three gray blocks in FIG. 22. A kernel A, a kernel B, and a kernel C are operator kernels respectively obtained by compiling three nodes, and the operator kernels may be directly executed by the computing units of the device. Sizes of blocks in which the kernel A, the kernel B, and the kernel C are located indicate computing power consumed by the kernel A, the kernel B, and the kernel C respectively. It can be learned from FIG. 22 that different kernels consume different computing power resources. In addition, in a process of sequentially executing the kernels, resource utilization of the device is unstable, and some computing power resources (for example, two computing units in FIG. 22) are in an idle state. Therefore, in this embodiment of this application, an objective of constructing the computing power assessment model is to select, from candidate node combinations for fusion, a target node combination that can improve utilization of the computing power resources of the device. In this way, a plurality of nodes that support parallel execution are fused into one node for execution, to improve average resource utilization of the device, and further improve overall performance of the entire acceleration hardware.

It should be noted that, in some embodiments of this application, to fuse, as far as possible, all nodes that support fusion, the foregoing process of fusing a plurality of nodes in the third parallelizable branch group that respectively belong to different sub-branches is performed iteratively. To be specific, the foregoing operation of fusing a plurality of nodes in the third parallelizable branch group that respectively belong to different sub-branches is repeatedly performed, until a quantity of unfused nodes in the third parallelizable branch group is less than 2.

For ease of understanding, operations of the entire combination search process are described in detail below.

Operation 1: First, select an unfused third parallelizable branch group from a parallelizable branch group in which a node that does not support fusion has been eliminated.

Operation 2: Select (for example, randomly select) one unfused node from each sub-branch in the third parallelizable branch group to obtain n unfused nodes, where the unfused node is a node that has not been fused, and $n \geq 2$. It should be noted that, in some embodiments of this application, a quantity of obtained unfused nodes may alternatively be equal to a quantity of effective sub-branches, and the effective sub-branch is a sub-branch that includes at least one unfused node before a current round of node selection. For example, assuming that the quantity of effective sub-branches is n', a total of n' unfused nodes are obtained.

Operation 3: Generate a new candidate node combination (namely, one of the m node combinations) based on the n nodes by using the candidate combination generation model.

Operation 4: Assess, by using the computing power assessment model, computing power to be consumed by the new candidate node combination, to obtain a new assessment result (namely, one of the m assessment results).

Operation 5: Determine whether the assessment result meets the preset condition, or repeat operation 3 and operation 4 until an assessment result meets the preset condition. Then select a candidate node combination corresponding to the assessment result that meets the preset condition as a target node combination (namely, the first node combination), and fuse the target node combination to obtain a fusion node (namely, the first fusion node). For example, it is assumed that seven unfused nodes are obtained in operation 2 and are denoted as nodes 0 to 6, and three target node combinations [0, 1, 5], [2, 4], and [3, 6] are obtained in operation 3 to operation 5. Therefore, fusion is separately performed to obtain three fusion nodes.

Operation 6: Repeat operation 2 to operation 5 until a quantity of unfused nodes in the third parallelizable branch group is less than 2.

It should be noted that, in some embodiments of this application, after an assessment result of a current round is obtained, whether the assessment result meets the preset condition may be determined, and then subsequent processing is performed based on a determining result; or after a plurality of assessment results (that is, at least two assessment results) are obtained through a plurality of rounds of searches for candidate node combinations, whether an assessment result of the plurality of assessment results meets the preset condition may be determined, and then subsequent processing is performed based on a determining result. Different cases are separately described below. The different cases include but are not limited to the following several cases.

(1) The assessment result meets a computing power requirement of a device that is the acceleration hardware and that specifically performs a computational task.

Figure 23:
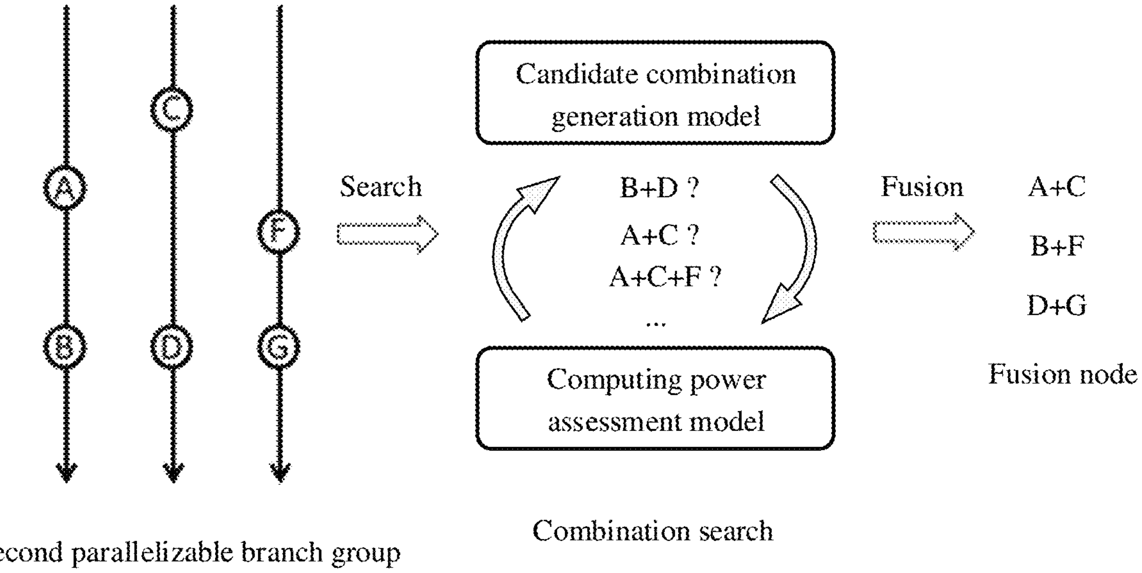
FIG. 23 is a schematic diagram of a search process of a combination search according to an embodiment of this application.

FIG. 23 is used below as an example for description. It is assumed that an unprocessed third parallelizable branch group obtained by the deep learning framework is shown in FIG. 23. The third parallelizable branch group includes a total of three sub-branches, and each sub-branch includes two nodes that support fusion (nodes that do not support fusion have been eliminated). First, one node is selected from each of the three sub-branches. For example, assuming that nodes A, C, and F are selected in a current round, the nodes A, C, and F form a candidate node combination A+C+F. Then computing power to be consumed by the candidate node combination A+C+F is assessed by using the constructed computing power assessment model, to obtain an assessment result. In this case, the assessment result indicates computing power resources to be consumed by the node combination. Then the deep learning framework determines whether the assessment result obtained in the current round meets the computing power requirement of the device that is the acceleration hardware and that specifically performs a computational task.

Assuming that the assessment result meets the computing power requirement of the device in the acceleration hardware, the candidate node combination A+C+F is a target node combination. In this case, the candidate node combination A+C+F is fused to obtain a fusion node. Because the fusion node is obtained by fusing the candidate node combination A+C+F, the three fused nodes need to be identified as fused nodes in the original three sub-branches, so that the nodes A, C, and F are ignored in a subsequent node search process.

Assuming that the assessment result does not meet the computing power requirement of the device in the acceleration hardware, it indicates that the nodes A, C, and F are not suitable for fusion. In this case, one node may be sequentially removed (for example, one node may be randomly removed) to obtain a new candidate node combination, until a candidate node combination suitable for fusion is found. For example, the node A is first removed, and a new candidate node combination C+F is obtained. Then computing power to be consumed by the candidate node combination C+F is assessed by using the constructed computing power assessment model, to obtain an assessment result. Then the deep learning framework determines, in a similar manner, whether the assessment result meets the computing power requirement of the device in the acceleration hardware. Assuming that the computing power requirement is still not met, the node A is retained, and the node C is removed. In this case, a new candidate node combination A+F is obtained. Then whether an assessment result corresponding to the candidate node combination A+F meets the computing power requirement of the device in the acceleration hardware is determined according to a process similar to the foregoing process. Assuming that the corresponding computing power requirement is met, the candidate node combination A+F is a target node combination, and the candidate node combination A+F is fused to obtain a fusion node. Similarly, the two fused nodes need to be identified as fused nodes in the original three sub-branches, so that the nodes A and F are ignored in a subsequent node search process. In this case, only the node C is retained, and the node C continues to participate in a next-round node search as an unfused node. The foregoing process is a search process of one round.

Subsequently, combination search is further performed according to the foregoing search process, until a quantity of unfused nodes of the nodes is less than 2. For example, it is assumed that, after several rounds of searches are performed in FIG. 23, a total of three target node combinations are obtained, that is, A+C, B+F, and D+G, and all of the nodes are fused.

It should be noted that, in the search process of the current round, assuming that no candidate node combination that supports fusion is found after one node is sequentially removed, two nodes are then sequentially removed under the premise that a quantity of retained nodes is greater than 2. For ease of understanding, operations of the search process are described in detail below.

Operation 1: Assuming that a quantity of sub-branches in a third parallelizable branch group is n and a quantity of nodes extracted in a first round is n, the n nodes may be identified to obtain nodes 1 to n.

Operation 2: Select nodes p to n to generate a candidate node combination (a start value of p is 1), and provide the generated candidate node combination for the computing power assessment model to perform computing power assessment, to obtain an assessment result. If the assessment result does not meet the computing power requirement of the device in the acceleration hardware, sequentially reduce a quantity of nodes until a candidate node combination suitable for fusion is found, where a quantity of nodes included in the found candidate node combination suitable for fusion is denoted as k. In this case, the obtained candidate node combination suitable for fusion is [p, . . . , (p+k−1)], and the following update is performed: p=p+k.

Operation 3: Repeat operation 2 until a quantity of unfused nodes of then nodes is less than 2.

To sum up, in this embodiment of this application, a principle for constructing the computing power assessment model is to consider only whether computing power resources to be consumed by a candidate node combination meets the computing power requirement of the device that is in acceleration hardware and that specifically performs a computational task. Therefore, a calculation formula of the computing power assessment model may be shown in the following formula (1):

$$\text{gain} = \sum_i^k (\text{cal}_i) < q \times D_{all} \quad (1)$$

gain indicates an assessment result corresponding to a currently selected candidate node combination. $D_{all}$ indicates total computing power resources on the device. k indicates a quantity of nodes that are selected in a current round and that form the candidate node combination. i indicates an $i^{th}$ node of the k nodes. $\text{cal}_i$ indicates a size of computing power resources to be consumed during execution of the node i, and $\text{cal}_i$ may be obtained through analysis based on a size of the corresponding node i, a data type, and the like. In this embodiment of this application, impact of other nodes is not considered in computing power assessment, and the computing power assessment is related only to a characteristic of the node. q indicates a preset coefficient (for example, a value of q may be any value ranging from 0.7 to 1.5). This is specifically set according to a user requirement, and is not limited herein. When the assessment result corresponding to the candidate node combination meets the foregoing formula (1), it indicates that the assessment result meets the computing power requirement of the device that is in the acceleration hardware and that specifically performs a computational task.

(2) The assessment result is optimal among the obtained m assessment results.

FIG. 23 is still used below as an example for description. It is assumed that an unprocessed third parallelizable branch group obtained by the deep learning framework is shown in FIG. 23. The third parallelizable branch group includes a total of three sub-branches, and each sub-branch includes two nodes that support fusion (nodes that do not support fusion have been eliminated). First, one node is selected from each of the three sub-branches. For example, assuming that nodes A, C, and F are selected in a current round, the nodes A, C, and F may form a total of four candidate node combinations: candidate node combinations A+C+F, A+C, A+F, and C+F. Then computing power to be consumed by each of the candidate node combinations A+C+F, A+C, A+F, and C+F is assessed by using the constructed computing power assessment model, to obtain four assessment results (that is, m=4). In this case, the assessment results indicate computing power resources to be saved by the node combinations. A larger amount of computing power resources to be saved indicates a better assessment result and a larger gain. Finally, a candidate node combination corresponding to an optimal result selected from the four assessment results is fused to obtain a fusion node. For example, assuming that an assessment result corresponding to the candidate node combination A+C+F is optimal, the candidate node combination A+C+F is fused to obtain a fusion node. Because the fusion node is obtained by fusing the candidate node combination A+C+F, the three fused nodes need to be identified as fused nodes in the original three sub-branches, so that the nodes A, C, and F are ignored in a subsequent node search process. Assuming that an assessment result corresponding to the candidate node combination C+F is optimal, the candidate node combination C+F is fused to obtain a fusion node. Similarly, the two fused nodes need to be identified as fused nodes in the original three sub-branches, so that the nodes A and F are ignored in a subsequent node search process. In this case, only the node C is retained, and the node C continues to participate in a next-round node search as an unfused node. The foregoing process is a search process of one round.

Subsequently, combination search is further performed according to the foregoing search process, until a quantity of unfused nodes of the nodes is less than 2. A process is similar to that in the manner (1), and details are not described herein again.

However, it should be noted that, in this embodiment of this application, a principle for constructing the computing power assessment model is slightly different from that in the manner (1). The principle for constructing the computing power assessment model in this embodiment of this application is to select a candidate node combination with an optimal assessment result from a plurality of candidate node combinations. Therefore, a calculation formula of the computing power assessment model may be shown in the following formula (2):

$$\text{gain} = \left(\left(\sum_i^k cal_i\right) - \max_k (cal_i)\right) \quad (2)$$

gain indicates an assessment result corresponding to a currently selected candidate node combination. For example, if there are m candidate node combinations, m assessment results (gain) corresponding to the m candidate node combinations may be obtained based on the formula (2). k indicates a quantity of currently selected nodes that form the candidate node combination, k≤n, and n indicates a total quantity of nodes selected in a current round. i indicates an $i^{th}$ node of the k nodes. $cal_i$ indicates a size of computing power resources to be consumed during execution of the node i.

$$\max_k(\text{cal}_i)$$

indicates computing power resources to be consumed by a node with highest consumption of computing power resources in the currently selected candidate node combination.

m assessment results (gain) may be obtained based on the formula (2). Then values of the gains are compared. A larger gain value indicates a better assessment result. Therefore, a candidate node combination corresponding to an assessment result that has a largest gain value and that is selected from the obtained m assessment results (gain) is fused to obtain a fusion node, and a remaining unfused node enters a search process of a next round. A process is similar to the foregoing process, and details are not described herein again. In addition, it can be learned from the formula (2) that a fusion node is obtained by preferentially fusing nodes that need to consume similar amounts of computing power resources. In this case, an optimal gain is achieved.

It should be noted that, it can be learned from the formula (2) of the computing power assessment model that a gain of an assessment result comes from a difference between a total value and a maximum value to some extent. Therefore, when the maximum value accounts for a large proportion of the total value, the gain is small. Therefore, in some embodiments of this application, the calculation formula of the computing power assessment model may alternatively be represented by a ratio, and may be specifically shown in the following formula (3):

$$\text{gain} = \max_k (cal_i) / \left(\sum_i^k cal_i\right) \quad (3)$$

Parameters in the formula (3) have the same meanings as those in the formula (2), and details are not described herein again. m assessment results (gain) may be obtained based on the formula (3). Then values of the gains are compared. A smaller gain value indicates a better assessment result. Therefore, a candidate node combination corresponding to an assessment result that has a smallest gain value and that is selected from the obtained m assessment results (gain) is fused to obtain a fusion node, and a remaining unfused node enters a search process of a next round. A process is similar to the foregoing process, and details are not described herein again.

It should be noted that, in some embodiments of this application, in a case, candidate node combinations may be formed based on all nodes in the third parallelizable branch group, assessment results corresponding to all the candidate node combinations are obtained based on the constructed computing power assessment model, and then one or more candidate node combinations that are most suitable for fusion are sequentially selected based on the assessment results for fusion, to obtain one or more fusion nodes. For ease of understanding, an example is used below for description. Still refer to FIG. 23. It is assumed that an unprocessed third parallelizable branch group obtained by the deep learning framework is shown in FIG. 23. The third parallelizable branch group includes a total of three sub-branches, and each sub-branch includes two nodes that support fusion (nodes that do not support fusion have been eliminated). Therefore, a total of six nodes are included: nodes A, B, C, D, F, and G. According to a principle that any two nodes in a candidate node combination cannot belong to a same sub-branch, the six nodes may be combined to obtain a total of 20 candidate node combinations: A+C+F, A+C+G, A+D+F, A+D+G, B+C+F, B+C+G, B+D+F, B+D+G, A+C, A+F, A+D, A+G, C+F, C+G, B+C, B+F, B+D, B+G, D+F, and D+G. Then computing power to be consumed by each of the 20 candidate node combinations is assessed by using the constructed computing power assessment model, to obtain 20 assessment results (that is, m=20). Finally, a candidate node combination corresponding to an optimal assessment result sequentially selected from the 20 assessment results is fused to obtain a fusion node. For example, assuming that an assessment result of A+C is optimal among the 20 candidate assessment results, A+C is first fused to obtain a fusion node, and the fused nodes A and C are identified as fused nodes. Therefore, candidate node combinations including the nodes A and C are excluded from the remaining 19 candidate node combinations. After the exclusion, seven candidate node combinations remain: B+D+F, B+D+G, B+F, B+D, B+G, D+F and D+G. Then a candidate node combination corresponding to an optimal assessment result that is sequentially selected from seven assessment results corresponding to the seven candidate node combinations is fused to obtain a second fusion node. For example, assuming that an assessment result of B+F is optimal among the seven candidate assessment results, B+F is fused to obtain a fusion node, and the fused nodes B and F are identified as fused nodes. After the foregoing two rounds, the candidate node combination D+G finally remains, and the remaining candidate node combination D+G is fused to obtain a third fusion node. In this embodiment of this application, the constructed computing power assessment model is similar the formula (2) and the formula (3), and details are not described herein again.

(3) The assessment result is optimal among x assessment results, where the x assessment results are at least two of all the m assessment results.

In this case, the assessment results still indicate computing power resources to be saved by node combinations. A larger amount of computing power resources to be saved indicates a better assessment result and a larger gain. FIG. 23 is still used as an example for description. It is assumed that an unprocessed third parallelizable branch group obtained by the deep learning framework is shown in FIG. 23. The third parallelizable branch group includes a total of three sub-branches, and each sub-branch includes two nodes that support fusion (nodes that do not support fusion have been eliminated). First, one node is selected from each of the three sub-branches. For example, assuming that nodes A, C, and F are selected in a current round, in the combination manner of the formula (2), the nodes A, C, and F may form a total of four candidate node combinations (that is, m=4). However, in the manner (3), only at least two candidate node combinations need to be obtained, and a candidate node combination with an optimal assessment result is selected from the at least two candidate node combinations. This combination manner is a local optimum selection process. This reduces an amount of computation while ensuring a good result. For example, the nodes A, C, and F may be combined (for example, randomly combined) to obtain two candidate node combinations (that is, x=2): candidate node combinations A+C+F and A+C. Then computing power to be consumed by each of the candidate node combinations A+C+F and A+C is assessed by using the constructed computing power assessment model, to obtain two assessment results. Finally, a candidate node combination corresponding to an optimal assessment result selected from the two assessment results is fused to obtain a fusion node. For example, assuming that an assessment result corresponding to the candidate node combination A+C+F is optimal, the candidate node combination A+C+F is fused to obtain a fusion node. Because the fusion node is obtained by fusing the candidate node combination A+C+F, the three fused nodes need to be identified as fused nodes in the original three sub-branches, so that the nodes A, C, and F are ignored in a subsequent node search process. Assuming that an assessment result corresponding to the candidate node combination A+C is optimal, the candidate node combination A+C is fused to obtain a fusion node. Similarly, the two fused nodes need to be identified as fused nodes in the original three sub-branches, so that the nodes A and C are ignored in a subsequent node search process. In this case, only the node F is retained, and the node F continues to participate in a next-round node search as an unfused node. The foregoing process is a search process of one round.

Subsequently, combination search is further performed according to the foregoing search process, until a quantity of unfused nodes of the nodes is less than 2. A process is similar to that in the manner (2), and details are not described herein again.

It should be noted that, in the manner (3), the constructed computing power assessment model is similar to that in the manner (2). Refer to the formula (2) and the formula (3). Details are not described herein again.

A computational graph including a fusion node may be obtained through operation 901 and operation 902. The computational graph may be referred to as a second computational graph. After obtaining the second computational graph, the deep learning framework may further compile the second computational graph to obtain a compiled second computational graph. The compiled second computational graph may be directly loaded to acceleration hardware for execution.

It should be noted that, in some embodiments of this application, a process of compiling the second computational graph includes two parts. As shown in FIG. 8, one part is ordinary node compilation. To be specific, an unfused node (including a node that does not support fusion and a node that has not been fused) is compiled. This part of compilation process is similar to that in the conventional technology. For details, refer to the implementation corresponding to FIG. 4. Details are not described herein again. The other part is fusion node compilation. To be specific, a fusion node is compiled to obtain a kernel corresponding to the fusion node.

It should be noted that, in some embodiments of this application, to retain parallelism between nodes preceding the fusion node, in this application, when the fusion node is compiled to generate the kernel, the kernel is generated through staged combination, and code segments retain clear independence through code branching. In the staged combination, IR generation is divided into two stages: (1) Each node is independently scheduled to obtain sub-IRs whose quantity is equal to a quantity of nodes in a first stage. (2) Then the sub-IRs are fused and modified to obtain a total IR in a second stage. Specifically, assuming that a fusion node is obtained by fusing p nodes, a manner of compiling the fusion node to obtain a corresponding kernel may be specifically as follows: First, the p nodes are independently scheduled to obtain p sub-IRs. Then the p sub-IRs are fused to obtain a total IR. Finally, the total IR is compiled to obtain a kernel corresponding to the fusion node.

Figure 24:
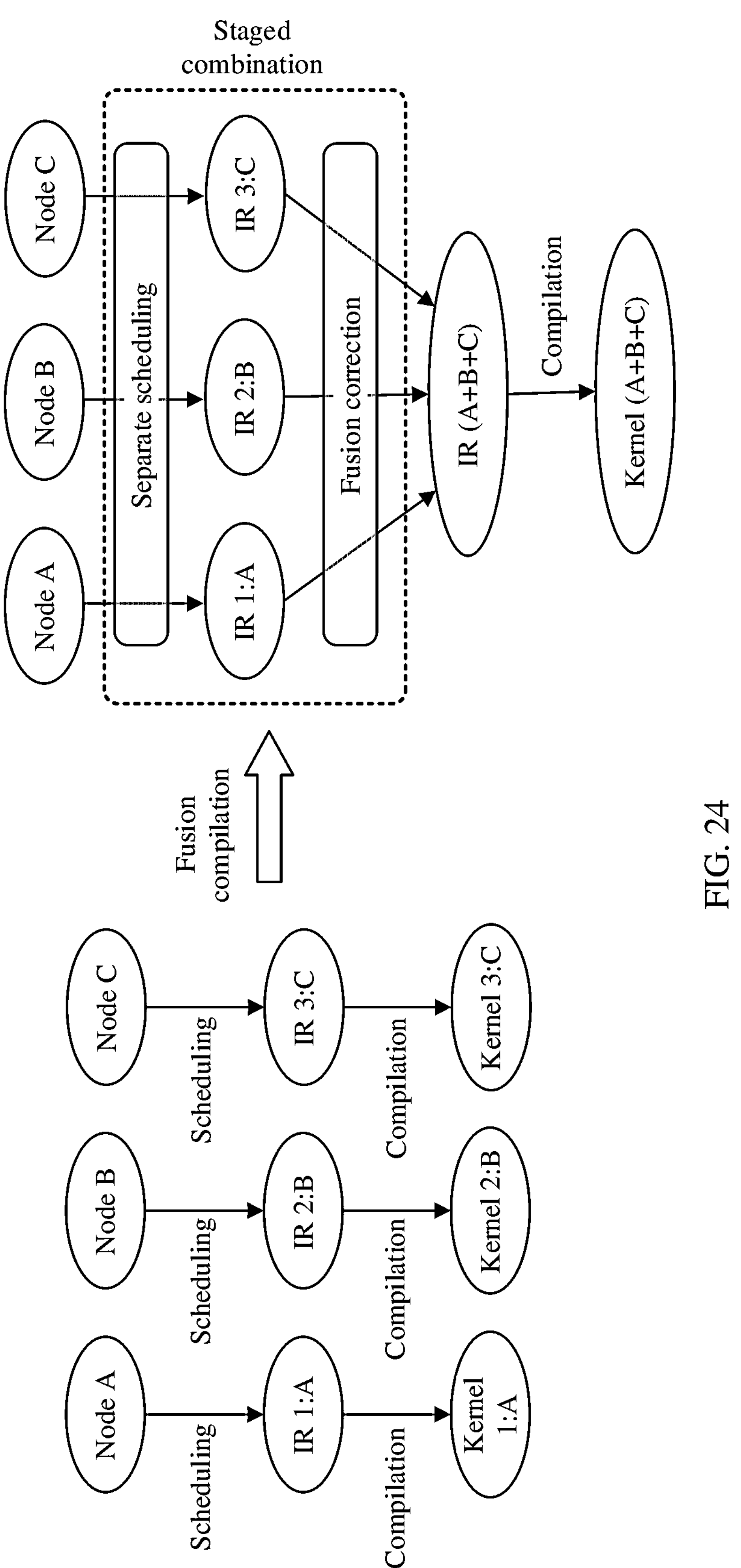
FIG. 24 is a schematic diagram of comparison between ordinary node compilation and fusion node compilation according to an embodiment of this application.

For ease of understanding, an example is used below for description. FIG. 24 is a schematic diagram of comparison between ordinary node compilation and fusion node compilation according to an embodiment of this application. It is assumed that nodes A, B, and C are all nodes that support fusion. If the nodes A, B, and C are not fused, a compiler (which may also be referred to as an encoder) performs ordinary node compilation on the nodes A, B, and C. To be specific, as shown in a diagram on the left of FIG. 24, the compiler separately schedules the nodes A, B, and C to obtain intermediate representations IR 1, IR 2, and IR 3 respectively corresponding to the three nodes; and then further compiles the IR 1, the IR 2, and the IR 3 to obtain a kernel 1, a kernel 2, and a kernel 3 respectively corresponding to the nodes A, B, and C. The obtained three kernels may be directly sequentially loaded to a device in corresponding acceleration hardware, and computing units (such as SMs or cores) on the device sequentially execute corresponding kernels. If the nodes A, B, and C are fused by using the node fusion method for a computational graph in this application, the compiler performs fusion node compilation on the nodes A, B, and C. To be specific, as shown in a diagram on the right of FIG. 24, the compiler separately schedules the nodes A, B, and C to obtain intermediate representations IR 1, IR 2, and IR 3 respectively corresponding to the three nodes; then fuses the intermediate representations IR 1, IR 2, and IR 3 to obtain a total intermediate representation IR (A+B+C); and finally, compiles the IR (A+B+C) to obtain an operator kernel (kernel) (A+B+C).

It can be learned from the foregoing descriptions that an advantage of the staged combination lies in that to-be-fused nodes are not scheduled in a unified manner, but are separately analyzed and then fused. In this manner, relative independence of kernels corresponding to the nodes can be retained, and independent code segments are formed, so that parallelism between the code segments is clearly expressed. On this basis, during compilation of the total IR, code branching is performed to isolate computing resources of original computational logic of the nodes (to be specific, each node corresponds to one or more specific computing units before fusion), so that parallelism between the code segments is clearer in the kernels.

Figure 25:
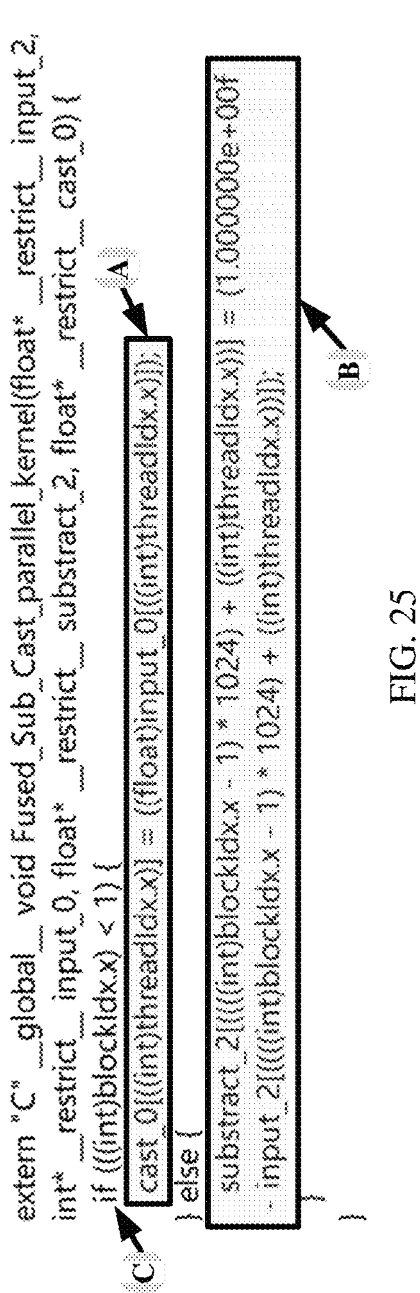
FIG. 25 shows a specific code example of staged combination according to an embodiment of this application.

A specific code example is used below to describe the foregoing staged combination process. As shown in FIG. 25, C indicates a branching condition, A indicates a code segment of a Cast node, and B indicates a code segment of a Sub node. C specifies a resource condition: blockIdx. x<1. When a resource number (namely, identification information) blockIdx. x meets the condition, Cast calculation in the code segment A is performed. When the resource number does not meet the condition, Sub calculation in the code segment B is performed. Therefore, the code segments A and B may be executed in parallel based on a hardware characteristic of parallel computing of acceleration hardware (for example, a GPU). It should be noted that FIG. 25 shows CUDA code of the kernel. input_2 and input_0 are input data addresses of the code. subtract_2 and cast_0 are output data addresses of the code. In the CUDA, different computing resources may be distinguished by using blockIdx.x and threadIdx.x, and data indexes may be calculated. For example, in the code segment B, data that comes from input_2 and that needs to be used in a current subtraction operation is determined based on ((int)ablockIdx. x−1)×1024)+((int)threadIdx.x).

It should be noted that, in actual application of the deep learning framework, a compiler (for example, an AKG or an LLVM) in the deep learning framework may independently perform scheduling analysis on each fusion node, and the compiler obtains corresponding executable code by transmitting a hardware instruction. The encoder AKG is used below as an example to describe an entire process of compiling a fusion node. In this embodiment of this application, a fusion node is compiled by the AKG, and a staged combination process is added to a compilation process of the AKG. To be specific, scheduling analysis originally performed by the AKG on a node is converted into staged combination performed on each fusion node. Specifically, before a hardware instruction is transmitted, a first stage of the staged combination is performed. In the first stage, the AKG performs scheduling analysis on each to-be-fused node to obtain information about computing power resource usage of each node after scheduling (to be specific, computing power resources to be consumed by each node during actual execution, for example, a block size in a GPU) and a corresponding sub-IR. As shown in FIG. 26, a schematic sub-diagram (a) and a schematic sub-diagram (b) in FIG. 26 respectively show sub-IRs corresponding to a Sqrt node and a Divide node before fusion. In a second stage of the staged combination, resource information of sub-IRs is corrected. As indicated by parts with gray background in sub-IRs in FIG. 26, the Sqrt node uses blocks 0 to 3 and therefore a block ID of the Sqrt node does not need to be corrected, and the Divide node uses blocks 4 to 7 and therefore a related index needs to be corrected to (blockIdx.x−4). After the correction, code branches are added to integrate all sub-IRs. Integrated code is shown in a schematic sub-diagram (c) in FIG. 26, and is a total IR of a fusion node. After the total IR of the fusion node is obtained, the AKG continues to perform a remaining compilation process, to generate code of a kernel corresponding to a final fusion node (Sqrt+Divide).

It should be noted that, in the code corresponding to FIG. 26, produce T_sqrt{ . . . } indicates that T_sqrt is used by an object in the braces, //attr[iter_var(blockIdx.x, range (min=0, ext=8), blockIdx.x)]thread_extent=8 indicates that a value range of blockIdx.x is 0-8 when a current IR is executed, and //attr[iter_var(threadIdx.x, range(min=0, ext=256), threadIdx.x)]thread_extent=256 indicates that a value range of threadIdx.x is 0-1024 when the current IR is executed. In this case, the schematic sub-diagrams in FIG. 26 indicate the following: 1. The schematic sub-diagram (a) indicates that a sqrt operation is performed on input_2, a result is written into T_sqrt, a total of four blocks need to be allocated during execution, and each block needs to be divided into 256 threads. 2. The schematic sub-diagram (b) indicates that an input_0/input_1 operation is performed, a result is written into T_divide_input_0_input_1, a total of four blocks need to be allocated during execution, and each block needs to be divided into 256 threads. 3. The schematic sub-diagram (c) indicates that, after the sub-IR in (a) is combined with the sub-IR in (b), a total of eight blocks need to be allocated, each block needs to be divided into 256 threads, and when blockIdx.x<4 and threadId.x<256, an input_2 operation is performed, and a result is written into T_sqrt, or when blockIdx.x≥4 and threadIdx.x<256, an input_0/input_1 operation is performed, and a result is written into T_divide_input_0_input_1.

Figure 27:
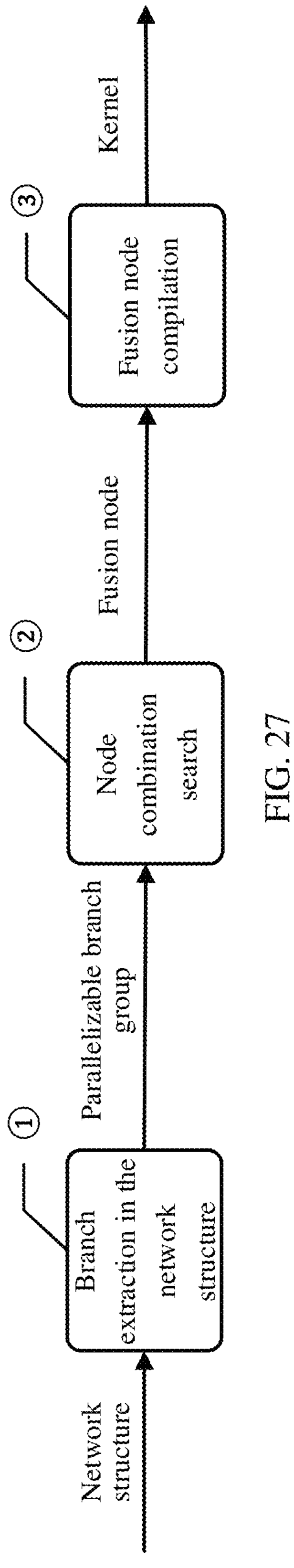
FIG. 27 is a schematic flowchart of a node fusion method for a computational graph according to an embodiment of this application.

To sum up, the node fusion method for a computational graph in this embodiment of this application may be summarized into a schematic flowchart shown in FIG. 27, and may include three main operations, which may be summarized as follows.

① Branch Extraction in a Network Structure

A network structure of a computational graph is analyzed to obtain a connection relationship between nodes in the network structure, for example, whether there is a common parent node or a common child node or whether there is no parent node or no child node, and one or more parallelizable branch groups are found in the network structure based on this. Each parallelizable branch group includes one or more sub-branches, there is no connection relationship between the sub-branches, and a computational graph obtained by fusing any two or more nodes that are in the sub-branches and that respectively belong to different sub-branches includes no ring structure. After branch extraction is completed, several parallelizable branch groups may be obtained. During extraction, a parallelizable branch group is searched for only based on a connection relationship between nodes in the computational graph, and a search process is not interrupted by an individual node that does not support fusion. This increases a hit rate during searching for nodes that support fusion in a neural network.

② Node Combination Search

In a parallelizable branch group, each sub-branch includes one or more nodes, nodes in different sub-branches may be combined into a fusion node, and nodes in a same sub-branch cannot be fused due to a connection relationship. In the parallelizable branch group, one or more fusion nodes may be obtained based on the combination search mode described in the embodiment corresponding to operation 902. In some implementations, a constructed computing power assessment model may be further used to guide a search for a fusion node, to ensure that a fused node combination can produce an expected gain.

③ Fusion Node Compilation

Different from ordinary node compilation, to implement parallel fusion in execution, an entire compilation process needs to be parallelized based on information of nodes that exist before fusion, so that a kernel obtained by compiling a fusion node has a parallelism characteristic, and is executed by a device as an integration of the nodes that exist before fusion. Specifically, the staged combination manner is used. To be specific, scheduling analysis is independently performed on each node to obtain a code branch of the node, and a fusion node is obtained based on code branches. Advantages of the staged combination are as follows: Scheduling analysis is independently performed on each node. This improves flexibility of fusion, and ensures that code of the fusion node is correctly generated. In addition, parallelism is still retained between generated kernels, and corresponding acceleration hardware is allowed to perform further parallel optimization.

Figure 28:
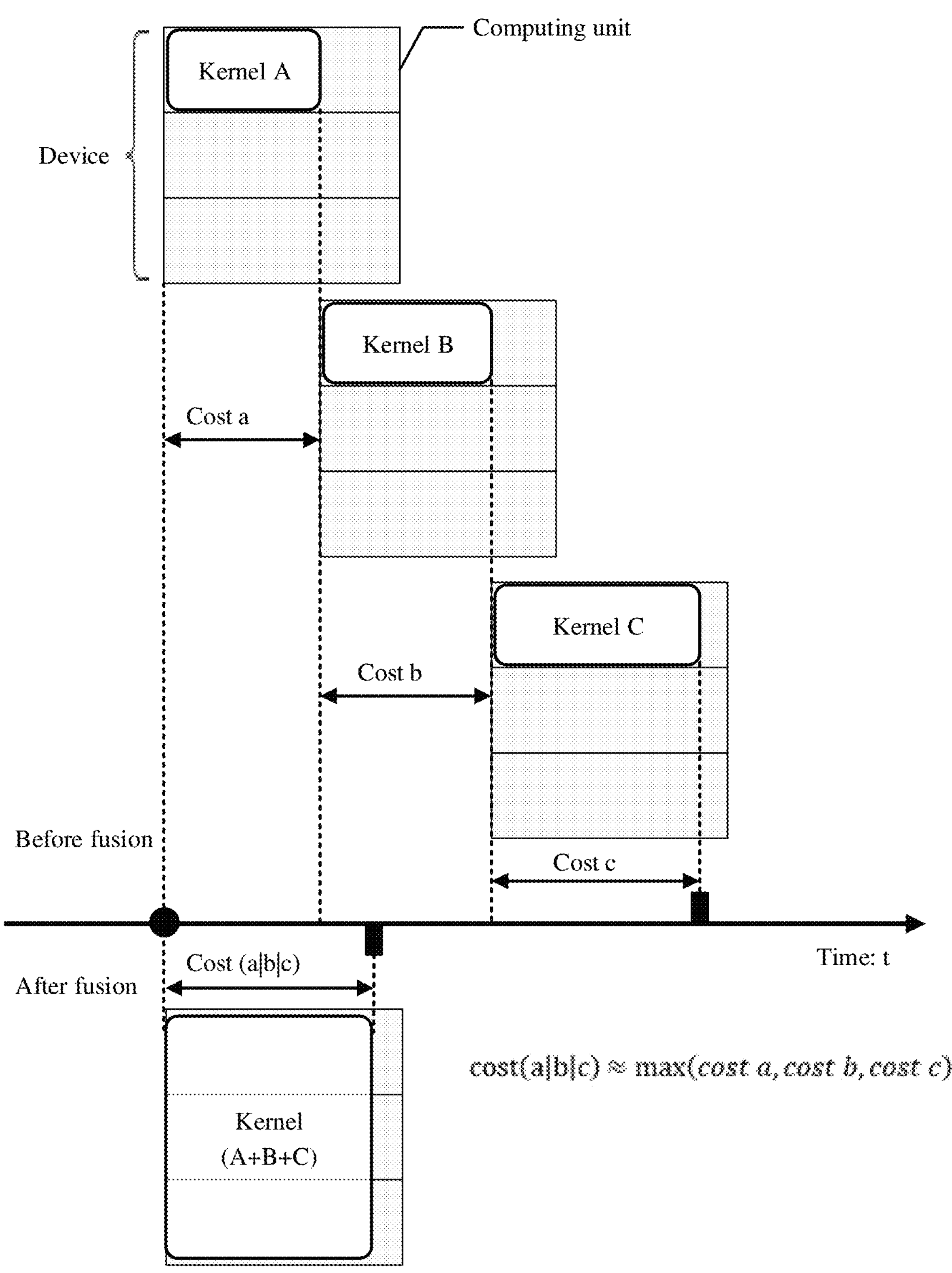
FIG. 28 is a schematic diagram of gains obtained when kernels are executed on a device before and after node fusion is performed according to an embodiment of this application.

For clearer understanding of benefits of this embodiment of this application, the following further performs comparison on technical effect of this embodiment of this application. FIG. 28 shows gains obtained when kernels are executed on a device before and after node fusion is performed according to an embodiment of this application. A horizontal coordinate axis in FIG. 28 indicates execution time t. It is assumed that a computational graph includes three nodes that support fusion. If the three nodes are compiled as ordinary nodes, the three nodes are respectively compiled into a kernel A, a kernel B, and a kernel C. According to an original topological sorting manner, the kernel A, the kernel B, and the kernel C need to be sequentially executed on a device. As shown in a part above the horizontal coordinate in FIG. 28, a cost a, a cost b, and a cost c indicate time spent in sequentially executing the kernel A, the kernel B, and the kernel C on the device. If the three nodes that support fusion are fused according to the node fusion method described in this embodiment of this application, a fusion node is obtained, and the fusion node is compiled into a kernel (A+B+C). A cost (a|b|c) indicates time spent in executing the kernel (A+B+C) on the device. It is assumed that a small circle on the horizontal coordinate indicates an execution start moment of a computational task, and a small block on the horizontal coordinate indicates an execution end moment of the computational task. In this case, it can be learned from FIG. 28 that execution time spent by the device after the node fusion is greatly shortened compared with execution time spent by the device before the node fusion.

To sum up, a gain of the node fusion method for a computational graph in this embodiment of this application mainly comes from two parts: (1) A quantity of times that kernels are loaded to a device is reduced. A quantity of times that kernels are loaded is equal to a total quantity of nodes in a computational graph after nodes are fused. For example, as shown in FIG. 28, there are originally three nodes. After the three nodes are compiled into three kernels, the three nodes need to be separately loaded three times. However, after the three nodes are fused into a fusion node, the fusion node may be compiled into one kernel, and the kernel needs to be loaded only once. (2) A gain of parallelism is obtained when a fusion node is executed on the device. For example, as shown in FIG. 28, it is assumed that computing power resources on the device are three computing units, and each of the kernel A, the kernel B, and the kernel C uses computing power resource of only one computing unit. Therefore, a total quantity of computing power resources can allow fusion of A, B, and C (in more complex and detailed analysis, even if a total quantity of resources is insufficient, parallel execution of A, B, and C may be superior than separate execution). In addition, A, B, and C still retain parallelism in the fusion kernel (A+B+C), consumption of execution of A, B, and C is approximately equal to highest time consumption of the three nodes. Therefore, a gain of the fusion node is shown in the following formula (4):

$$\text{gain} = \text{cost}(a|b|c) \approx \max(\text{cost } a, \text{cost } b, \text{cost } c) \tag{4}$$

It should be noted that, in a GPU V100 environment in which BERT-Base that has a batch size of 32 and that uses a LAMB optimizer runs, a total of 1425 groups of fusion nodes can be found by using the node fusion method for a computational graph in this embodiment of this application. In terms of performance, compared with performance achieved without parallel fusion, a gain of an iteration is appropriately 23.87 ms, and an optimization proportion is approximately 6%.

To sum up, in the foregoing embodiments of this application, nodes in a computational graph that support fusion are fused, to combine ordinary nodes scattered in the computational graph into a fusion node (this may be considered as combining small nodes into a large node). This improves utilization resources of a device during operation of acceleration hardware, reduces a quantity of times that kernels are loaded, and improves overall execution performance of a network.

Figure 29:
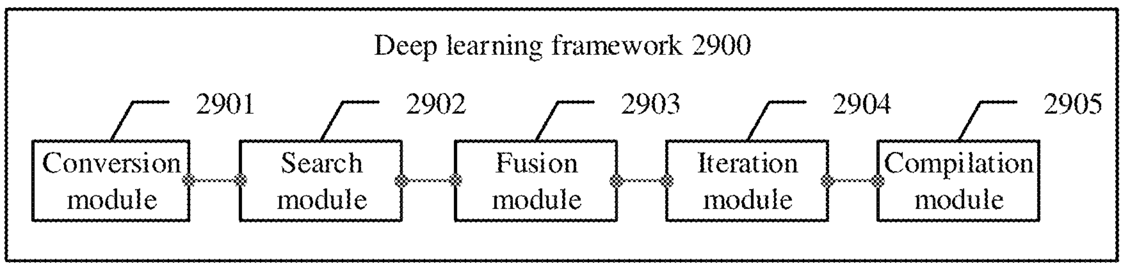
FIG. 29 is a schematic diagram of a structure of a deep learning framework according to an embodiment of this application.

Based on the foregoing corresponding embodiments, to better implement the foregoing solutions in embodiments of this application, the following further provides a deep learning framework for implementing the foregoing solutions. Specifically, FIG. 29 is a schematic diagram of a structure of a deep learning framework according to an embodiment of this application. The deep learning framework 2900 includes a conversion module 2901, a search module 2902, and a fusion module 2903. The conversion module 2901 is configured to convert a neural network into a computational graph. The obtained computational graph may be referred to as a first computational graph, and the first computational graph represents computational logic of the neural network. The search module 2902 is configured to extract one or more parallelizable branch groups from the first computational graph based on a connection relationship between nodes in the first computational graph. The parallelizable branch group indicates that a plurality of sub-branches of the parallelizable branch group support parallel execution. A first parallelizable branch group included in the parallelizable branch group meets at least one of the following conditions: Input for all sub-branches in the first parallelizable branch group comes from a same node and output of at least two sub-branches in the first parallelizable branch group is directed to different nodes, output of all sub-branches in the first parallelizable branch group is directed to a same node and input for at least two sub-branches in the first parallelizable branch group comes from different nodes, none of $1^{st}$ nodes of sub-branches in the first parallelizable branch group has a parent node, or none of last nodes of sub-branches in the first parallelizable branch group has a child node. The fusion module 2903 is configured to: for each parallelizable branch group, fuse a plurality of nodes in each parallelizable branch group that respectively belong to different sub-branches, to obtain a second computational graph. To be specific, a sub-branch to which each of the plurality of nodes belongs is different from a sub-branch to which any other one of the plurality of nodes belongs.

In the foregoing embodiment of this application, compared with the conventional technology possibilities of some other parallelizable branches are considered, so that parallelizable branch combinations different from those defined by a rule in the conventional technology are found, and nodes in the branch combinations may be fused during node fusion of a computational graph. This extends a range of nodes that support fusion and that can be obtained.

In a possible design, when there are a plurality of parallelizable branch groups, the parallelizable branch groups further include a second parallelizable branch group, and the second parallelizable branch group meets the following conditions: Input for all sub-branches in the second parallelizable branch group comes from a same node, output of at least two sub-branches in the second parallelizable branch group is directed to a same node, and each sub-branch in the second parallelizable branch group includes at least two nodes.

In the foregoing embodiment of this application, a manner of obtaining the parallelizable branch group based on the connection relationship between the nodes in the first computational graph may be the foregoing manner of obtaining the second parallelizable branch group, and is widely applicable.

In a possible design, the fusion module 2903 is further configured to eliminate a node that does not support fusion from each sub-branch in each parallelizable branch group (namely, a target parallelizable branch group), to obtain each parallelizable branch group (which may be referred to as a third parallelizable branch group) in which the node that does not support fusion has been eliminated. Any sub-branch in the target parallelizable branch group may be referred to as a target sub-branch. Then a plurality of nodes (nodes that support fusion but have not been fused, that is, to-be-fused nodes), respectively belonging to different sub-branches, in each parallelizable branch group (namely, the third parallelizable branch group) in which the node that does not support fusion has been eliminated are fused, to obtain a fusion node. The second computational graph includes the fusion node and an unfused node (the unfused node is a node that has not been fused) in the first computational graph. A sub-branch to which each of the plurality of nodes in the third parallelizable branch group belongs is different from a sub-branch to which any other one of the plurality of nodes belongs.

In the foregoing embodiment of this application, a specific manner of obtaining the second computational graph is described. To be specific, the node that does not support fusion is first eliminated from the first computational graph, and then remaining nodes that support fusion are fused to obtain the second computational graph. Because the node that does not support fusion is eliminated from the first computational graph in advance, fusion efficiency can be improved.

In a possible design, to fuse, as far as possible, all nodes that support fusion, the foregoing process of fusing a plurality of nodes in the third parallelizable branch group that respectively belong to different sub-branches is performed iteratively. To be specific, the deep learning framework 2900 in this embodiment of this application may further include an iteration module 2904. The iteration module 2904 is configured to trigger the fusion module 2903 to repeatedly perform the operation of fusing a plurality of nodes in the third parallelizable branch group to obtain a fusion node, until a quantity of unfused nodes in the third parallelizable branch group is less than 2.

In the foregoing embodiment of this application, the iteration module 2904 ensures that nodes that support fusion can be fused into a fusion node as far as possible, so that a fusion coverage area is increased.

In a possible design, the fusion module 2903 is specifically configured to: select an unfused node (for example, randomly selected) from each of a plurality of sub-branches in the third parallelizable branch group, to obtain n unfused nodes, where the unfused node is a node that has not been fused, and $n \geq 2$; generate m node combinations based on the selected n unfused nodes, where each of the m node combinations includes at least two unfused nodes, $m \geq 1$, and $2m \leq n$; assess, by using a constructed computing power assessment model, computing power required by each of the m node combinations, to obtain m assessment results, where each of the m assessment results represents one of the following cases: computing power resources to be consumed by each of the m node combinations, and computing power resources to be saved by each of the m node combinations; and when a first assessment result meets a preset condition, fuse a first node combination corresponding to the first assessment result to obtain a first fusion node, and mark each unfused node in the first node combination as a fused node, where the first assessment result is one of the m assessment results, and the first node combination is one of the m node combinations.

In the foregoing embodiment of this application, how the fusion module 2903 fuses nodes based on the combination search mode to obtain a fusion node is described, and the constructed computing power assessment model may be further used to guide a search for a fusion node, to ensure that a fused node combination can produce an expected gain.

In a possible design, that the first assessment result meets the preset condition includes at least one of the following cases: when each of the m assessment results represents computing power resources to be consumed by each of the m node combinations, the first assessment result meets a computing power requirement of a module (device) that is in target acceleration hardware and that specifically performs a computational task; when each of the m assessment results represents computing power resources to be saved by each of the m node combinations, the first assessment result is optimal among the m assessment results; or when each of the m assessment results represents computing power resources to be saved by each of the m node combinations, the first assessment result is optimal among x assessment results, where the x assessment results are at least two of the m assessment results.

As described in the foregoing embodiment of this application, there may be a plurality of specific determining manners for determining whether the first assessment result meets the preset condition. A user may select a determining manner according to a requirement of the user. This is flexible.

In a possible design, the search module 2902 is specifically configured to: search the first computational graph for a plurality of branches (which may be referred to as first branches) that have a same parent node (which may be referred to as a first common parent node or a common first parent node, and for ease of description, is collectively referred to as the first common parent node in embodiments of this application), and obtain a parallelizable branch group based on the plurality of first branches; or search the first computational graph for a plurality of branches (which may be referred to as second branches) that have a same child node (which may be referred to as a first common child node or a common first child node, and for ease of description, is collectively referred to as the first common child node in embodiments of this application), and obtain a parallelizable branch group based on the plurality of second branches. This search mode may also be referred to as a unidirectional search for a multi-branch structure.

In the foregoing embodiment of this application, a search mode for extracting the one or more parallelizable branch groups from the first computational graph based on the connection relationship between nodes in the first computational graph is described. In this search mode, searching is performed based on whether there is a common parent node or a common child node. Common parent nodes or common child nodes widely exists in a computational graph obtained through conversion from a neural network. Therefore, in this search mode, a large quantity of parallelizable branch groups can be obtained through searching.

In a possible design, the search module 2902 is further specifically configured to: search each first branch downward by using the first parent node as a start point, until a common second parent node or a common second child node is found during downward searching, to obtain a parallelizable branch group corresponding to the plurality of first branches, where the parallelizable branch group includes first sub-branches respectively corresponding to the plurality of first branches, and a node included in each first sub-branch is a node obtained during downward searching of each first sub-branch. It should be noted that each of the plurality of first sub-branches does not include the first common parent node or a common child node, that is, each first sub-branch does not include the first common parent node serving as the start point. In addition, during downward searching of each first branch, if another common parent node (namely, the second common parent node) is found, the second common parent node is added to a corresponding first sub-branch; and if a common child node is found, the common child node is excluded from the corresponding first sub-branch.

In the foregoing embodiment of this application, how the deep learning framework obtains a parallelizable branch group based on a plurality of first branches is described in detail, that is, downward searching is performed by using a common parent node as a start point. In this method for extracting a parallelizable branch group by using a common parent node as a start point, it can be ensured that nodes belonging to different sub-branches in one parallelizable branch group do not have inconsistent dependency behavior. For example, a sub-branch obtained through downward searching that starts from a common parent node does not include a common child node. This can ensure that node fusion across branches does not form a ring structure. Currently, in an existing node fusion mode for a computational graph, whether a ring is formed after node fusion needs to be determined. However, determining whether a ring is formed is a complex operation. In the search mode in this embodiment of this application, it is ensured that no ring structure appears. Therefore, whether a ring is formed does not need to be additionally determined for a combination obtained each time. This simplifies an operation process.

In a possible design, the search module 2902 is further specifically configured to: search each second branch upward by using the first child node as a start point, until a common third parent node or a common third child node is found during upward searching, to obtain a parallelizable branch group corresponding to the plurality of second branches, where the parallelizable branch group includes second sub-branches respectively corresponding to the plurality of second branches, and a node included in each second sub-branch is a node obtained during upward searching of each second sub-branch. It should be noted that each of the plurality of second sub-branches does not include the first common child node or a common parent node, that is, each second sub-branch does not include the first common child node serving as the start point. In addition, during upward searching of each second branch, if another common child node is found, the another common child node is added to a corresponding second sub-branch; and if a common parent node is found, the common parent node is excluded from the corresponding second sub-branch.

In the foregoing embodiment of this application, how the deep learning framework obtains a parallelizable branch group based on a plurality of second branches is described in detail, that is, upward searching is performed by using a common child node as a start point. In this method for extracting a parallelizable branch group by using a common child node as a start point, it can be ensured that nodes belonging to different sub-branches in one parallelizable branch group do not have inconsistent dependency behavior. For example, a sub-branch obtained through upward searching that starts from a common child node does not include a common parent node. This can ensure that node fusion across branches does not form a ring structure. Therefore, in the search mode in this embodiment of this application, it is also ensured that no ring structure appears, and whether a ring is formed does not need to be additionally determined for a combination obtained each time. This simplifies an operation process.

In a possible design, the search module 2902 is further specifically configured to: search the first computational graph for a plurality of third branches, and obtain a parallelizable branch group based on the plurality of third branches, where a $1^{st}$ node in each third branch has no parent node; and/or search the first computational graph for a plurality of fourth branches that do not include a child node, and obtain a parallelizable branch group based on the plurality of fourth branches, where a $1^{st}$ node in each third branch has no parent node.

In the foregoing embodiment of this application, another search mode for extracting the one or more parallelizable branch groups from the first computational graph based on the connection relationship between nodes in the first computational graph is described. In this search mode, searching is performed based on a node that has no parent node or child node. Nodes that have no parent node or child node also widely exist in a computational graph obtained through conversion from a neural network. Therefore, in addition to the foregoing search mode based on a common parent node or a common child node, in this search mode, a large quantity of parallelizable branch groups can also be obtained through searching. This search mode may also be referred to as a unidirectional search for a non-converging structure.

In a possible design, the search module 2902 is further specifically configured to: search each third branch downward by using the $1^{st}$ node in each third branch as a start point, until a same parent node or a same child node is found during downward searching, to obtain a parallelizable branch group corresponding to the plurality of third branches, where the parallelizable branch group includes third sub-branches respectively corresponding to the plurality of third branches, and a node included in each third sub-branch is a node obtained during downward searching of each third sub-branch. It should be noted that each of the plurality of third sub-branches does not include the common child node found during downward searching, that is, each third sub-branch may include the node serving as the start point. In addition, during downward searching of each third branch, if a common parent node is found, the common parent node may be added to a corresponding third sub-branch; and if a common child node is found, the common child node is excluded from the corresponding third sub-branch.

In the foregoing embodiment of this application, how the deep learning framework obtains a parallelizable branch group based on a plurality of third branches is described in detail, that is, downward searching is performed by using a node having no parent node as a start point. In this method for extracting a parallelizable branch group by using a node having no parent node as a start point, it can also be ensured that nodes belonging to different sub-branches in one parallelizable branch group do not have inconsistent dependency behavior. For example, a sub-branch obtained through downward searching that starts from a node having no parent node does not include a common child node. This can ensure that node fusion across branches does not form a ring structure. Therefore, in the search mode in this embodiment of this application, it can also be ensured that no ring structure appears, and whether a ring is formed does not need to be additionally determined for a combination obtained each time. This simplifies an operation process.

In a possible design, the search module 2902 is further specifically configured to: search each fourth branch upward by using the last node in each fourth branch as a start point, until a same parent node or a same child node is found during upward searching, to obtain a parallelizable branch group corresponding to the plurality of fourth branches, where the parallelizable branch group includes fourth sub-branches respectively corresponding to the plurality of fourth branches, and a node included in each fourth sub-branch is a node obtained during upward searching of each fourth sub-branch. It should be noted that each of the plurality of fourth sub-branches does not include the common parent node found during upward searching, that is, each fourth sub-branch may include the node serving as the start point. In addition, during downward searching of each fourth branch, if a common child node is found, the common child node may be added to a corresponding fourth sub-branch; and if a common parent node is found, the common parent node is excluded from the corresponding fourth sub-branch.

In the foregoing embodiment of this application, how the deep learning framework obtains a parallelizable branch group based on a plurality of fourth branches is described in detail, that is, upward searching is performed by using a node having no child node as a start point. In this method for extracting a parallelizable branch group by using a node having no child node as a start point, it can also be ensured that nodes belonging to different sub-branches in one parallelizable branch group do not have inconsistent dependency behavior. For example, a sub-branch obtained through upward searching that starts from a node having no child node does not include a common parent node. This can ensure that node fusion across branches does not form a ring structure. Therefore, in the search mode in this embodiment of this application, it can also be ensured that no ring structure appears, and whether a ring is formed does not need to be additionally determined for a combination obtained each time. This simplifies an operation process.

In a possible design, the search module 2902 is further specifically configured to: when a target node is not a node that does not support fusion, simplify a partial structure around the target node to obtain a fifth branch, where the target node is a node that is in the first computational graph and that does not belong to any parallelizable branch group; and when there are a plurality of fifth branches, obtain a parallelizable branch group based on the plurality of fifth branches.

In the foregoing embodiment of this application, another search mode for extracting the one or more parallelizable branch groups from the first computational graph based on the connection relationship between nodes in the first computational graph is described. In this search mode, searching is performed based on a scattered structure. This search mode is a supplementary search mode for the foregoing two modes. In this search mode, nodes in the first computational graph that support fusion can be found to a maximum extent, so that a search range is wider.

In a possible design, the deep learning framework 2900 further includes a compilation module 2905, configured to compile the fusion node in the second computational graph to obtain an operator kernel (kernel) corresponding to the fusion node.

As described in the foregoing embodiment of this application, the process of compiling the second computational graph by the compilation module 2905 further includes a process of compiling the fusion node, and is implementable.

In a possible design, the compilation module 2905 is further configured to: when the fusion node is obtained by fusing p nodes, separately schedule the p nodes to obtain p sub-intermediate-representations (IR) respectively corresponding to the p nodes; then fuse the p sub-IRs to obtain a total IR; and finally, compile the total IR to obtain the operator kernel (kernel) corresponding to the fusion node.

In a possible design, the deep learning framework 2900 may be an AI framework in a plurality of specific representation forms, for example, may be a mainstream deep learning framework such as MindSpore, TensorFlow, TensorNetwork, PyTorch, MXNet, Caffe, or Theano, or may be another special deep learning framework. Provided that the deep learning framework can perform processing processes of optimization and compilation on a computational graph, the deep learning framework can be considered as the deep learning framework 2900 in this embodiment of this application. A representation form of the deep learning framework 2900 is not specifically limited in this application.

In the foregoing embodiment of this application, several common specific representation forms of the deep learning framework 2900 are described, and are widely applicable.

It should be noted that content such as information exchange and an execution process between the modules/units in the deep learning framework 2900 is based on a same concept as that of the method embodiment corresponding to FIG. 9 in this application. For specific content, refer to the descriptions in the foregoing method embodiments of this application. Details are not described herein again.

Figure 30:
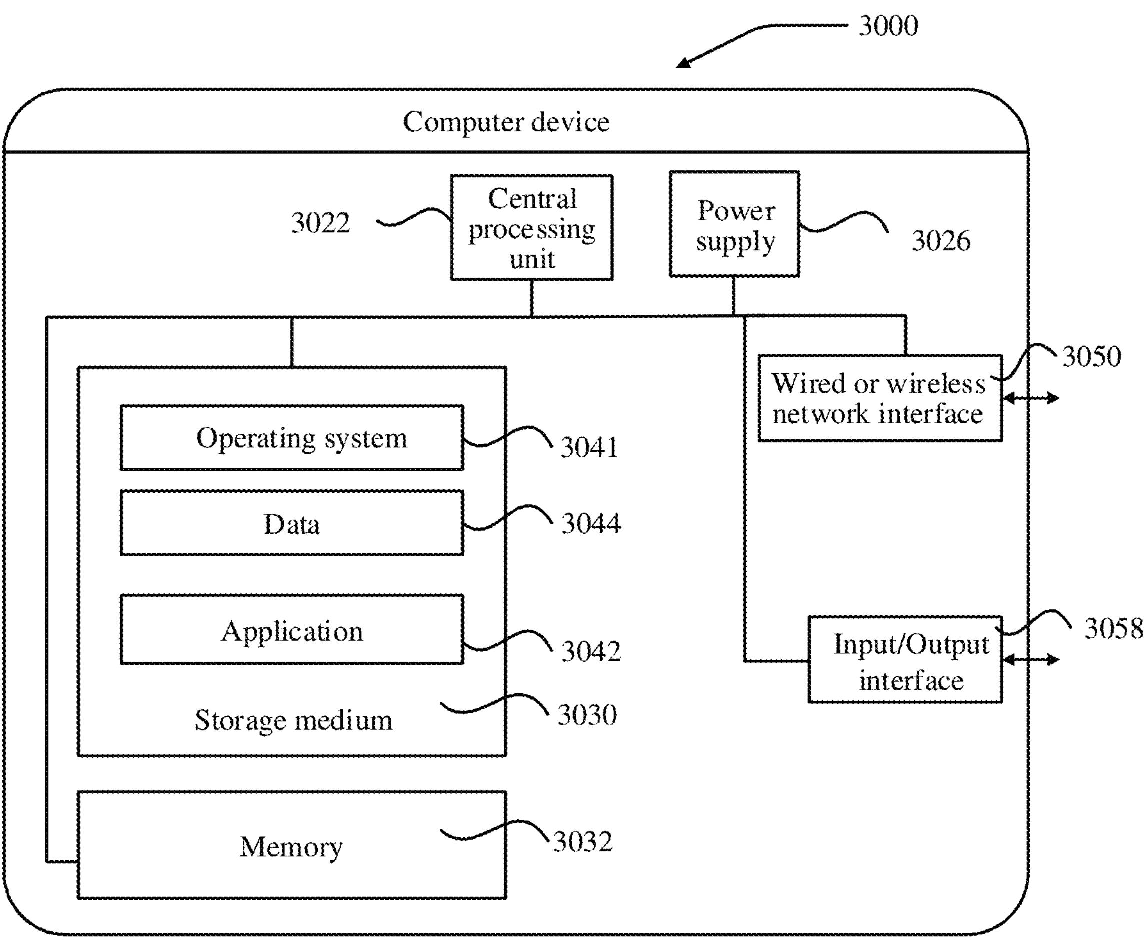
FIG. 30 is a schematic diagram of a structure of a computer device according to an embodiment of this application.

An embodiment of this application further provides a computer device. FIG. 30 is a schematic diagram of a structure of a computer device according to an embodiment of this application. For ease of description, only a part related to this embodiment of this application is shown. For specific technical details that are not disclosed, refer to the method part in embodiments of this application. The modules described in the embodiment corresponding to FIG. 29 may be deployed on the computer device 3000, to implement the functions of the deep learning framework in the embodiment corresponding to FIG. 29. Specifically, the computer device 3000 is implemented by using one or more servers. The computer device 3000 may vary greatly due to different configurations or performance, and may include one or more central processing units (central processing units, CPU) 3022, a memory 3032, and one or more storage media 3030 (for example, one or more mass storage devices) for storing an application program 3042 or data 3044. The memory 3032 and the storage medium 3030 may be transitory storage or persistent storage. The program stored in the storage medium 3030 may include one or more modules (not shown in the figure), and each module may include a series of instruction operations for the computer device 3000. Further, the central processing unit 3022 may be configured to communicate with the storage medium 3030, and perform, on the computer device 3000, a series of instruction operations in the storage medium 3030.

The computer device 3000 may further include one or more power supplies 3026, one or more wired or wireless network interfaces 3050, one or more input/output interfaces 3058, and/or one or more operating systems 3041, for example, Windows Server™, Mac OS X™, Unix™, Linux™, or FreeBSD™.

In this embodiment of this application, the central processing unit 3022 is configured to perform the method in the embodiment corresponding to FIG. 9. For example, the central processing unit 3022 may be configured to: obtain a network structure of a neural network, and convert the neural network into a computational graph, where the obtained computational graph may be referred to as a first computational graph; and after the first computational graph is obtained, extract one or more parallelizable branch groups from the first computational graph based on a dependency relationship between nodes in the first computational graph, where each parallelizable branch group includes a plurality of sub-branches (that is, at least two sub-branches), the sub-branch is a sequential series structure without bifurcation, and each sub-branch in each parallelizable branch group includes one or more nodes. The parallelizable branch group indicates that the plurality of sub-branches in the parallelizable branch group support parallel execution. Herein, it should be noted that sub-branches belonging to a same parallelizable branch group need to meet two conditions: First, there is no dependency relationship between sub-branches. Second, a computational graph obtained by fusing any two or more nodes belonging to different sub-branches into one node does not include a ring structure, that is, a computational graph obtained through fusion does not include a ring structure. In this embodiment of this application, at least one parallelizable branch group (which may be referred to as a first parallelizable branch group) included in the parallelizable branch group meets at least one of the following conditions: Input for all sub-branches in the first parallelizable branch group comes from a same node, and output of at least two sub-branches in the first parallelizable branch group is directed to different nodes; output of all sub-branches in the first parallelizable branch group is directed to a same node, and input for at least two sub-branches in the first parallelizable branch group comes from different nodes; none of $1^{st}$ nodes of sub-branches in the first parallelizable branch group has a parent node; or none of last nodes of sub-branches in the first parallelizable branch group has a child node. After the foregoing operations are performed, the one or more parallelizable branch groups may be obtained. For each parallelizable branch group, a plurality of nodes in each parallelizable branch group (which may be referred to as the first parallelizable branch group) that respectively belong to different sub-branches are fused to obtain the second computational graph.

It should be noted that the central processing unit 3022 may be further configured to perform any operation in the method embodiment corresponding to FIG. 9 in this application. For specific content, refer to the descriptions in the foregoing method embodiments of this application. Details are not described herein again.

An embodiment of this application further provides a computer-readable storage medium. The computer-readable storage medium stores a program for signal processing. When the program runs on a computer, the computer is enabled to perform the operations performed by the computer device in the descriptions of the foregoing embodiments.

In addition, it should be noted that the apparatus embodiments described above are merely examples. The units described as separate parts may or may not be physically separate, and parts shown as units may or may not be physical units, that is, may be located in one place, or may be distributed on a plurality of network units. Some or all of the modules may be selected according to actual requirements to achieve objectives of solutions of embodiments. In addition, in the accompanying drawings of the apparatus embodiments provided in this application, a connection relationship between modules indicates that the modules have a communication connection, which may be specifically implemented as one or more communication buses or signal cables.

According to the descriptions of the foregoing embodiments, a person skilled in the art can clearly understand that this application may be implemented by software in combination with necessary general-purpose hardware, or certainly may be implemented by dedicated hardware, including an application-specific integrated circuit, a dedicated CPU, a dedicated memory, a dedicated component, or the like. Usually, any function performed by a computer program may be easily implemented by corresponding hardware, and a same function may also be implemented by various specific hardware structures, for example, an analog circuit, a digital circuit, or a dedicated circuit. However, in this application, an implementation by using a software program is a better implementation in most cases. Based on such an understanding, technical solutions of this application essentially or a part contributing to the conventional technology may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a training device, a network device, or the like) to perform the methods described in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some of processes or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line) or wireless (for example, infrared, radio, or microwave) manner. The computer-readable storage medium may be any usable medium that can be stored on the computer, or a data storage device, for example, a training device or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state disk (SSD)), or the like.

What is claimed is:

1. A node fusion method for a computational graph applied to a deep learning framework, comprising:

converting a first neural network into a first computational graph;

extracting one or more parallelizable branch groups from the first computational graph, wherein the parallelizable branch group indicates that a plurality of sub-branches belonging to a parallelizable branch group support parallel execution, the parallelizable branch group comprises a first parallelizable branch group, and the first parallelizable branch group meets at least one of the following conditions: input for all sub-branches in the first parallelizable branch group comes from a same node and output of at least two sub-branches in the first parallelizable branch group is directed to different nodes, output of all sub-branches in the first parallelizable branch group is directed to a same node and input for at least two sub-branches in the first parallelizable branch group comes from different nodes, none of 1st nodes of sub-branches in the first parallelizable branch group has a parent node, or none of last nodes of sub-branches in the first parallelizable branch group has a child node; and fusing a plurality of nodes in each of the one or more parallelizable branch groups to obtain a second computational graph based on the first computational graph, wherein a sub-branch to which each of the plurality of nodes belongs is different from a sub-branch to which any other one of the plurality of nodes belongs;

wherein the fusing a plurality of nodes in each of the one or more parallelizable branch groups to obtain a second computational graph based on the first computational graph, including:

removing a node that does not support fusion from a target sub-branch in each parallelizable branch group, to obtain a third parallelizable branch group, wherein the target sub-branch is any sub-branch in each parallelizable branch group, the node that does not support fusion comprises a node indicating a specific operation, and the specific operation comprises at least one of the following operations: a matrix multiplication operation and a convolution operation; and fusing a plurality of nodes in the third parallelizable branch group to obtain a fusion node, wherein the second computational graph comprises the fusion node and an unfused node in the first computational graph, and a sub-branch to which each of the plurality of nodes in the third parallelizable branch group belongs is different from a sub-branch to which any other one of the plurality of nodes belongs.

2. The method according to claim 1, wherein when there are a plurality of parallelizable branch groups, the parallelizable branch groups further comprise a second parallelizable branch group, and the second parallelizable branch group meets the following conditions:

input for all sub-branches in the second parallelizable branch group comes from a same node, output of at least two sub-branches in the second parallelizable branch group is directed to a same node, and each sub-branch in the second parallelizable branch group comprises at least two nodes.

3. The method according to claim 1, further comprising:

repeatedly performing the operation of fusing a plurality of nodes in the third parallelizable branch group to obtain a fusion node, until a quantity of unfused nodes in the third parallelizable branch group is less than 2.

4. The method according to claim 1, wherein the fusing a plurality of nodes in the third parallelizable branch group to obtain a fusion node comprises:

obtaining m node combinations based on n nodes in the third parallelizable branch group, wherein the n nodes respectively belong to n branches that constitute the third parallelizable branch group, each of the m node combinations comprises at least two nodes, $m \geq 1$, $n \geq 2$, and $2m \leq n$;

assessing, by using a computing power assessment model, computing power required by each of the m node combinations, to obtain m assessment results, wherein each of the m assessment results represents one of the following cases: computing power resources to be consumed by each of the m node combinations, or computing power resources to be saved by each of the m node combinations; and when a first assessment result meets a preset condition, fusing nodes in a first node combination corresponding to the first assessment result, to obtain one or more first fusion nodes, wherein the first assessment result is one of the m assessment results, and the first node combination is one of the m node combinations.

5. The method according to claim 4, wherein that the first assessment result meets the preset condition comprises at least one of the following cases:

when each of the m assessment results represents computing power resources to be consumed by each of the m node combinations, the first assessment result meets a computing power requirement of a module (device) that is in acceleration hardware and that specifically performs a computational task; when each of the m assessment results represents computing power resources to be saved by each of the m node combinations, the first assessment result is optimal among the m assessment results; or when each of the m assessment results represents computing power resources to be saved by each of the m node combinations, the first assessment result is optimal among x assessment results, wherein the x assessment results are at least two of the m assessment results.

6. The method according to claim 1, wherein the extracting one or more parallelizable branch groups from the first computational graph comprises:

searching the first computational graph for a plurality of first branches that have a common first parent node, and obtaining a parallelizable branch group based on the plurality of first branches, wherein the first parent node is any parent node in the first computational graph; or searching the first computational graph for a plurality of second branches that have a common first child node, and obtaining a parallelizable branch group based on the plurality of second branches, wherein the first child node is any child node in the first computational graph.

7. The method according to claim 6, wherein the obtaining a parallelizable branch group based on the plurality of first branches comprises:

searching each first branch downward by using the first parent node as a start point, until a common second parent node or a common second child node is found during downward searching, to obtain a parallelizable branch group corresponding to the plurality of first branches, wherein the parallelizable branch group comprises first sub-branches respectively corresponding to the plurality of first branches, and a node comprised in each first sub-branch is a node obtained during downward searching of each first sub-branch.

8. The method according to claim 6, wherein the obtaining a parallelizable branch group based on the plurality of second branches comprises:

searching each second branch upward by using the first child node as a start point, until a common third parent node or a common third child node is found during upward searching, to obtain a parallelizable branch group corresponding to the plurality of second branches, wherein the parallelizable branch group comprises second sub-branches respectively corresponding to the plurality of second branches, and a node comprised in each second sub-branch is a node obtained during upward searching of each second sub-branch.

9. The method according to claim 1, wherein the extracting one or more parallelizable branch groups from the first computational graph further comprises:

searching the first computational graph for a plurality of third branches, and obtaining a parallelizable branch group based on the plurality of third branches, wherein a first node in each of the plurality of third branches has no parent node; or searching the first computational graph for a plurality of fourth branches, and obtaining a parallelizable branch group based on the plurality of fourth branches, wherein a last node in each of the fourth branches has no child node.

10. The method according to claim 9, wherein the obtaining a parallelizable branch group based on the plurality of third branches comprises:

searching each third branch downward by using the first node in each third branch as a start point, until a same parent node or a same child node is found during downward searching, to obtain a parallelizable branch group corresponding to the plurality of third branches, wherein the parallelizable branch group comprises third sub-branches respectively corresponding to the plurality of third branches, and a node comprised in each third sub-branch is a node obtained during downward searching of each third sub-branch.

11. The method according to claim 9, wherein the obtaining a parallelizable branch group based on the plurality of fourth branches comprises:

searching each fourth branch upward by using the last node in each fourth branch as a start point, until a same parent node or a same child node is found during upward searching, to obtain a parallelizable branch group corresponding to the plurality of fourth branches, wherein the parallelizable branch group comprises fourth sub-branches respectively corresponding to the plurality of fourth branches, and a node comprised in each fourth sub-branch is a node obtained during upward searching of each fourth sub-branch.

12. The method according to claim 1, wherein the extracting one or more parallelizable branch groups from the first computational graph further comprises:

when a target node is not a node that does not support fusion, simplifying a local structure around the target node to obtain a fifth branch, wherein the target node is a node that is in the first computational graph and that does not belong to any parallelizable branch group; and when there are a plurality of fifth branches, obtaining a parallelizable branch group based on the plurality of fifth branches.

13. The method according to claim 1, further comprising:

compiling a fusion node in the second computational graph to obtain an operator kernel corresponding to the fusion node.

14. The method according to claim 13, wherein the fusion node is obtained by fusing p nodes, and the compiling the fusion node in the second computational graph to obtain an operator kernel corresponding to the fusion node comprises:

separately scheduling the p nodes to obtain p sub-intermediate-representations (IRs) respectively corresponding to the p nodes;

fusing the p sub-IRs to obtain a total IR; and compiling the total IR to obtain the operator kernel corresponding to the fusion node.

15. The method according to claim 1, wherein the deep learning framework is one of:

MindSpore, TensorFlow, TensorNetwork, PyTorch, MXNet, Caffe, or Theano.

16. A node fusion system for a computational graph, comprising:

at least one processor; and at least one processor memory coupled to the at least one processor to store program instructions, which when executed by the at least one processor, cause the at least one processor to:

convert a first neural network into a first computational graph;

extract one or more parallelizable branch groups from the first computational graph, wherein a parallelizable branch group indicates that a plurality of sub-branches belonging to a parallelizable branch group support parallel execution, the parallelizable branch group comprises a first parallelizable branch group, and the first parallelizable branch group meets at least one of the following conditions: input for all sub-branches in the first parallelizable branch group comes from a same node and output of at least two sub-branches in the first parallelizable branch group is directed to different nodes, output of all sub-branches in the first parallelizable branch group is directed to a same node and input for at least two sub-branches in the first parallelizable branch group comes from different nodes, none of 1$^{st}$ nodes of sub-branches in the first parallelizable branch group has a parent node, or none of last nodes of sub-branches in the first parallelizable branch group has a child node; and fuse a plurality of nodes in each of the one or more parallelizable branch groups to obtain a second computational graph based on the first computational graph, wherein a sub-branch to which each of the plurality of nodes belongs is different from a sub-branch to which any other one of the plurality of nodes belongs;

wherein the fusing a plurality of nodes in each of the one or more parallelizable branch groups to obtain a second computational graph based on the first computational graph, including:

remove a node that does not support fusion from a target sub-branch in each parallelizable branch group, to obtain a third parallelizable branch group, wherein the target sub-branch is any sub-branch in each parallelizable branch group, the node that does not support fusion comprises a node indicating a specific operation, and the specific operation comprises at least one of the following operations: a matrix multiplication operation and a convolution operation; and fuse a plurality of nodes in the third parallelizable branch group to obtain a fusion node, wherein the second computational graph comprises the fusion node and an unfused node in the first computational graph, and a sub-branch to which each of the plurality of nodes in the third parallelizable branch group belongs is different from a sub-branch to which any other one of the plurality of nodes belongs.

17. The system according to claim 16, wherein when there are a plurality of parallelizable branch groups, the parallelizable branch groups further comprise a second parallelizable branch group, and the second parallelizable branch group meets the following conditions:

input for all sub-branches in the second parallelizable branch group comes from a same node, output of at least two sub-branches in the second parallelizable branch group is directed to a same node, and each sub-branch in the second parallelizable branch group comprises at least two nodes.

18. A non-transitory computer-readable storage medium, storing one or more instructions that, when executed by at least one processor, cause the at least one processor to:

convert a first neural network into a first computational graph;

extract one or more parallelizable branch groups from the first computational graph, wherein a parallelizable branch group indicates that a plurality of sub-branches belonging to a parallelizable branch group support parallel execution, the parallelizable branch group comprises a first parallelizable branch group, and the first parallelizable branch group meets at least one of the following conditions: input for all sub-branches in the first parallelizable branch group comes from a same node and output of at least two sub-branches in the first parallelizable branch group is directed to different nodes, output of all sub-branches in the first parallelizable branch group is directed to a same node and input for at least two sub-branches in the first parallelizable branch group comes from different nodes, none of 1st nodes of sub-branches in the first parallelizable branch group has a parent node, or none of last nodes of sub-branches in the first parallelizable branch group has a child node; and fuse a plurality of nodes in each of the one or more parallelizable branch groups to obtain a second computational graph based on the first computational graph, wherein a sub-branch to which each of the plurality of nodes belongs is different from a sub-branch to which any other one of the plurality of nodes belongs;

wherein the fusing a plurality of nodes in each of the one or more parallelizable branch groups to obtain a second computational graph based on the first computational graph including:

remove a node that does not support fusion from a target sub-branch in each parallelizable branch group, to obtain a third parallelizable branch group, wherein the target sub-branch is any sub-branch in each parallelizable branch group, the node that does not support fusion comprises a node indicating a specific operation, and the specific operation comprises at least one of the following operations: a matrix multiplication operation and a convolution operation; and fuse a plurality of nodes in the third parallelizable branch group to obtain a fusion node, wherein the second computational graph comprises the fusion node and an unfused node in the first computational graph, and a sub-branch to which each of the plurality of nodes in the third parallelizable branch group belongs is different from a sub-branch to which any other one of the plurality of nodes belongs.

* * * * *